(12) United States Patent  
Kim et al.

(10) Patent No.: US 8,705,510 B2  
(45) Date of Patent: Apr. 22, 2014

(54) METHOD FOR TRANSMITTING FEEDBACK INFORMATION AND DATA USING A PRECODING CODEBOOK FOR MULTICELL COOPERATIVE COMMUNICATION IN A WIRELESS COMMUNICATION SYSTEM

(75) Inventors: Hyung Tae Kim, Anyang-si (KR); Byoung Hoon Kim, Anyang-si (KR); Jang Hoon Yang, Seoul (KR); Han Byul Seo, Anyang-si (KR); Hyuk Jin Chae, Seoul (KR); Dong Ku Kim, Seoul (KR); Ki Jun Kim, Anyang-si (KR); Suck Chel Yang, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 187 days.

(21) Appl. No.: 13/265,327

(22) PCT Filed: Apr. 22, 2010

(86) PCT No.: PCT/KR2010/002533  
§ 371 (c)(1),  
(2), (4) Date: Dec. 20, 2011

(87) PCT Pub. No.: WO2010/123297  
PCT Pub. Date: Oct. 28, 2010

(65) Prior Publication Data  
US 2012/0082149 A1  Apr. 5, 2012

Related U.S. Application Data

(60) Provisional application No. 61/173,953, filed on Apr. 29, 2009, provisional application No. 61/171,467, filed on Apr. 22, 2009.

(30) Foreign Application Priority Data

Jul. 17, 2009 (KR) .................. 10-2009-0065470  
Apr. 22, 2010 (KR) .................. 10-2010-0037328

(51) Int. Cl.  
*H04B 7/04* (2006.01)

(52) U.S. Cl.  
CPC .................................. *H04B 7/0478* (2013.01)  
USPC ............. 370/350; 370/332; 370/334; 455/69; 375/358

(58) Field of Classification Search  
USPC ........ 370/310.2, 328–339, 349; 455/13.3, 69, 455/422.1, 562.1, 575.7; 375/358  
See application file for complete search history.

(56) References Cited

U.S. PATENT DOCUMENTS 8,477,867 B2 * 7/2013 Yang et al. .................. 375/267

(Continued)

FOREIGN PATENT DOCUMENTS

KR   20020008301   1/2002  
WO   2007051192   5/2007

*Primary Examiner* — Hoon J Chung  
(74) *Attorney, Agent, or Firm* — Lee, Hong, Degerman, Kang & Waimey

(57) ABSTRACT

Disclosed are a feedback-transmitting method and data-transmitting method, and a method for generating a codebook that can be used in a system such as LTE-A. When multiple base stations operate in a cooperative mode, using a codebook generated according to the present invention, an existing codebook for single cell transmission can be used to generate a codebook for cooperative transmission.

13 Claims, 6 Drawing Sheets

(56) References Cited

U.S. PATENT DOCUMENTS

2004/0225740 A1  11/2004 Klemba et al.
2008/0025336 A1* 1/2008 Cho et al. ................. 370/432
2010/0039928 A1* 2/2010 Noh et al. ................. 370/210
2010/0278278 A1* 11/2010 Lee et al. .................. 375/267
2010/0284484 A1* 11/2010 Jongren et al. ............ 375/267
2011/0038436 A1* 2/2011 Kim et al. .................. 375/260
2011/0274200 A1* 11/2011 Lee et al. .................. 375/295
2013/0148755 A1* 6/2013 Melzer et al. .............. 375/267

* cited by examiner

METHOD FOR TRANSMITTING FEEDBACK INFORMATION AND DATA USING A PRECODING CODEBOOK FOR MULTICELL COOPERATIVE COMMUNICATION IN A WIRELESS COMMUNICATION SYSTEM

CROSS-REFERENCE TO RELATED APPLICATIONS

This application is the National Stage filing under 35 U.S.C. 371 of International Application No. PCT/KR2010/002533, filed on Apr. 22, 2010, which claims the benefit of earlier filing date and right of priority to Korean Application Serial Nos. 10-2010-0037328, filed on Apr. 22, 2010 and 10-2009-0065470, filed on Jul. 17, 2009, and also claims the benefit of U.S. Provisional Application Serial Nos. 61/173,953, filed on Apr. 29, 2009 and 61/171,467, filed on Apr. 22, 2009, the contents of which are all hereby incorporated by reference herein in their entirety.

TECHNICAL FIELD

The present invention relates to a wireless communication system, and more particularly, to a codebook which can be used by multiple base stations.

BACKGROUND ART

A Multiple-Input Multiple-Output (MIMO) technique refers to a technique for improving data transmission/reception efficiency using multiple transmission antennas and multiple reception antennas, instead of employing one transmission antenna and one reception antenna. Recently, considerable research into the channel capacity of a multi-user MIMO system has been carried out so that multiple users may efficiently use spatial resources.

Upon using a single antenna, a receiving end receives data through a single antenna path, while upon using multiple antennas, the receiving end receives data through multiple paths. Accordingly, data transmission rate and transmission amount can be improved and coverage can be increased.

A wireless communication system using multiple antennas includes an open-loop multi-antenna system in which feedback information from a receiving end is not used and a closed-loop multi-antenna system in which feedback information from a receiving end is used. In the closed-loop multi-antenna system, a receiving end transmits feedback information about a channel state to a transmitting end and the transmitting end discerns the channel state through the feedback information, thereby improving the performance of the wireless communication system.

The closed-loop multi-antenna system uses a precoding scheme for minimizing an influence caused by a channel, in which the transmitting end processes transmission data using feedback information about channel environments received from the receiving end.

The precoding scheme refers to a scheme for raising a Signal-to-Noise Ratio (SNR) and includes a codebook based precoding scheme and a precoding scheme for quantizing and then feeding back channel information.

The codebook based precoding scheme refers to a scheme in which a receiving end selects a precoding matrix from a codebook shared previously by a transmitting end and the receiving end and feeds back an index of the selected precoding matrix to the transmitting end, and then the transmitting end modifies transmission data using the feedback precoding matrix. In other words, since feedback of all channel information functions as significant system overhead, a codebook is configured by quantizing the channel information for feedback, an index is allocated to each of precoding matrices included in the codebook, and the receiving end feeds back only the index to the transmitting end, thereby reducing overhead.

The codebook based precoding scheme according to the prior art includes Per User Unitary and Rate Control (hereinafter, "PU2RC") and SIC-based Per User and Stream Rate Control (S-PUSRC).

PU2RC uses Fourier basis as a unitary matrix for precoding and uses a unitary matrix extended according to the number of transmission antennas as a precoding matrix.

A Dirty Paper Coding (DPC) scheme, which can reduce data interference generated from other users by previously eliminating, at a Base Station (BS), data of other users functioning as interference, provides maximum channel capacity in a MIMO system. However, it is difficult to implement the DPC scheme in an actual system due to much channel information demanded by a transmitting end and operation complexity. The PU2RC scheme, which is proposed in "Downlink MIMO for EUTRA" of 3rd Generation Partnership Project (3GPP) TSG RAN WG1 #44/R1-060335 for actual implementation, is a scheme for simultaneously allocating spatial resources to different users. According to this scheme, each user selects a precoding matrix and vector which can maximize channel transmission rate thereof from among a plurality of precoding matrices having an orthogonal basis and feeds back an index of the selected vector and a Signal to Interface plus Noise Ratio (SINR) to a BS.

The BS selects and transmits a precoding matrix and user for maximizing the sum of transmission rates based on the feedback information. Such a conventional PU2RC scheme is a technique for obtaining precoding gain using spatial multi-user diversity and multiple precoding matrices. However, since this technique determines a user and a precoding matrix in consideration of only single-cell environments, capabilities are deteriorated due to inter-cell interference in multi-cell environments.

Accordingly, in order to control inter-cell interference which may encounter in the multi-cell environments, a BS cooperative scheme or coordinated scheme has been discussed. Especially, for a cell boundary user that is subject to much interference from neighboring cells, the BS cooperative technique may be a good solving scheme for guaranteeing data transmission rate up to a given level or more.

Recently, although the BS cooperative technique has been dealt with, a method for solving an optimal problem when all BSs are aware of most channel information is proposed. A thesis "Base Station Cooperation for Multiuser MIMO: Joint Transmission and BS Selection" written by HongyuanZhang, HuaiyuDai, and QuanZhou discloses a DPC or joint Zero Forcing Beamforming (ZF-BF) in the case where all BSs know channel information.

In this case, however, since all BSs should be perfectly aware of channel information, application to an actual system is difficult in terms of feedback or operation complexity. A thesis "Receiver-Enhanced Cooperative Spatial Multiplexing with Hybrid Channel Knowledge" by Hilde Skjevling, David Gesbert, and Are Hjorungnes proposed a cooperative scheme between BSs under the assumption that a neighboring cell uses only statistical information as channel information and fully knows channel information of a served cell. However, since this proposal also assumes that a neighboring cell perfectly knows channel information of a served cell, actual application is difficult.

Furthermore, since a precoding matrix has conventionally been designed in consideration of only circumstances in which there is no power difference in reception signals between BSs, there may be elements which should be additionally considered when BS cooperation is applied in the other circumstances.

As described above, since the conventional PU2RC determines a user and selects a precoding matrix, by considering only a single cell, it is weak in inter-cell interference in multi-cell environments. A conventional precoding matrix generation method for multi-BS cooperation has been considered only when the numbers of antennas of BSs participating in cooperation are the same as the numbers of transmission layers. Furthermore, the conventional method cannot be effectively applied when there is power difference in reception signals between BSs.

DETAILED DESCRIPTION OF THE INVENTION

Technical Problems

A technical object to be solved by the present invention is to provide a method for transmitting feedback information in a wireless communication system.

Another technical object to be solved by the present invention is to provide a method for transmitting data in a wireless communication system.

A further technical object to be solved by the present invention is to provide an apparatus for transmitting feedback information in a wireless communication system.

Still another technical object to be solved by the present invention is to provide an apparatus for transmitting data in a wireless communication system.

The technical objects to be achieved by the present invention are not limited to the above-mentioned technical objects, and other technical problems not mentioned above can be clearly understood by one skilled in the art from the following description.

Technical Solving Methods

A method for transmitting feedback information at a User Equipment (UE) in a wireless communication system operating in a Base Station (BS) cooperative mode according to the present invention, for achieving the above technical object, include estimating a channel between the UE and each BS using a channel measurement signal received from each BS operating in the BS cooperative mode; selecting a multi-BS precoding matrix from a predefined multi-BS precoding matrix codebook based on the estimated channel; and transmitting indication information of the selected precoding matrix to a serving BS, wherein the predefined multi-BS precoding matrix codebook includes one or more single-BS precoding matrices and a coefficient matrix which is a set of coefficients multiplied by the respective single-BS precoding matrices, the product of the multi-BS precoding matrix and a Hermitian matrix of the multi-BS precoding matrix is a unitary matrix, row precoding matrices of one or more same rows in the multi-BS precoding matrix codebook are selected such that a subspace distance between the row precoding matrices is maximized, column precoding matrices of same columns are identical to each other, and the coefficient matrix is generated to have a unitary property.

A method for transmitting feedback information at a User Equipment (UE) in a wireless communication system operating in a Base Station (BS) cooperative mode according to the present invention, for achieving the above technical object, includes estimating, at the UE, a channel between the UE and each BS using a channel measurement signal received from each BS operating in the BS cooperative mode; selecting a multi-BS precoding matrix from a previously set multi-BS precoding matrix codebook based on the estimated channel; and transmitting indication information of the selected precoding matrix to a serving BS, wherein the predefined multi-BS precoding matrix codebook includes one or more single-BS precoding matrices and a coefficient matrix which is a set of coefficients multiplied by the respective single-BS precoding matrices, and the product of the multi-BS precoding matrix and a Hermitian matrix of the multi-BS precoding matrix is a unitary matrix.

A method for transmitting feedback information at a User Equipment (UE) in a wireless communication system operating in a Base Station (BS) cooperative mode according to the present invention, for achieving the above another technical object, includes estimating a channel between the UE and each BS using a channel measurement signal received from each BS operating in the BS cooperative mode; selecting a multi-BS precoding matrix from a multi-BS precoding matrix codebook based on the estimated channel; and transmitting indication information of the selected precoding matrix to a serving BS, wherein the predefined multi-BS precoding matrix codebook includes one or more single-BS precoding matrices and a coefficient matrix which is a set of coefficients multiplied by the respective single-BS precoding matrices, the product of the multi-BS precoding matrix and a Hermitian matrix of the multi-BS precoding matrix is a unitary matrix, row matrices in the multi-BS precoding matrix codebook are orthogonal to each other, and elements of the coefficient matrix are generated such that an absolute value of each of the elements is 1.

A User Equipment (UE) for transmitting feedback information in a wireless communication system operating in a Base Station (BS) cooperative mode according to the present invention, for achieving the above further object, includes a processor configured to estimate a channel between the UE and each BS using a channel measurement signal received from each BS operating in the BS cooperative mode, and select a multi-BS precoding matrix from a previously set multi-BS precoding matrix codebook based on the estimated channel; and a Radio Frequency (RF) unit configured to transmit indication information of the selected precoding matrix to a serving BS, wherein the predefined multi-BS precoding matrix codebook includes one or more single-BS precoding matrices and a coefficient matrix which is a set of coefficients multiplied by the respective single-BS precoding matrices, and the product of the multi-BS precoding matrix and a Hermitian matrix of the multi-BS precoding matrix is a unitary matrix.

Advantageous Effects

A codebook generated according to the present invention can provide a precoding matrix usable when multiple BSs perform cooperative operation.

By using the codebook generated according to the present invention, overhead caused by feedback of an index of a precoding matrix in a multi-BS operating circumstance can be significantly reduced.

The effects which can be obtained from the present invention are not limited to the above-mentioned effects, and other effects not mentioned above can be clearly understood by one skilled in the art from the following description of the embodiments of the present invention.

BRIEF DESCRIPTION OF THE DRAWINGS

The accompanying drawings, which are included to provide a further understanding of the invention and constitute a part of the detailed description, illustrate embodiments of the invention and together with the description serve to explain the principles of the invention, in which.

BEST MODE FOR CARRYING OUT THE INVENTION

Figure 1:
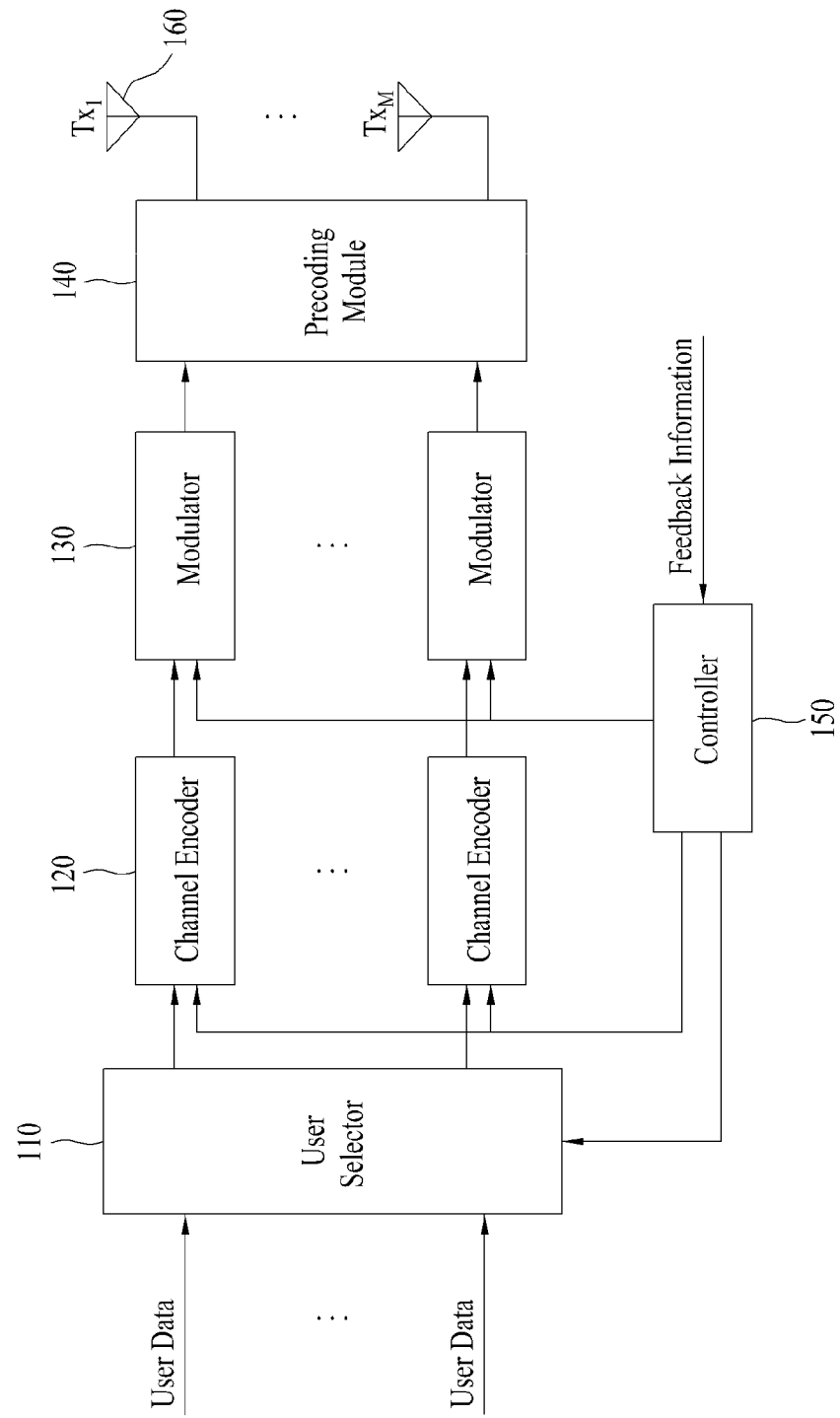
FIG. 1 illustrates the configuration of a transmitter of a wireless communication system having multiple antennas.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE system as a mobile communication system, it is applicable to other arbitrary mobile communication systems except for matters that are specific to the 3GPP LTE system.

In some instances, known structures and/or devices are omitted or are shown in block diagram and/or flowchart form, focusing on important features of the structures and/or devices, so as not to obscure the concept of the present invention. The same reference numbers will be used throughout this specification to refer to the same or like parts.

The following description assumes that a User Equipment (UE) refers to a mobile or fixed equipment such as a Mobile Station (MS) or an Advanced Mobile Station (AMS) and a Base Station (BS) refers to an arbitrary node of a network stage communicating with a UE, such as a Node B, an eNode B, or Access Point (AP).

In a mobile communication system, a UE may receive information through downlink from a BS, and the UE may transmit information through uplink. Information transmitted and received by the UE includes data and various control information. A variety of physical channels are present according to types or usages of information transmitted or received by the UE.

Meanwhile, a user equipment (or UE) of the present invention may be a Personal Digital Assistant (PDA), a cellular phone, a Personal Communication Service (PCS) phone, a Global System for Mobile (GSM) phone, a Wideband CDMA (WCDMA) phone, and a Mobile Broadband System (MBS) phone.

Specific terms used in the following description are provided to aid in understanding of the present invention and may be modified to other forms within the technical spirit of the invention.

The term base station (or BS) used in the present invention may be used as a concept including a cell or a sector. For example, in the present invention, a serving BS may be referred to as a serving cell and a cooperative BS may be used as a cooperative cell. A Cooperative Multi-Point (CoMP) system refers to a system in which two or more BSs or cells coordinately communicate with a UE to improve communication performance between a UE and a BS which are located in a shadow area.

A CoMP scheme is described in brief. The CoMP scheme is divided into a Joint Processing (JP) scheme of a cooperative Multiple-Input Multiple-Output (MIMO) form through data sharing and a Coordinated Scheduling/Beamforming (CS/CB) scheme.

In the JP scheme, data may be instantaneously and simultaneously transmitted to a UE from each BS performing CoMP and the UE may combine reception signals received from each BS to improve reception performance.

Unlike this, in the CS/CB scheme, data may be instantaneously transmitted to one UE through one BS, and scheduling or beamforming is performed such that interference from other BSs to which the UE belongs can be minimized.

A BS cooperative scheme may be classified according to a degree of sharing information between BSs: a first scheme in which BSs share neither channel information nor transmission data information, a second scheme in which BSs share only channel information and do not share data information, a third scheme in which BSs share only data information and do not share channel information, and a fourth scheme in which BSs share both channel information and data information.

In order for BSs to share data information of a user, since the respective BSs should contain all transmitted data of a user, load of a backhaul network may increase and the size of a BS buffer should correspondingly increase. Especially, for high rate data transmission, the traffic amount of the backhaul network and the increase of the buffer size may function as a significant burden on system design. Accordingly, it may be desirable that BSs share only channel information while not sharing data information.

A CoMP system has an advantage of improving throughput of a user at a cell boundary by applying improved MIMO transmission in a multi-cell environment. If the CoMP system is applied, inter-cell interference in a multi-cell environment can be reduced and a UE can be commonly provided with data by multi-cell BSs. Moreover, respective BSs simultaneously support one or more UEs using the same radio frequency resources, thereby improving overall system performance. Further, the BSs may perform a Space Division Multiple Access (SDMA) scheme based on channel state information between BSs and UEs.

In the CoMP system, a serving BS and one or more cooperative BSs may be connected to a scheduler through a backbone network. The scheduler may operate by receiving channel information about channel states between UEs (MS 1, MS 2, ... MS K) and cooperative BSs, which are measured by BSs (BS 1, BS 2, ... BS M) and which are fed back through the backbone network. For example, the scheduler may schedule information for a cooperative MIMO process with respect to a serving BS and one or more cooperative BSs. That is, the scheduler may directly direct a cooperative MIMO operation to each BS.

In the CoMP system, a specific UE and cells based on the same BS may exchange information (e.g. data and Channel State Information (CSI)) through an internal interface or an x2 interface, while cells based on different BSs may exchange information between cells through the backhaul etc.

An operation scheme of such a BS cooperative mode is to increase data throughput of a UE in a shadow area and total data throughput of a network by cooperation of two or more transmission points. Actual locations of the transmission points may be at the same BS (intra-cell site) or different BSs (inter-cell site).

A serving cell refers to a cell to which a UE currently belongs and provides conventional services. A serving BS refers to a BS which provides communication services to the UE belonging to the serving cell. The serving BS may transmit and receive control information signals on cooperative multiple transmission points. In this case, the serving BS may be referred to as an anchor BS (anchor eNB).

Hereinbelow, a method will be described for generating a precoding matrix set (codebook) for precoding data transmitted and received between a UE, a serving BS, and cooperative BSs which operate in a BS cooperative mode. Especially, in this specification, a method for generating a multi-BS precoding matrix codebook using a single-BS precoding matrix codebook is described.

First, the configuration of a transmitter of a wireless communication system having multiple antennas is described.

FIG. 1 illustrates the configuration of a transmitter of a wireless communication system having multiple antennas.

Referring to FIG. 1, a transmitter of a wireless communication system having multiple antennas includes a user selector 110, a channel encoder 120, a modulator 130, a precoding module 140, a controller 150, and multiple antennas 160.

If user data is input to the user selector 110, the user selector 110 selects a user and transmits data of the selected user to the channel encoder 120 in the form of a single data stream or multiple data streams.

The channel encoder 120 channel-encodes transmission data and the modulator 130 modulates the transmission data by performing constellation mapping. The precoding module 140 multiplies a precoding vector by the transmission data. The precoded data is transmitted through the multiple antennas 160. In this case, the precoded data may be transmitted using various antenna transmission schemes.

The controller 150 controls the user selection of the user selector 110 and the precoding vector selection of the precoding module 140, using feedback information received from a receiver.

In the wireless communication system having multiple antennas, the transmitter and the receiver are aware of a previously generated codebook. A codebook known to the transmitter and the receiver may be a codebook generated according to an embodiment of the present invention. A method for generating a codebook according to the embodiment of the present invention will be described later.

If the transmitter transmits a pilot signal to the receiver, the receiver selects the most appropriate precoding matrix in a current channel state from the previously known codebook by estimating a channel between the transmitter and the receiver using the pilot signal and feeds back indication information of the selected precoding matrix to the transmitter. The indication information of the precoding matrix is an indicative of the precoding matrix and may be, for example, an index of a precoding matrix. The precoding module 140 of the transmitter multiplies a precoding matrix corresponding to an index received from the receiver by the transmission data.

Figure 2:
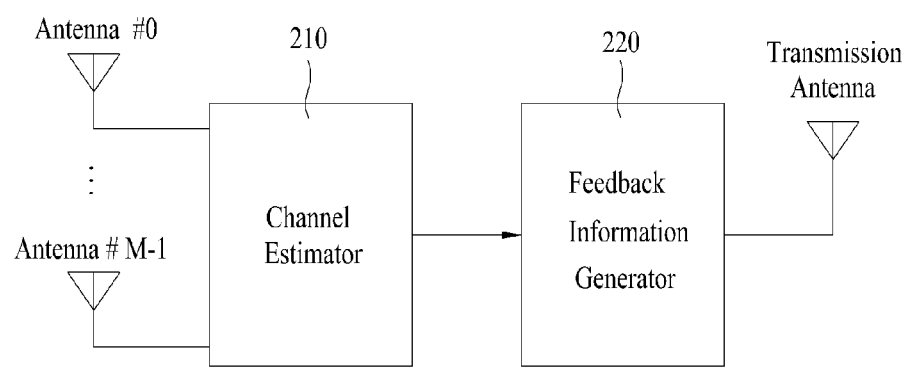
FIG. 2 illustrates the configuration of a receiving side of a wireless communication system having multiple antennas.

FIG. 2 illustrates the configuration of a receiving side of a wireless communication system having multiple antennas.

Referring to FIG. 2, the receiving side of the wireless communication system having multiple antennas includes a channel estimator 210 and a feedback information generator 220.

The channel estimator 210 estimates a channel between a UE and each BS using, for example, a pilot signal for channel measurement, received from each BS. The feedback information generator 220 selects an optimal precoding matrix from a precoding matrix codebook based on the estimated channel and generates feedback information including indication information of the selected precoding matrix. The generated feedback information may be transmitted through a transmission antenna.

Figure 3:
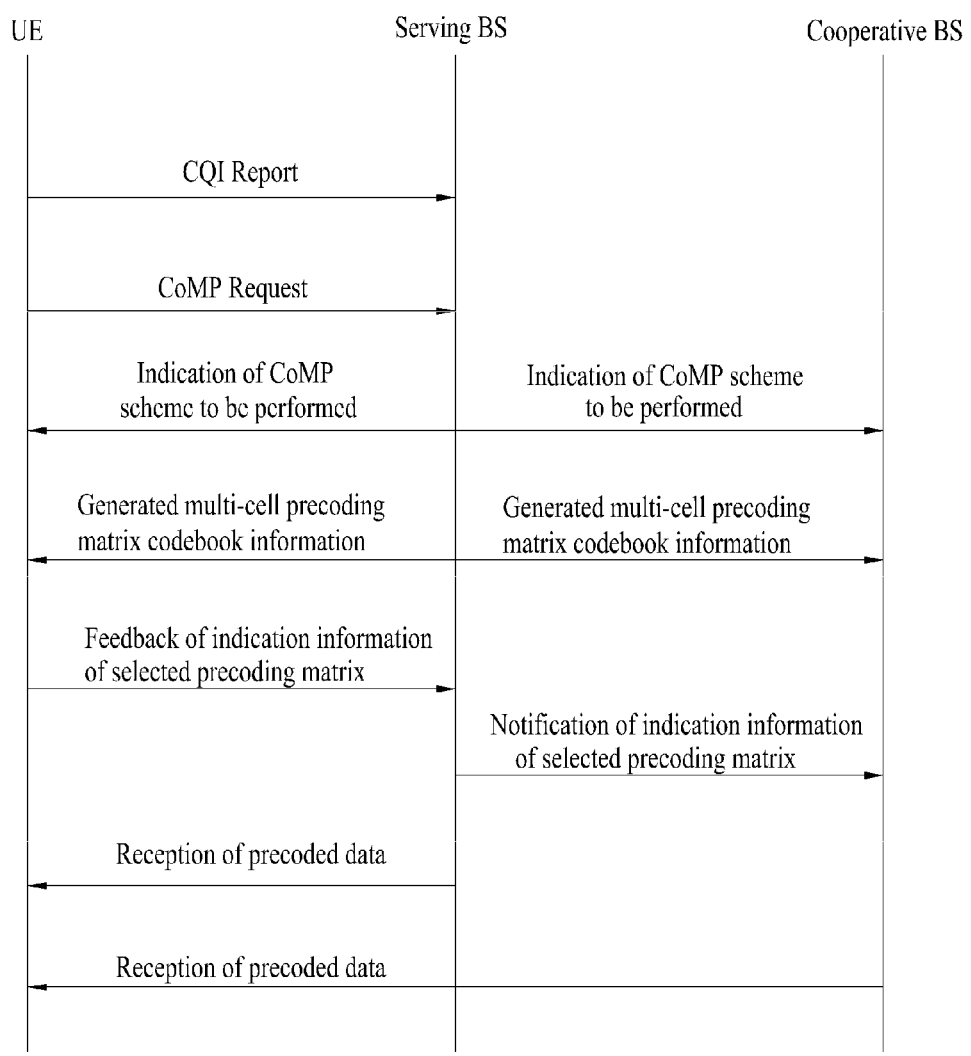
FIG. 3 is a diagram illustrating a process of an exemplary embodiment in which a serving BS and a cooperative BS transmit data to a UE using a multi-BS precoding matrix.

FIG. 3 is a diagram illustrating a process of an exemplary embodiment in which a serving BS and a cooperative BS transmit data to a UE using a multi-BS precoding matrix.

Referring to FIG. 3, a UE may transmit data including CSI received from each BS to a serving BS. The UE may then transmit a CoMP request signaling requesting an operation of a BS cooperative mode to the serving BS. Then the serving BS may notify the UE and a cooperative BS of any one of CoMP schemes. Hereinafter, it is assumed that the serving BS has selected a CoMP-JP among the CoMP schemes.

Each BS and the UE share a precoding matrix set (codebook) for a single BS and share a generation method of a precoding matrix set for multiple BSs from the single-BS precoding matrix set. The serving BS may select precoding matrices from the existing single-BS precoding matrix set by a multi-BS precoding generation method determined between the BSs and the UE, combine the matrices, and generate a multi-BS precoding matrix codebook. The serving BS may transmit signaling indicating an index of the generated multi-BS precoding matrix codebook to the cooperative BS.

The UE may receive pilot signals from the serving BS and the cooperative BS and estimate channels between the UE and the respective BSs. The UE may select an optimal precoding matrix from the generated multi-BS precoding matrix codebook in consideration of the estimated channels. The UE may transmit (or feed back) indication information of the selected precoding matrix to the serving BS.

The serving BS may receive the indication information of the precoding matrix selected from the generated codebook from the UE. The serving BS may signal the indication information of the optimal precoding matrix received from the UE to the cooperative BS. The serving BS and the cooperative BS may precode data to be transmitted using a precoding matrix indicated by the indication information of the selected precoding matrix. The serving BS and the cooperative BS may transmit the precoded data to the UE using multiple antennas.

Next, a method is described in which a serving BS generates a multi-BS precoding matrix codebook from an existing single-BS precoding matrix codebook. In this case, the existing single-BS precoding matrix codebook may be a Householder codebook adopted in Long Term Evolution (LTE). The Householder codebook is advantageous in that a Peak to Average Power Ratio (PAPR) is lower compared with that of a Discrete Fourier Transform (DFT) codebook. Due to this advantage, the Householder codebook is currently being adopted and used in LTE communication standard.

In current LTE based on single-user MIMO, 16 single-BS codebooks are used with respect to ranks 1 to 3 and 13 single-BS codebooks are used with respect to rank 4, in 4 transmission antennas. Using this, a two-BS codebook may be generated.

For convenience of description, a two-BS cooperative scheme is described, and thereafter cases in which the number of BSs participating in cooperation is increased are additionally described. In the present invention, a method for extending a single-BS precoding matrix to a multi-BS precoding matrix is proposed.

If each BS has N transmission antennas and transmits data using L (≤N) transmission layers, a reception signal of two conventional BSs may be expressed by the following Equation 1.

$$Y_{k,1} = H_{k,1}W_1S_1 + H_{k,2}W_2S_2 + Z_k \quad \text{[Equation 1]}$$

If a user (user equipment) has M reception antennas, $Y_{k,i}$ denotes a reception signal vector of an i-th BS and a k-th user, $H_{k,1}$ denotes an M×N MIMO channel between the k-th user and the first BS, $H_{k,2}$ denotes an M×N MIMO channel between the k-th user and the second BS, $W_i$ denotes an N×L unitary precoding matrix of the i-th BS, $Z_k$ denotes an M×1 noise vector, and $S_i$ denotes an L×1 transmission symbol vector of the i-th BS.

In case of cooperative communication between two BSs, if 2N transmission antennas are present and data is transmitted using $L_{co}$ transmission layers, this can be considered as a cooperative single-BS (or cell) system. Here, in case of an operation of a BS cooperative mode (cell cooperative mode), it is assumed that $L_{co}$ has been previously determined. At this time, a precoding matrix $W_{co}$ for BS cooperative mode transmission needs to satisfy a unitary matrix $$\left(W_{co}^H \cdot W_{co} = \frac{1}{L_{co}} I_{L_{co} \times L_{co}}\right)$$

of (2N)×($L_{co}$). Therefore, it is impossible to use an N×L precoding matrix used in a conventional single BS.

Accordingly, the present invention proposes a method using a single-BS precoding matrix to produce a multi-BS (2N)×($L_{co}$) precoding matrix. To this end, it is assumed that a single-BS precoding matrix set (codebook) is previously determined as follows.

$$W(N,L) = \{W_1^{N,L}, W_2^{N,L}, \ldots, W_G^{N,L}\} \quad \text{[Equation 2]}$$

where W(N, L) denotes a single-BS precoding matrix set (codebook) when the number of antennas is N and the number of transmission layers is L.

Conventionally, a method for generating a multi-BS cooperative precoding matrix using a single-BS precoding matrix was proposed. However, the method was designed without considering the case where a reception power difference between BSs is significant. In other words, the method was simply designed such that column vectors of a precoding matrix $W_{co}$ are orthogonal without considering the case where there is a significant power difference between $H_{k,1}$ and $H_{k,2}$.

However, if a power difference in signals received from BSs is large, it is desirable that orthogonality of some column vectors be maintained. For better understating, a description is given by mathematically expressing a reception signal of a transmission system in a BS cooperative mode:

$$Y_{k,1} = [H_{k,1}, H_{k,2}]W_{co}S_{co} + Z_k \quad \text{[Equation 3]}$$

$$= [H_{k,1}, H_{k,2}]\begin{bmatrix} W'_{11} & W'_{12} \\ W'_{21} & W'_{22} \end{bmatrix}S_{co} + Z_k$$

$$= [H_{k,1}W'_{11} + H_{k,2}W'_{21}, H_{k,1}W'_{12} + H_{k,2}W'_{22}]S_{co} + Z_k$$

where $S_{co}$ denotes an ($L_{co}$)×1 transmission signal vector and $W_{co}$ is separately expressed as $W'_{ij}$ of a size of (N×($L_{co}$/2)). Let's assume that there is a significant difference in reception power between each BS and a receiver. For example, if $|H_{k,1}| \gg |H_{k,2}|$, then the last term of Equation 3 may be re-expressed by the following Equation 4 in which $\|$ denotes an absolute value:

$$Y_{k,1} \approx [H_{k,1}W'_{11}, H_{k,1}W'_{12}]S_{co} + Z_k \quad \text{[Equation 4]}$$

where a transmission signal should maintain orthogonality of $W'_{11}$ and $W'_{21}$, so that a Signal to Interference plus Noise Ratio (SINR) is improved and thus the transmission signal can be effectively detected in the receiver. Since channels between BSs and a receiver are not always received at the same magnitude of power, it is desirable that orthogonality between some column vectors of a precoding matrix $W_{co}$ be maintained. In other words, it is necessary to design a precoding matrix such that row matrices are orthogonal and this means that there is orthogonality between column vectors of a row precoding matrix $[W'_{11} W'_{12}]$ or $[W'_{11} W'_{12}]$. In case of a single BS, only orthogonality between column vectors has been considered when a precoding matrix is configured. However, in a system operating in a BS cooperative mode, orthogonality between some column vectors should also be considered.

Therefore, a precoding matrix generation method for CoMP transmission according to a mode (i.e. comparison of the number of transmission layers with the number of transmission antennas) is proposed as follows.

First, the case where $L_{co}=2N$ is considered. In this case, a precoding matrix $W_{co}$ may be selected from a single-BS precoding matrix set W(N,N). However, a matrix cannot be selected such that column vectors of the row matrix $[W'_{11} W'_{12}]$ or $[W'_{11} W'_{12}]$ in Equation 3 are orthogonal. Then, a matrix is selected such that a subspace distance value between respective column vectors is maximized.

Let's consider two different subspaces U and V having dimensions m and n in an N-dimensional complex space. When assuming orthogonal bases $u_1, \ldots, u_m$ and $v_1, \ldots, v_n$ (m,n≤N), a subspace distance of the two subspaces U and V may be defined by the following Equation 5:

$$d_{SSD}(U, V) = \sqrt{\max(m, n) - \sum_{i=1}^{N}\sum_{j=1}^{N}|u_i^H v_j|^2} \quad \text{[Equation 5]}$$

where U and V denote subspaces, m and n denote dimensions of U and V, respectively, and H denotes Hermitian which is a conjugate transpose operation.

A subspace distance is a measurement value for mathematically defining similarity between subspaces. A method for measuring a subspace distance between matrices includes a chordal distance measurement method and a Fubini-study distance measurement method. However, the chordal distance measurement or Fubini-study distance measurement is not used when a magnitude of a matrix is N×N (i.e. full rank). Because the chordal distance and Fubini-study distance produce the same value in a full rank, they cannot determine whether a value is large or not. Accordingly, a matrix is selected so as to maximize a distance between matrices $W'_{11}$ and $W'_{12}$ using subspace distance measurement. For orthogonality between column vectors of a matrix $W_{co}$, a proper coefficient may be multiplied in front of the matrix. This above-described method for generating a multi-BS precoding matrix codebook in a full rank is summarized as follows.

1. As row precoding matrices $W'_{11}$ and $W'_{12}$, two precoding matrices having the maximum subspace distance are selected from a single-BS precoding matrix set.
2. As column precoding matrices, the same combination is selected. That is, $W'_{11} = W'_{21}$ and $W'_{12} = W'_{22}$.
3. A coefficient $\alpha_{ij}$ in front of a matrix can use any combination satisfying $$A = \begin{bmatrix} \alpha_{11} & \alpha_{12} \\ \alpha_{21} & \alpha_{22} \end{bmatrix}, A^H A = I.$$

For example, a coefficient of a DFT matrix may be used. In other words, a coefficient matrix A corresponds to a set of coefficients multiplied by single-BS precoding matrices.

A multi-BS precoding matrix set generated through such a series of processes may be expressed by the following Equation 6:

$$W_{co}^{2N} = \frac{1}{\sqrt{2}} \begin{bmatrix} \alpha_{11} W_{11}^{N,L} & \alpha_{12} W_{12}^{N,L} \\ \alpha_2 W_{21}^{N,L} & \alpha_{22} W_{22}^{N,L} \end{bmatrix}$$ [Equation 6]

$$(W_{i1}^{N,L}, W_{i2}^{N,L}) = \arg\max_{W_j, W_k \in W(N,L)} d_{SSD}(W_j, W_k)$$

$$= \sqrt{N - \sum_{m=1}^{N} \sum_{n=1}^{N} |W_j(m)^H W_k(n)|^2}$$

$$A = \begin{bmatrix} \alpha_{11} & \alpha_{12} \\ \alpha_{21} & \alpha_{22} \end{bmatrix}, A^H A = I$$

where a coefficient matrix A corresponds to a set of coefficients multiplied by single-BS precoding matrices.

The following Table 1 shows a multi-BS precoding matrix codebook generated when each of two BSs has 4 antennas and the number of transmission layers is 8.

TABLE 1

$$W\_co\_8Tx\_L\_8(:,:,1) = \begin{bmatrix} 0.1250 & 0.1250 & 0.1250 & 0.1250 & 0.1250 & 0.1250 & 0-0.1250i & 0+0.1250i \\ 0.1250 & -0.1250 & -0.1250 & 0.1250 & 0+0.1250i & 0-0.1250i & 0+0.1250i & 0.1250 \\ 0.1250 & 0.1250 & -0.1250 & -0.1250 & -0.1250 & -0.1250 & 0-0.1250i & 0-0.1250i \\ 0.1250 & -0.1250 & 0.1250 & -0.1250 & 0-0.1250i & 0+0.1250i & 0.1250 & -0.1250 \\ 0.1250 & 0.1250 & 0.1250 & 0.1250 & -0.1250 & -0.1250 & 0+0.1250i & 0-0.1250i \\ 0.1250 & -0.1250 & -0.1250 & 0.1250 & 0-0.1250i & 0+0.1250i & 0-0.1250i & -0.1250 \\ 0.1250 & 0.1250 & -0.1250 & -0.1250 & 0.1250 & 0.1250 & 0+0.1250i & 0+0.1250i \\ 0.1250 & -0.1250 & 0.1250 & -0.1250 & 0+0.1250i & 0-0.1250i & -0.1250 & 0.1250 \end{bmatrix}$$

$$W\_co\_8Tx\_L\_8(:,:,2) = \begin{bmatrix} 0.1250 & 0.1250 & 0.1250 & 0.1250 & -0.1250 & -0.1250 & -0.1250 & -0.1250 \\ 0.1250 & -0.1250 & -0.1250 & 0.1250 & 0.1250 & -0.1250 & -0.1250 & 0.1250 \\ 0.1250 & 0.1250 & -0.1250 & -0.1250 & 0.1250 & 0.1250 & -0.1250 & -0.1250 \\ 0.1250 & -0.1250 & 0.1250 & -0.1250 & -0.1250 & 0.1250 & -0.1250 & 0.1250 \\ 0.1250 & 0.1250 & 0.1250 & 0.1250 & 0.1250 & 0.1250 & 0.1250 & 0.1250 \\ 0.1250 & -0.1250 & -0.1250 & 0.1250 & -0.1250 & 0.1250 & 0.1250 & -0.1250 \\ 0.1250 & 0.1250 & -0.1250 & -0.1250 & -0.1250 & -0.1250 & 0.1250 & 0.1250 \\ 0.1250 & -0.1250 & 0.1250 & -0.1250 & 0.1250 & -0.1250 & 0.1250 & -0.1250 \end{bmatrix}$$

$$W\_co\_8Tx\_L\_8(:,:,3) = \begin{bmatrix} 0.1250 & 0.1250 & 0.1250 & 0.1250 & 0+0.1250i & 0+0.1250i & -0.1250 & 0-0.1250i \\ 0.1250 & -0.1250 & -0.1250 & 0.1250 & 0-0.1250i & 0+0.1250i & 0.1250 & 0.1250 \\ 0.1250 & 0.1250 & -0.1250 & -0.1250 & 0+0.1250i & 0+0.1250i & 0.1250 & 0+0.1250i \\ 0.1250 & -0.1250 & 0.1250 & -0.1250 & 0-0.1250i & 0+0.1250i & -0.1250 & -0.1250 \\ 0.1250 & 0.1250 & 0.1250 & 0.1250 & 0-0.1250i & 0-0.1250i & 0.1250 & 0+0.1250i \\ 0.1250 & -0.1250 & -0.1250 & 0.1250 & 0+0.1250i & 0-0.1250i & -0.1250 & -0.1250 \\ 0.1250 & 0.1250 & -0.1250 & -0.1250 & 0-0.1250i & 0-0.1250i & -0.1250 & 0-0.1250i \\ 0.1250 & -0.1250 & 0.1250 & -0.1250 & 0+0.1250i & 0-0.1250i & 0.1250 & 0.1250 \end{bmatrix}$$

$$W\_co\_8Tx\_L\_8(:,:,4) = \begin{bmatrix} 0.1250 & 0.1250 & 0.1250 & 0.1250 & -0.1250 & -0.1250 & -0.1250 & -0.1250 \\ 0.1250 & -0.1250 & -0.1250 & 0.1250 & 0.1250 & -0.1250 & -0.1250 & 0.1250 \\ 0.1250 & 0.1250 & -0.1250 & -0.1250 & 0.1250 & 0.1250 & -0.1250 & -0.1250 \\ 0.1250 & -0.1250 & 0.1250 & -0.1250 & -0.1250 & 0.1250 & -0.1250 & 0.1250 \\ 0.1250 & 0.1250 & 0.1250 & 0.1250 & 0.1250 & 0.1250 & 0.1250 & 0.1250 \\ 0.1250 & -0.1250 & -0.1250 & 0.1250 & -0.1250 & 0.1250 & 0.1250 & -0.1250 \\ 0.1250 & 0.1250 & -0.1250 & -0.1250 & -0.1250 & -0.1250 & 0.1250 & 0.1250 \\ 0.1250 & -0.1250 & 0.1250 & -0.1250 & 0.1250 & -0.1250 & 0.1250 & -0.1250 \end{bmatrix}$$

TABLE 1-continued $$W\_co\_8Tx\_L\_8(:,:,5) = \begin{bmatrix} 0.1250 & 0.1250 & 0.1250 & 0.1250 & -0.1250 & -0.1250 & -0.1250 & 0.1250 \\ 0.1250 & 0.1250 & -0.1250 & -0.1250 & -0.1250 & -0.1250 & 0.1250 & 0.1250 \\ 0.1250 & -0.1250 & 0.1250 & -0.1250 & -0.1250 & 0.1250 & 0.1250 & 0.1250 \\ 0.1250 & -0.1250 & -0.1250 & 0.1250 & 0.1250 & -0.1250 & 0.1250 & 0.1250 \\ 0.1250 & 0.1250 & 0.1250 & 0.1250 & 0.1250 & 0.1250 & 0.1250 & -0.1250 \\ 0.1250 & 0.1250 & -0.1250 & -0.1250 & 0.1250 & 0.1250 & -0.1250 & -0.1250 \\ 0.1250 & -0.1250 & 0.1250 & -0.1250 & 0.1250 & -0.1250 & -0.1250 & -0.1250 \\ 0.1250 & -0.1250 & -0.1250 & 0.1250 & -0.1250 & 0.1250 & -0.1250 & -0.1250 \end{bmatrix}$$

$$W\_co\_8Tx\_L\_8(:,:,6) = \begin{bmatrix} 0.1250 & 0-0.1250i & -0.1250 & -0.1250 & 0+0.1250i & 0.1250 & 0.1250 & -0.1250 \\ 0+0.1250i & 0.1250 & 0+0.1250i & 0-0.1250i & 0.1250 & -0.1250 & 0.1250 & 0.1250 \\ -0.1250 & 0-0.1250i & 0.1250 & 0-0.1250i & 0+0.1250i & -0.1250 & 0.1250 & -0.1250 \\ 0-0.1250i & 0.1250 & 0-0.1250i & -0.1250 & 0+0.1250i & 0.1250 & -0.1250 & -0.1250 \\ 0.1250 & 0-0.1250i & -0.1250 & 0-0.1250i & 0+0.1250i & 0.1250 & 0.1250 & 0.1250 \\ 0+0.1250i & 0.1250 & 0+0.1250i & 0.1250 & 0+0.1250i & -0.1250 & 0.1250 & -0.1250 \\ -0.1250 & 0-0.1250i & 0.1250 & 0+0.1250i & 0+0.1250i & -0.1250 & -0.1250 & -0.1250 \\ 0-0.1250i & 0.1250 & 0-0.1250i & 0.1250 & 0+0.1250i & 0.1250 & -0.1250 & -0.1250 \end{bmatrix}$$

$$W\_co\_8Tx\_L\_8(:,:,7) = \begin{bmatrix} 0.1250 & 0-0.1250i & -0.1250 & 0+0.1250i & 0+0.1250i & -0.1250 & 0-0.1250i & 0-0.1250i \\ 0+0.1250i & 0.1250 & 0+0.1250i & 0.1250 & -0.1250 & 0-0.1250i & 0.1250 & 0.1250 \\ -0.1250 & 0-0.1250i & 0.1250 & 0-0.1250i & 0+0.1250i & 0.1250 & 0+0.1250i & 0+0.1250i \\ 0-0.1250i & -0.1250 & 0-0.1250i & 0.1250 & 0.1250 & 0+0.1250i & -0.1250 & -0.1250 \\ 0+0.1250i & 0.1250 & 0+0.1250i & 0.1250 & -0.1250 & 0-0.1250i & 0.1250 & 0.1250 \\ -0.1250 & 0+0.1250i & -0.1250 & 0+0.1250i & 0-0.1250i & -0.1250 & 0-0.1250i & 0-0.1250i \\ 0-0.1250i & -0.1250 & 0-0.1250i & -0.1250 & 0.1250 & 0+0.1250i & -0.1250 & -0.1250 \\ 0-0.1250i & 0.1250 & 0-0.1250i & -0.1250 & -0.1250 & 0-0.1250i & -0.1250 & -0.1250 \end{bmatrix}$$

$$W\_co\_8Tx\_L\_8(:,:,8) = \begin{bmatrix} 0.1250 & 0-0.1250i & -0.1250 & 0+0.1250i & 0+0.1250i & 0.1250 & 0-0.1250i & 0-0.1250i \\ 0+0.1250i & 0.1250 & 0+0.1250i & 0.1250 & 0-0.1250i & 0-0.1250i & -0.1250 & 0.1250 \\ -0.1250 & 0-0.1250i & 0.1250 & 0-0.1250i & 0+0.1250i & 0.1250 & 0+0.1250i & 0+0.1250i \\ 0-0.1250i & -0.1250 & 0-0.1250i & 0.1250 & 0+0.1250i & -0.1250 & 0.1250 & -0.1250 \\ 0+0.1250i & 0.1250 & 0+0.1250i & 0.1250 & 0-0.1250i & -0.1250 & 0+0.1250i & 0+0.1250i \\ -0.1250 & 0+0.1250i & -0.1250 & 0+0.1250i & 0-0.1250i & 0.1250 & 0-0.1250i & 0.1250 \\ 0-0.1250i & -0.1250 & 0-0.1250i & -0.1250 & -0.1250 & 0-0.1250i & -0.1250 & -0.1250 \\ 0-0.1250i & 0.1250 & 0-0.1250i & 0.1250 & -0.1250 & 0+0.1250i & -0.1250 & -0.1250 \end{bmatrix}$$

TABLE 1-continued $$W\_co\_8Tx\_L\_8(:,:,9) = \begin{bmatrix} 0.1250 & 0-0.1250i & -0.1250 & 0+0.1250i & 0.1250 & 0+0.1250i & 0.1250 & 0+0.1250i \\ 0+0.1250i & 0.1250 & 0+0.1250i & 0.1250 & 0-0.1250i & 0.1250 & 0+0.1250i & -0.1250 \\ -0.1250 & 0-0.1250i & 0.1250 & 0-0.1250i & 0.1250 & 0-0.1250i & 0.1250 & 0-0.1250i \\ 0-0.1250i & 0.1250 & 0-0.1250i & -0.1250 & 0-0.1250i & -0.1250 & 0-0.1250i & 0.1250 \\ 0.1250 & 0-0.1250i & -0.1250 & 0+0.1250i & -0.1250 & 0-0.1250i & -0.1250 & 0-0.1250i \\ 0+0.1250i & 0.1250 & 0+0.1250i & 0.1250 & 0+0.1250i & -0.1250 & 0-0.1250i & 0.1250 \\ -0.1250 & 0-0.1250i & 0.1250 & 0-0.1250i & -0.1250 & 0+0.1250i & -0.1250 & 0+0.1250i \\ 0-0.1250i & 0.1250 & 0-0.1250i & -0.1250 & 0+0.1250i & -0.1250 & 0+0.1250i & -0.1250 \end{bmatrix}$$

$$W\_co\_8Tx\_L\_8(:,:,10) = \begin{bmatrix} 0.1250 & -0.1250 & 0.1250 & -0.1250 & 0.1250 & 0+0.1250i & -0.1250 & 0-0.1250i \\ -0.1250 & 0.1250 & 0.1250 & -0.1250 & 0.1250 & 0-0.1250i & 0.1250 & 0-0.1250i \\ 0.1250 & 0.1250 & 0.1250 & 0.1250 & -0.1250 & 0+0.1250i & 0.1250 & 0+0.1250i \\ -0.1250 & -0.1250 & 0.1250 & 0.1250 & -0.1250 & 0-0.1250i & -0.1250 & 0+0.1250i \\ 0.1250 & -0.1250 & 0.1250 & -0.1250 & 0+0.1250i & -0.1250 & 0+0.1250i & -0.1250 \\ -0.1250 & 0.1250 & 0.1250 & -0.1250 & 0+0.1250i & 0.1250 & 0-0.1250i & -0.1250 \\ 0.1250 & 0.1250 & 0.1250 & 0.1250 & 0-0.1250i & -0.1250 & 0-0.1250i & -0.1250 \\ -0.1250 & -0.1250 & 0.1250 & 0.1250 & 0-0.1250i & 0.1250 & 0+0.1250i & -0.1250 \end{bmatrix}$$

$$W\_co\_8Tx\_L\_8(:,:,11) = \begin{bmatrix} 0.1250 & -0.1250 & -0.1250 & 0.1250 & 0.1250 & -0.1250 & -0.1250 & 0.1250 \\ -0.1250 & 0.1250 & 0.1250 & -0.1250 & 0.1250 & -0.1250 & -0.1250 & 0.1250 \\ 0.1250 & 0.1250 & -0.1250 & -0.1250 & 0.1250 & 0.1250 & -0.1250 & -0.1250 \\ -0.1250 & -0.1250 & 0.1250 & 0.1250 & 0.1250 & 0.1250 & -0.1250 & -0.1250 \\ 0.1250 & -0.1250 & -0.1250 & 0.1250 & -0.1250 & 0.1250 & 0.1250 & -0.1250 \\ -0.1250 & 0.1250 & 0.1250 & -0.1250 & -0.1250 & 0.1250 & 0.1250 & -0.1250 \\ 0.1250 & 0.1250 & -0.1250 & -0.1250 & -0.1250 & -0.1250 & 0.1250 & 0.1250 \\ -0.1250 & -0.1250 & 0.1250 & 0.1250 & -0.1250 & -0.1250 & 0.1250 & 0.1250 \end{bmatrix}$$

$$W\_co\_8Tx\_L\_8(:,:,12) = \begin{bmatrix} 0.1250 & -0.1250 & -0.1250 & 0.1250 & -0.1250 & 0.1250 & 0.1250 & -0.1250 \\ -0.1250 & 0.1250 & 0.1250 & -0.1250 & -0.1250 & 0.1250 & 0.1250 & -0.1250 \\ 0.1250 & 0.1250 & -0.1250 & -0.1250 & -0.1250 & -0.1250 & 0.1250 & 0.1250 \\ -0.1250 & -0.1250 & 0.1250 & 0.1250 & -0.1250 & -0.1250 & 0.1250 & 0.1250 \\ 0.1250 & -0.1250 & -0.1250 & 0.1250 & 0.1250 & -0.1250 & -0.1250 & 0.1250 \\ -0.1250 & 0.1250 & 0.1250 & -0.1250 & 0.1250 & -0.1250 & -0.1250 & 0.1250 \\ 0.1250 & 0.1250 & -0.1250 & -0.1250 & 0.1250 & 0.1250 & -0.1250 & -0.1250 \\ -0.1250 & -0.1250 & 0.1250 & 0.1250 & 0.1250 & 0.1250 & -0.1250 & -0.1250 \end{bmatrix}$$

TABLE 1-continued $$W\_co\_8Tx\_L\_8(:,:,13) = \begin{bmatrix} 0.1250 & 0+0.1250i & -0.1250 & 0-0.1250i & 0.1250 & 0+0.1250i & -0.1250 & 0-0.1250i \\ 0-0.1250i & 0.1250 & 0-0.1250i & -0.1250 & 0+0.1250i & 0.1250 & 0-0.1250i & -0.1250 \\ -0.1250 & 0+0.1250i & 0.1250 & 0-0.1250i & -0.1250 & 0+0.1250i & 0.1250 & 0-0.1250i \\ 0+0.1250i & 0.1250 & 0+0.1250i & -0.1250 & 0-0.1250i & 0.1250 & 0+0.1250i & -0.1250 \\ 0.1250 & 0+0.1250i & -0.1250 & 0-0.1250i & -0.1250 & 0-0.1250i & 0.1250 & 0+0.1250i \\ 0-0.1250i & 0.1250 & 0-0.1250i & -0.1250 & 0-0.1250i & -0.1250 & 0+0.1250i & 0.1250 \\ -0.1250 & 0+0.1250i & 0.1250 & 0-0.1250i & 0.1250 & 0-0.1250i & -0.1250 & 0+0.1250i \\ 0+0.1250i & 0.1250 & 0+0.1250i & -0.1250 & 0+0.1250i & -0.1250 & 0-0.1250i & 0.1250 \end{bmatrix}$$

$$W\_co\_8Tx\_L\_8(:,:,14) = \begin{bmatrix} 0.1250 & 0+0.1250i & -0.1250 & 0-0.1250i & 0.1250 & 0+0.1250i & -0.1250 & 0-0.1250i \\ 0-0.1250i & 0.1250 & 0-0.1250i & -0.1250 & 0+0.1250i & 0.1250 & 0-0.1250i & -0.1250 \\ -0.1250 & 0+0.1250i & 0.1250 & 0-0.1250i & -0.1250 & 0+0.1250i & 0.1250 & 0-0.1250i \\ 0+0.1250i & 0.1250 & 0+0.1250i & -0.1250 & 0-0.1250i & 0.1250 & 0+0.1250i & -0.1250 \\ -0.1250 & 0-0.1250i & 0.1250 & 0+0.1250i & 0.1250 & 0+0.1250i & -0.1250 & 0-0.1250i \\ 0+0.1250i & -0.1250 & 0+0.1250i & 0.1250 & 0-0.1250i & 0.1250 & 0-0.1250i & -0.1250 \\ 0.1250 & 0-0.1250i & -0.1250 & 0+0.1250i & -0.1250 & 0+0.1250i & 0.1250 & 0-0.1250i \\ 0-0.1250i & -0.1250 & 0-0.1250i & 0.1250 & 0+0.1250i & 0.1250 & 0+0.1250i & -0.1250 \end{bmatrix}$$

$$W\_co\_8Tx\_L\_8(:,:,15) = \begin{bmatrix} 0.1250 & 0.0884-0.0884i & 0-0.1250i & -0.0884-0.0884i & -0.0884-0.0884i & 0.1250 & -0.0884+0.0884i & 0+0.1250i \\ 0.0884+0.0884i & 0.1250 & -0.0884+0.0884i & 0+0.1250i & 0.0884-0.0884i & 0.1250 & -0.0884+0.0884i & -0.0884-0.0884i \\ 0+0.1250i & -0.0884-0.0884i & 0.1250 & 0.0884-0.0884i & 0-0.1250i & -0.0884-0.0884i & -0.1250 & 0.0884+0.0884i \\ -0.0884+0.0884i & 0+0.1250i & 0.0884+0.0884i & 0.1250 & 0+0.1250i & 0.0884+0.0884i & 0.1250 & -0.0884+0.0884i \\ 0.0884+0.0884i & 0.1250 & -0.0884+0.0884i & 0+0.1250i & 0.0884-0.0884i & -0.1250 & 0.0884-0.0884i & 0-0.1250i \\ 0+0.1250i & -0.0884-0.0884i & 0.1250 & 0.0884-0.0884i & -0.1250 & 0.0884-0.0884i & 0+0.1250i & 0.0884-0.0884i \\ -0.0884+0.0884i & 0+0.1250i & 0.0884+0.0884i & 0.1250 & -0.0884-0.0884i & 0-0.1250i & 0.0884-0.0884i & -0.1250 \end{bmatrix}$$

$$W\_co\_8Tx\_L\_8(:,:,16) = \begin{bmatrix} 0.1250 & 0.0884-0.0884i & 0-0.1250i & -0.0884-0.0884i & -0.0884-0.0884i & 0.1250 & -0.0884+0.0884i & 0+0.1250i \\ 0.0884+0.0884i & 0.1250 & -0.0884+0.0884i & 0+0.1250i & 0.0884-0.0884i & 0.1250 & -0.0884+0.0884i & -0.0884-0.0884i \\ 0+0.1250i & -0.0884-0.0884i & 0.1250 & 0.0884-0.0884i & 0-0.1250i & -0.0884-0.0884i & -0.1250 & 0.0884+0.0884i \\ -0.0884+0.0884i & 0+0.1250i & 0.0884+0.0884i & 0.1250 & 0+0.1250i & 0.0884+0.0884i & 0.1250 & -0.0884+0.0884i \\ -0.0884-0.0884i & -0.1250 & 0.0884-0.0884i & 0-0.1250i & 0.0884+0.0884i & 0+0.1250i & -0.0884-0.0884i & 0.1250 \\ -0.1250 & 0.0884-0.0884i & 0+0.1250i & 0.0884-0.0884i & 0.1250 & -0.0884+0.0884i & -0.0884-0.0884i & 0-0.1250i \\ 0-0.1250i & 0.0884+0.0884i & 0.1250 & -0.0884+0.0884i & -0.0884+0.0884i & -0.1250 & 0-0.1250i & -0.0884-0.0884i \\ 0.0884-0.0884i & 0-0.1250i & -0.0884-0.0884i & -0.1250 & 0+0.1250i & -0.0884-0.0884i & -0.1250 & 0.0884+0.0884i \end{bmatrix}$$

TABLE 1-continued $$W\_co\_8Tx\_L\_8(:,:,17) = \begin{bmatrix} 0.1250 & 0.0884-0.0884i & 0-0.1250i & -0.0884-0.0884i & 0.1250 & 0.0884+0.0884i & 0+0.1250i & -0.0884+0.0884i \\ -0.0884+0.0884i & 0.1250 & -0.0884+0.0884i & 0.1250 & 0.0884-0.0884i & -0.0884-0.0884i & 0-0.1250i \\ 0+0.1250i & -0.0884-0.0884i & 0.1250 & -0.0884+0.0884i & 0-0.1250i & 0.0884+0.0884i & 0.1250 & -0.0884-0.0884i \\ -0.0884-0.0884i & 0.1250 & -0.0884-0.0884i & 0.1250 & 0.0884+0.0884i & -0.1250 & -0.0884-0.0884i & 0.1250 \\ 0.1250 & 0.0884-0.0884i & 0-0.1250i & -0.0884-0.0884i & -0.1250 & -0.0884+0.0884i & 0+0.1250i & 0.0884+0.0884i \\ 0+0.1250i & 0.0884+0.0884i & -0.0884-0.0884i & -0.1250 & 0.0884-0.0884i & 0+0.1250i & -0.0884-0.0884i \\ -0.0884+0.0884i & 0-0.1250i & 0.0884+0.0884i & 0.1250 & 0.0884-0.0884i & 0-0.1250i & -0.0884+0.0884i & -0.1250 \\ -0.0884-0.0884i & 0-0.1250i & -0.0884+0.0884i & 0.1250 & 0.0884+0.0884i & 0+0.1250i & 0.0884-0.0884i & -0.1250 \end{bmatrix}$$

$$W\_co\_8Tx\_L\_8(:,:,18) = \begin{bmatrix} 0.1250 & -0.0884-0.0884i & 0+0.1250i & 0.0884-0.0884i & 0.1250 & -0.0884+0.0884i & 0-0.1250i & 0.0884+0.0884i \\ -0.0884+0.0884i & 0.1250 & 0.0884+0.0884i & 0+0.1250i & -0.0884-0.0884i & -0.1250 & 0.0884-0.0884i & 0-0.1250i \\ 0-0.1250i & 0.0884-0.0884i & 0.1250 & -0.0884-0.0884i & 0+0.1250i & -0.0884+0.0884i & -0.1250 & 0.0884+0.0884i \\ 0.0884+0.0884i & 0+0.1250i & -0.0884+0.0884i & 0.1250 & -0.0884-0.0884i & 0-0.1250i & 0.0884-0.0884i & -0.1250 \\ 0.1250 & -0.0884-0.0884i & 0+0.1250i & 0.0884-0.0884i & -0.1250 & 0.0884-0.0884i & 0+0.1250i & -0.0884-0.0884i \\ -0.0884-0.0884i & -0.1250 & 0.0884-0.0884i & 0-0.1250i & 0.0884+0.0884i & 0.1250 & -0.0884+0.0884i & 0+0.1250i \\ 0+0.1250i & -0.0884+0.0884i & -0.1250 & 0.0884+0.0884i & 0-0.1250i & 0.0884-0.0884i & 0.1250 & -0.0884-0.0884i \\ 0.0884+0.0884i & 0+0.1250i & -0.0884+0.0884i & -0.1250 & -0.0884-0.0884i & 0-0.1250i & 0.0884-0.0884i & -0.1250 \end{bmatrix}$$

$$W\_co\_8Tx\_L\_8(:,:,19) = \begin{bmatrix} 0.1250 & -0.0884-0.0884i & 0+0.1250i & 0.0884-0.0884i & 0.1250 & -0.0884+0.0884i & 0-0.1250i & 0.0884+0.0884i \\ 0.0884-0.0884i & 0.1250 & -0.0884-0.0884i & 0+0.1250i & 0.0884+0.0884i & -0.1250 & -0.0884+0.0884i & 0-0.1250i \\ 0+0.1250i & 0.0884+0.0884i & 0.1250 & -0.0884-0.0884i & 0-0.1250i & -0.0884-0.0884i & -0.1250 & 0.0884+0.0884i \\ -0.0884-0.0884i & 0+0.1250i & 0.0884-0.0884i & 0.1250 & -0.0884+0.0884i & 0-0.1250i & -0.0884-0.0884i & -0.1250 \\ 0.1250 & -0.0884-0.0884i & 0+0.1250i & 0.0884-0.0884i & -0.1250 & 0.0884-0.0884i & 0+0.1250i & -0.0884-0.0884i \\ 0.0884-0.0884i & 0.1250 & -0.0884-0.0884i & 0+0.1250i & -0.0884-0.0884i & 0.1250 & 0.0884-0.0884i & 0+0.1250i \\ 0+0.1250i & 0.0884+0.0884i & 0.1250 & -0.0884-0.0884i & 0+0.1250i & 0.0884+0.0884i & 0.1250 & -0.0884-0.0884i \\ 0.0884+0.0884i & 0+0.1250i & -0.0884+0.0884i & 0.1250 & -0.0884-0.0884i & 0-0.1250i & 0.0884-0.0884i & -0.1250 \end{bmatrix}$$

$$W\_co\_8Tx\_L\_8(:,:,20) = \begin{bmatrix} 0.1250 & -0.0884+0.0884i & 0-0.1250i & 0.0884+0.0884i & 0.1250 & -0.0884+0.0884i & 0-0.1250i & 0.0884+0.0884i \\ -0.0884-0.0884i & 0.1250 & -0.0884+0.0884i & 0-0.1250i & -0.0884-0.0884i & 0.1250 & -0.0884+0.0884i & 0-0.1250i \\ 0+0.1250i & 0.0884-0.0884i & 0.1250 & -0.0884+0.0884i & 0+0.1250i & 0.0884-0.0884i & 0.1250 & -0.0884+0.0884i \\ 0.0884-0.0884i & 0+0.1250i & 0.0884+0.0884i & 0.1250 & 0.0884-0.0884i & 0+0.1250i & 0.0884+0.0884i & 0.1250 \\ 0.1250 & -0.0884+0.0884i & 0-0.1250i & 0.0884+0.0884i & -0.1250 & 0.0884-0.0884i & 0+0.1250i & -0.0884-0.0884i \\ -0.0884-0.0884i & 0.1250 & -0.0884+0.0884i & 0-0.1250i & 0.0884+0.0884i & -0.1250 & 0.0884-0.0884i & 0+0.1250i \\ 0+0.1250i & 0.0884-0.0884i & 0.1250 & -0.0884+0.0884i & 0-0.1250i & -0.0884+0.0884i & -0.1250 & 0.0884+0.0884i \\ 0.0884-0.0884i & 0+0.1250i & 0.0884+0.0884i & 0.1250 & -0.0884+0.0884i & 0-0.1250i & -0.0884-0.0884i & -0.1250 \end{bmatrix}$$

TABLE 1-continued $$W\_co\_8Tx\_L\_8(:,:,21) = \begin{bmatrix} 0.1250 & 0.1250 & -0.1250 & -0.1250 & 0.1250 & 0.1250 & 0.1250 & 0-0.1250i \\ 0.1250 & 0.1250 & 0.1250 & 0.1250 & 0+0.1250i & 0.1250 & 0-0.1250i & -0.1250 \\ -0.1250 & 0.1250 & 0.1250 & -0.1250 & 0.1250 & -0.1250 & 0.1250 & 0+0.1250i \\ -0.1250 & -0.1250 & 0.1250 & -0.1250 & 0+0.1250i & -0.1250 & 0-0.1250i & 0.1250 \\ 0.1250 & 0.1250 & -0.1250 & -0.1250 & 0-0.1250i & 0+0.1250i & -0.1250 & 0+0.1250i \\ 0.1250 & 0.1250 & 0.1250 & 0.1250 & 0-0.1250i & 0-0.1250i & -0.1250 & 0.1250 \\ -0.1250 & 0.1250 & 0.1250 & -0.1250 & -0.1250 & 0-0.1250i & 0.1250 & 0-0.1250i \\ -0.1250 & -0.1250 & 0.1250 & -0.1250 & 0.1250 & 0+0.1250i & 0+0.1250i & -0.1250 \end{bmatrix}$$

$$W\_co\_8Tx\_L\_8(:,:,22) = \begin{bmatrix} 0.1250 & 0.1250 & -0.1250 & -0.1250 & 0.1250 & -0.1250 & -0.1250 & 0.1250 \\ 0.1250 & 0.1250 & 0.1250 & 0.1250 & -0.1250 & 0.1250 & -0.1250 & 0.1250 \\ -0.1250 & 0.1250 & 0.1250 & -0.1250 & -0.1250 & -0.1250 & 0.1250 & 0.1250 \\ -0.1250 & -0.1250 & 0.1250 & -0.1250 & 0.1250 & -0.1250 & 0.1250 & -0.1250 \\ 0.1250 & 0.1250 & -0.1250 & -0.1250 & -0.1250 & 0.1250 & 0.1250 & -0.1250 \\ 0.1250 & 0.1250 & 0.1250 & 0.1250 & 0.1250 & -0.1250 & 0.1250 & -0.1250 \\ -0.1250 & 0.1250 & 0.1250 & -0.1250 & 0.1250 & 0.1250 & -0.1250 & -0.1250 \\ -0.1250 & -0.1250 & 0.1250 & -0.1250 & -0.1250 & 0.1250 & -0.1250 & -0.1250 \end{bmatrix}$$

$$W\_co\_8Tx\_L\_8(:,:,23) = \begin{bmatrix} 0.1250 & 0.1250 & -0.1250 & -0.1250 & 0.1250 & 0+0.1250i & 0.1250 & 0+0.1250i \\ 0.1250 & 0.1250 & 0.1250 & 0.1250 & 0-0.1250i & 0.1250 & 0+0.1250i & -0.1250 \\ -0.1250 & 0.1250 & 0.1250 & -0.1250 & 0.1250 & 0-0.1250i & 0.1250 & 0-0.1250i \\ -0.1250 & -0.1250 & 0.1250 & -0.1250 & 0-0.1250i & -0.1250 & 0-0.1250i & 0.1250 \\ 0.1250 & 0.1250 & -0.1250 & -0.1250 & 0+0.1250i & -0.1250 & -0.1250 & 0.1250 \\ 0.1250 & 0.1250 & 0.1250 & 0.1250 & -0.1250 & 0+0.1250i & -0.1250 & 0.1250 \\ -0.1250 & 0.1250 & 0.1250 & -0.1250 & -0.1250 & 0+0.1250i & -0.1250 & 0+0.1250i \\ -0.1250 & -0.1250 & 0.1250 & -0.1250 & 0.1250 & 0.1250 & -0.1250 & -0.1250 \end{bmatrix}$$

TABLE 1-continued $$W\_co\_8Tx\_L\_8(:,:,24) = \begin{bmatrix} 0.1250 & 0-0.1250i & 0.1250 & 0-0.1250i & 0.1250 & 0-0.1250i & 0.1250 & -0.1250 \\ 0+0.1250i & 0.1250 & 0-0.1250i & -0.1250 & -0.1250i & 0.1250 & -0.1250 & 0.1250 \\ 0.1250 & 0+0.1250i & 0.1250 & 0+0.1250i & 0.1250 & 0-0.1250i & -0.1250 & 0.1250 \\ 0+0.1250i & -0.1250 & 0-0.1250i & 0.1250 & 0-0.1250i & 0.1250 & 0.1250 & -0.1250 \\ 0.1250 & 0-0.1250i & 0.1250 & 0-0.1250i & -0.1250 & 0+0.1250i & -0.1250 & 0+0.1250i \\ 0+0.1250i & 0.1250 & 0-0.1250i & -0.1250 & 0+0.1250i & 0.1250 & 0.1250 & -0.1250i \\ 0.1250 & 0+0.1250i & 0.1250 & 0+0.1250i & -0.1250 & 0+0.1250i & 0.1250 & -0.1250 \\ 0+0.1250i & -0.1250 & 0-0.1250i & 0.1250 & 0+0.1250i & -0.1250 & -0.1250 & -0.1250 \end{bmatrix}$$

$$W\_co\_8Tx\_L\_8(:,:,25) = \begin{bmatrix} 0.1250 & 0-0.1250i & 0.1250 & 0-0.1250i & 0.1250 & 0+0.1250i & 0.1250 & 0+0.1250i \\ 0+0.1250i & 0.1250 & 0-0.1250i & -0.1250 & 0+0.1250i & 0.1250 & 0-0.1250i & -0.1250 \\ 0.1250 & 0+0.1250i & 0.1250 & 0+0.1250i & 0.1250 & 0-0.1250i & 0.1250 & 0-0.1250i \\ 0+0.1250i & -0.1250 & 0-0.1250i & 0.1250 & 0-0.1250i & -0.1250 & 0+0.1250i & 0.1250 \\ 0.1250 & 0-0.1250i & 0.1250 & 0-0.1250i & -0.1250 & 0-0.1250i & -0.1250 & 0-0.1250i \\ 0+0.1250i & 0.1250 & 0-0.1250i & -0.1250 & 0-0.1250i & -0.1250 & 0+0.1250i & 0.1250 \\ 0.1250 & 0+0.1250i & 0.1250 & 0+0.1250i & -0.1250 & 0+0.1250i & -0.1250 & 0+0.1250i \\ 0+0.1250i & -0.1250 & 0-0.1250i & 0.1250 & 0+0.1250i & 0.1250 & 0-0.1250i & -0.1250 \end{bmatrix}$$

$$W\_co\_8Tx\_L\_8(:,:,26) = \begin{bmatrix} 0.1250 & -0.1250 & -0.1250 & 0.1250 & 0.1250 & -0.1250 & 0.1250 & 0+0.1250i \\ -0.1250 & 0.1250 & -0.1250 & 0.1250 & 0.1250 & 0-0.1250i & 0+0.1250i & -0.1250 \\ -0.1250 & -0.1250 & 0.1250 & 0.1250 & 0.1250 & 0-0.1250i & 0.1250 & 0-0.1250i \\ 0.1250 & 0.1250 & 0.1250 & 0.1250 & -0.1250 & 0+0.1250i & 0+0.1250i & 0.1250 \\ 0.1250 & -0.1250 & -0.1250 & 0.1250 & -0.1250 & 0-0.1250i & 0-0.1250i & 0-0.1250i \\ -0.1250 & 0.1250 & -0.1250 & 0.1250 & -0.1250 & 0+0.1250i & 0-0.1250i & 0.1250 \\ -0.1250 & -0.1250 & 0.1250 & 0.1250 & 0+0.1250i & -0.1250 & -0.1250 & 0+0.1250i \\ 0.1250 & 0.1250 & 0.1250 & 0.1250 & 0+0.1250i & 0.1250 & 0-0.1250i & -0.1250 \end{bmatrix}$$

Next, the case of $N<L_{co}<2N$ is assumed.

A matrix may be generated by eliminating column vectors of a number corresponding to $2N-L_{co}$ from a precoding matrix $W_{co}^{2N}$ produced when $L_{co}=2N$. A matrix is expressed by the following column vector: $W_{co}^{2N}=[W_{co}(1), W_{co}(2), \ldots W_{co}(2N)]$ (where $W_{co}(i)$ is a $2N\times1$ vector). Here, a criterion for removing the column vectors may be as follows.

1. Among column vectors from $N+1$ to $2N$, vectors are eliminated one by one in order of a small subspace distance in a subspace generated by vectors from 1 to N. This may be expressed by the following Equation 7:

$$\min_{N+1\leq j\leq 2N} d_{SSD}\{[W_{co}(1), \ldots, W_{co}(N)], W(j)\} \quad \text{[Equation 7]}$$

Alternatively, among column vectors from 1 to N, vectors may be eliminated one by one in order of a small subspace distance in a subspace generated by vectors from $N+1$ to $2N$. This may be expressed by the following Equation 9:

$$\min_{1\leq j\leq N} d_{SSD}\{[W_{co}(N+1), \ldots, W_{co}(2N)], W(j)\} \quad \text{[Equation 8]}$$

2.

$$\sqrt{\frac{2N}{L_{co}}}$$

is multiplied in front of a vector for energy normalization.

Thus, a multi-BS precoding matrix codebook when the number of transmission layers is 5 to 7 is generated by a method for eliminating column vectors one by one from a multi-BS precoding matrix codebook when the number of transmission layers is 8.

The following Table 2 shows a multi-BS precoding matrix codebook generated when each of two BSs has 4 antennas and the number of transmission layers is 7.

TABLE 2

$$W\_co\_8Tx\_L\_7(:,:,1) = \begin{bmatrix} 0.1336 & 0.1336 & 0.1336 & 0.1336 & 0-0.1336i & -0.1336 & 0+0.1336i \\ 0.1336 & 0.1336 & -0.1336 & -0.1336 & 0.1336 & 0+0.1336i & 0.1336 \\ 0.1336 & -0.1336 & 0.1336 & -0.1336 & 0-0.1336i & 0.1336 & 0+0.1336i \\ 0.1336 & -0.1336 & -0.1336 & 0.1336 & 0.1336 & 0-0.1336i & 0.1336 \\ 0.1336 & 0.1336 & 0.1336 & 0.1336 & 0+0.1336i & 0.1336 & 0-0.1336i \\ 0.1336 & 0.1336 & -0.1336 & -0.1336 & -0.1336 & 0-0.1336i & -0.1336 \\ 0.1336 & -0.1336 & 0.1336 & -0.1336 & 0+0.1336i & -0.1336 & 0-0.1336i \\ 0.1336 & -0.1336 & -0.1336 & 0.1336 & -0.1336 & 0+0.1336i & -0.1336 \end{bmatrix}$$

$$W\_co\_8Tx\_L\_7(:,:,2) = \begin{bmatrix} 0.1336 & 0.1336 & 0.1336 & 0.1336 & -0.1336 & 0.1336 & -0.1336 \\ 0.1336 & 0.1336 & -0.1336 & -0.1336 & 0.1336 & 0.1336 & -0.1336 \\ 0.1336 & -0.1336 & 0.1336 & -0.1336 & 0.1336 & 0.1336 & 0.1336 \\ 0.1336 & -0.1336 & -0.1336 & 0.1336 & -0.1336 & 0.1336 & 0.1336 \\ 0.1336 & 0.1336 & 0.1336 & 0.1336 & 0.1336 & -0.1336 & 0.1336 \\ 0.1336 & 0.1336 & -0.1336 & -0.1336 & -0.1336 & -0.1336 & 0.1336 \\ 0.1336 & -0.1336 & 0.1336 & -0.1336 & -0.1336 & -0.1336 & -0.1336 \\ 0.1336 & -0.1336 & -0.1336 & 0.1336 & 0.1336 & -0.1336 & -0.1336 \end{bmatrix}$$

$$W\_co\_8Tx\_L\_7(:,:,3) = \begin{bmatrix} 0.1336 & 0.1336 & 0.1336 & 0.1336 & 0+0.1336i & -0.1336 & 0-0.1336i \\ 0.1336 & 0.1336 & -0.1336 & -0.1336 & 0.1336 & 0-0.1336i & 0.1336 \\ 0.1336 & -0.1336 & 0.1336 & -0.1336 & 0+0.1336i & 0.1336 & 0-0.1336i \\ 0.1336 & -0.1336 & -0.1336 & 0.1336 & 0.1336 & 0+0.1336i & 0.1336 \\ 0.1336 & 0.1336 & 0.1336 & 0.1336 & 0-0.1336i & 0.1336 & 0+0.1336i \\ 0.1336 & 0.1336 & -0.1336 & -0.1336 & -0.1336 & 0+0.1336i & -0.1336 \\ 0.1336 & -0.1336 & 0.1336 & -0.1336 & 0-0.1336i & -0.1336 & 0+0.1336i \\ 0.1336 & -0.1336 & -0.1336 & 0.1336 & -0.1336 & 0-0.1336i & -0.1336 \end{bmatrix}$$

$$W\_co\_8Tx\_L\_7(:,:,4) = \begin{bmatrix} 0.1336 & 0.1336 & 0.1336 & 0.1336 & 0.1336 & -0.1336 & -0.1336 \\ 0.1336 & 0.1336 & -0.1336 & -0.1336 & 0.1336 & 0.1336 & 0.1336 \\ 0.1336 & -0.1336 & 0.1336 & -0.1336 & 0.1336 & 0.1336 & -0.1336 \\ 0.1336 & -0.1336 & -0.1336 & 0.1336 & 0.1336 & -0.1336 & 0.1336 \\ 0.1336 & 0.1336 & 0.1336 & 0.1336 & -0.1336 & 0.1336 & 0.1336 \\ 0.1336 & 0.1336 & -0.1336 & -0.1336 & -0.1336 & -0.1336 & -0.1336 \\ 0.1336 & -0.1336 & 0.1336 & -0.1336 & -0.1336 & -0.1336 & 0.1336 \\ 0.1336 & -0.1336 & -0.1336 & 0.1336 & -0.1336 & 0.1336 & -0.1336 \end{bmatrix}$$

TABLE 2-continued $$W\_co\_8Tx\_L\_7(:,:,5) = \begin{bmatrix} 0.1336 & 0.1336 & 0.1336 & 0.1336 & -0.1336 & -0.1336 & 0.1336 \\ 0.1336 & 0.1336 & -0.1336 & -0.1336 & 0.1336 & -0.1336 & 0.1336 \\ 0.1336 & -0.1336 & 0.1336 & -0.1336 & -0.1336 & 0.1336 & 0.1336 \\ 0.1336 & -0.1336 & -0.1336 & 0.1336 & 0.1336 & 0.1336 & 0.1336 \\ 0.1336 & 0.1336 & 0.1336 & 0.1336 & 0.1336 & 0.1336 & -0.1336 \\ 0.1336 & 0.1336 & -0.1336 & -0.1336 & -0.1336 & 0.1336 & -0.1336 \\ 0.1336 & -0.1336 & 0.1336 & -0.1336 & 0.1336 & -0.1336 & -0.1336 \\ 0.1336 & -0.1336 & -0.1336 & 0.1336 & -0.1336 & -0.1336 & -0.1336 \end{bmatrix}$$

$$W\_co\_8Tx\_L\_7(:,:,6) = \begin{bmatrix} 0.1336 & 0-0.1336i & -0.1336 & 0+0.1336i & -0.1336 & 0.1336 & -0.1336 \\ 0+0.1336i & 0.1336 & 0+0.1336i & 0.1336 & 0.1336 & 0.1336 & -0.1336 \\ -0.1336 & 0-0.1336i & 0.1336 & 0+0.1336i & 0.1336 & 0.1336 & 0.1336 \\ 0-0.1336i & 0.1336 & 0-0.1336i & 0.1336 & -0.1336 & 0.1336 & 0.1336 \\ 0.1336 & 0-0.1336i & -0.1336 & 0+0.1336i & 0.1336 & -0.1336 & 0.1336 \\ 0+0.1336i & 0.1336 & 0+0.1336i & 0.1336 & -0.1336 & -0.1336 & 0.1336 \\ -0.1336 & 0-0.1336i & 0.1336 & 0+0.1336i & -0.1336 & -0.1336 & -0.1336 \\ 0-0.1336i & 0.1336 & 0-0.1336i & 0.1336 & 0.1336 & -0.1336 & -0.1336 \end{bmatrix}$$

$$W\_co\_8Tx\_L\_7(:,:,7) = \begin{bmatrix} 0.1336 & 0-0.1336i & -0.1336 & 0+0.1336i & 0+0.1336i & -0.1336 & 0-0.1336i \\ 0+0.1336i & 0.1336 & 0+0.1336i & 0.1336 & 0.1336 & 0-0.1336i & 0.1336 \\ -0.1336 & 0-0.1336i & 0.1336 & 0+0.1336i & 0+0.1336i & 0.1336 & 0-0.1336i \\ 0-0.1336i & 0.1336 & 0-0.1336i & 0.1336 & 0.1336 & 0+0.1336i & 0.1336 \\ 0.1336 & 0-0.1336i & -0.1336 & 0+0.1336i & 0-0.1336i & 0.1336 & 0+0.1336i \\ 0+0.1336i & 0.1336 & 0+0.1336i & 0.1336 & -0.1336 & 0+0.1336i & -0.1336 \\ -0.1336 & 0-0.1336i & 0.1336 & 0+0.1336i & 0-0.1336i & -0.1336 & 0+0.1336i \\ 0-0.1336i & 0.1336 & 0-0.1336i & 0.1336 & -0.1336 & 0-0.1336i & -0.1336 \end{bmatrix}$$

$$W\_co\_8Tx\_L\_7(:,:,8) = \begin{bmatrix} 0.1336 & 0-0.1336i & -0.1336 & 0+0.1336i & 0-0.1336i & 0.1336 & 0-0.1336i \\ 0+0.1336i & 0.1336 & 0+0.1336i & 0.1336 & 0.1336 & 0-0.1336i & -0.1336 \\ -0.1336 & 0-0.1336i & 0.1336 & 0+0.1336i & 0+0.1336i & 0.1336 & 0+0.1336i \\ 0-0.1336i & 0.1336 & 0-0.1336i & 0.1336 & -0.1336 & 0-0.1336i & 0.1336 \\ 0.1336 & 0-0.1336i & -0.1336 & 0+0.1336i & 0+0.1336i & -0.1336 & 0+0.1336i \\ 0+0.1336i & 0.1336 & 0+0.1336i & 0.1336 & -0.1336 & 0+0.1336i & 0.1336 \\ -0.1336 & 0-0.1336i & 0.1336 & 0+0.1336i & 0-0.1336i & -0.1336 & 0-0.1336i \\ 0-0.1336i & 0.1336 & 0-0.1336i & 0.1336 & 0.1336 & 0+0.1336i & -0.1336 \end{bmatrix}$$

$$W\_co\_8Tx\_L\_7(:,:,9) = \begin{bmatrix} 0.1336 & 0-0.1336i & -0.1336 & 0+0.1336i & 0+0.1336i & 0.1336 & 0+0.1336i \\ 0+0.1336i & 0.1336 & 0+0.1336i & 0.1336 & 0.1336 & 0+0.1336i & -0.1336 \\ -0.1336 & 0-0.1336i & 0.1336 & 0+0.1336i & 0-0.1336i & 0.1336 & 0-0.1336i \\ 0-0.1336i & 0.1336 & 0-0.1336i & 0.1336 & -0.1336 & 0+0.1336i & 0.1336 \\ 0.1336 & 0-0.1336i & -0.1336 & 0+0.1336i & 0-0.1336i & -0.1336 & 0-0.1336i \\ 0+0.1336i & 0.1336 & 0+0.1336i & 0.1336 & -0.1336 & 0-0.1336i & 0.1336 \\ -0.1336 & 0-0.1336i & 0.1336 & 0+0.1336i & 0+0.1336i & -0.1336 & 0+0.1336i \\ 0-0.1336i & 0.1336 & 0-0.1336i & 0.1336 & 0.1336 & 0-0.1336i & -0.1336 \end{bmatrix}$$

$$W\_co\_8Tx\_L\_7(:,:,10) = \begin{bmatrix} 0.1336 & -0.1336 & 0.1336 & -0.1336 & 0+0.1336i & -0.1336 & 0-0.1336i \\ -0.1336 & 0.1336 & 0.1336 & -0.1336 & 0.1336 & 0-0.1336i & 0.1336 \\ 0.1336 & 0.1336 & 0.1336 & 0.1336 & 0+0.1336i & 0.1336 & 0-0.1336i \\ -0.1336 & -0.1336 & 0.1336 & 0.1336 & 0.1336 & 0+0.1336i & 0.1336 \\ 0.1336 & -0.1336 & 0.1336 & -0.1336 & 0-0.1336i & 0.1336 & 0+0.1336i \\ -0.1336 & 0.1336 & 0.1336 & -0.1336 & -0.1336 & 0+0.1336i & -0.1336 \\ 0.1336 & 0.1336 & 0.1336 & 0.1336 & 0-0.1336i & -0.1336 & 0+0.1336i \\ -0.1336 & -0.1336 & 0.1336 & 0.1336 & -0.1336 & 0-0.1336i & -0.1336 \end{bmatrix}$$

TABLE 2-continued $$W\_co\_8Tx\_L\_7(:,:,11) = \begin{bmatrix} 0.1336 & -0.1336 & 0.1336 & -0.1336 & 0.1336 & -0.1336 & -0.1336 \\ -0.1336 & 0.1336 & 0.1336 & -0.1336 & 0.1336 & 0.1336 & 0.1336 \\ 0.1336 & 0.1336 & 0.1336 & 0.1336 & 0.1336 & 0.1336 & -0.1336 \\ -0.1336 & -0.1336 & 0.1336 & 0.1336 & 0.1336 & -0.1336 & 0.1336 \\ 0.1336 & -0.1336 & 0.1336 & -0.1336 & -0.1336 & 0.1336 & 0.1336 \\ -0.1336 & 0.1336 & 0.1336 & -0.1336 & -0.1336 & -0.1336 & -0.1336 \\ 0.1336 & 0.1336 & 0.1336 & 0.1336 & -0.1336 & -0.1336 & 0.1336 \\ -0.1336 & -0.1336 & 0.1336 & 0.1336 & -0.1336 & 0.1336 & -0.1336 \end{bmatrix}$$

$$W\_co\_8Tx\_L\_7(:,:,12) = \begin{bmatrix} 0.1336 & -0.1336 & 0.1336 & -0.1336 & -0.1336 & -0.1336 & 0.1336 \\ -0.1336 & 0.1336 & 0.1336 & -0.1336 & 0.1336 & -0.1336 & 0.1336 \\ 0.1336 & 0.1336 & 0.1336 & 0.1336 & -0.1336 & 0.1336 & 0.1336 \\ -0.1336 & -0.1336 & 0.1336 & 0.1336 & 0.1336 & 0.1336 & 0.1336 \\ 0.1336 & -0.1336 & 0.1336 & -0.1336 & 0.1336 & 0.1336 & -0.1336 \\ -0.1336 & 0.1336 & 0.1336 & -0.1336 & -0.1336 & 0.1336 & -0.1336 \\ 0.1336 & 0.1336 & 0.1336 & 0.1336 & 0.1336 & -0.1336 & -0.1336 \\ -0.1336 & -0.1336 & 0.1336 & 0.1336 & -0.1336 & -0.1336 & -0.1336 \end{bmatrix}$$

$$W\_co\_8Tx\_L\_7(:,:,13) = \begin{bmatrix} 0.1336 & 0+0.1336i & -0.1336 & 0-0.1336i & 0-0.1336i & 0.1336 & 0-0.1336i \\ 0-0.1336i & 0.1336 & 0-0.1336i & 0.1336 & 0.1336 & 0-0.1336i & -0.1336 \\ -0.1336 & 0+0.1336i & 0.1336 & 0-0.1336i & 0+0.1336i & 0.1336 & 0+0.1336i \\ 0+0.1336i & 0.1336 & 0+0.1336i & 0.1336 & -0.1336 & 0-0.1336i & 0.1336 \\ 0.1336 & 0+0.1336i & -0.1336 & 0-0.1336i & 0+0.1336i & -0.1336 & 0+0.1336i \\ 0-0.1336i & 0.1336 & 0-0.1336i & 0.1336 & -0.1336 & 0+0.1336i & 0.1336 \\ -0.1336 & 0+0.1336i & 0.1336 & 0-0.1336i & 0-0.1336i & -0.1336 & 0-0.1336i \\ 0+0.1336i & 0.1336 & 0+0.1336i & 0.1336 & 0.1336 & 0+0.1336i & -0.1336 \end{bmatrix}$$

$$W\_co\_8Tx\_L\_7(:,:,14) = \begin{bmatrix} 0.1336 & 0+0.1336i & -0.1336 & 0-0.1336i & 0+0.1336i & 0.1336 & 0+0.1336i \\ 0-0.1336i & 0.1336 & 0-0.1336i & 0.1336 & 0.1336 & 0+0.1336i & -0.1336 \\ -0.1336 & 0+0.1336i & 0.1336 & 0-0.1336i & 0-0.1336i & 0.1336 & 0-0.1336i \\ 0+0.1336i & 0.1336 & 0+0.1336i & 0.1336 & -0.1336 & 0+0.1336i & 0.1336 \\ 0.1336 & 0+0.1336i & -0.1336 & 0-0.1336i & 0-0.1336i & -0.1336 & 0-0.1336i \\ 0-0.1336i & 0.1336 & 0-0.1336i & 0.1336 & -0.1336 & 0-0.1336i & 0.1336 \\ -0.1336 & 0+0.1336i & 0.1336 & 0-0.1336i & 0+0.1336i & -0.1336 & 0+0.1336i \\ 0+0.1336i & 0.1336 & 0+0.1336i & 0.1336 & 0.1336 & 0-0.1336i & -0.1336 \end{bmatrix}$$

$W\_co\_8Tx\_L\_7(:,:,15) =$ $$\begin{bmatrix} 0.1336 & 0.0945-0.0945i & 0-0.1336i & -0.0945-0.0945i & -0.0945-0.0945i & 0+0.1336i & 0.0945-0.0945i \\ 0.0945+0.0945i & 0.1336 & -0.0945+0.0945i & 0+0.1336i & 0.1336 & 0.0945+0.0945i & 0-0.1336i \\ 0+0.1336i & -0.0945-0.0945i & 0.1336 & -0.0945+0.0945i & 0.0945-0.0945i & 0.1336 & 0.0945+0.0945i \\ -0.0945+0.0945i & 0-0.1336i & -0.0945-0.0945i & 0.1336 & 0+0.1336i & 0.0945-0.0945i & 0.1336 \\ 0.1336 & 0.0945-0.0945i & 0-0.1336i & -0.0945-0.0945i & 0.0945+0.0945i & 0-0.1336i & -0.0945+0.0945i \\ 0.0945+0.0945i & 0.1336 & -0.0945+0.0945i & 0+0.1336i & -0.1336 & -0.0945-0.0945i & 0+0.1336i \\ 0+0.1336i & -0.0945-0.0945i & 0.1336 & -0.0945+0.0945i & -0.0945+0.0945i & -0.1336 & -0.0945-0.0945i \\ -0.0945+0.0945i & 0-0.1336i & -0.0945-0.0945i & 0.1336 & 0-0.1336i & -0.0945+0.0945i & -0.1336 \end{bmatrix}$$

$W\_co\_8Tx\_L\_7(:,:,16) =$ $$\begin{bmatrix} 0.1336 & 0.0945-0.0945i & 0-0.1336i & -0.0945-0.0945i & -0.0945+0.0945i & 0-0.1336i & 0.0945+0.0945i \\ 0.0945+0.0945i & 0.1336 & -0.0945+0.0945i & 0+0.1336i & 0.1336 & 0.0945-0.0945i & 0+0.1336i \\ 0+0.1336i & -0.0945-0.0945i & 0.1336 & -0.0945+0.0945i & 0.0945+0.0945i & 0.1336 & 0.0945-0.0945i \\ -0.0945+0.0945i & 0-0.1336i & -0.0945-0.0945i & 0.1336 & 0-0.1336i & 0.0945+0.0945i & 0.1336 \\ 0.1336 & 0.0945-0.0945i & 0-0.1336i & -0.0945-0.0945i & 0.0945-0.0945i & 0+0.1336i & -0.0945-0.0945i \\ 0.0945+0.0945i & 0.1336 & -0.0945+0.0945i & 0+0.1336i & -0.1336 & -0.0945+0.0945i & 0-0.1336i \\ 0+0.1336i & -0.0945-0.0945i & 0.1336 & -0.0945+0.0945i & -0.0945-0.0945i & -0.1336 & -0.0945+0.0945i \\ -0.0945+0.0945i & 0-0.1336i & -0.0945-0.0945i & 0.1336 & 0+0.1336i & -0.0945-0.0945i & -0.1336 \end{bmatrix}$$

TABLE 2-continued $W\_co\_8Tx\_L\_7(:,:,17) =$ $$\begin{bmatrix} 0.1336 & 0.0945 - 0.0945i & 0 - 0.1336i & -0.0945 - 0.0945i & 0.0945 + 0.0945i & 0 + 0.1336i & -0.0945 + 0.0945i \\ 0.0945 + 0.0945i & 0.1336 & -0.0945 + 0.0945i & 0 + 0.1336i & 0.1336 & -0.0945 - 0.0945i & 0 - 0.1336i \\ 0 + 0.1336i & -0.0945 - 0.0945i & 0.1336 & -0.0945 + 0.0945i & -0.0945 + 0.0945i & 0.1336 & -0.0945 - 0.0945i \\ -0.0945 + 0.0945i & 0 - 0.1336i & -0.0945 - 0.0945i & 0.1336 & 0 + 0.1336i & -0.0945 + 0.0945i & 0.1336 \\ 0.1336 & 0.0945 - 0.0945i & 0 - 0.1336i & -0.0945 - 0.0945i & -0.0945 - 0.0945i & 0 - 0.1336i & 0.0945 - 0.0945i \\ 0.0945 + 0.0945i & 0.1336 & -0.0945 + 0.0945i & 0 + 0.1336i & -0.1336 & 0.0945 + 0.0945i & 0 + 0.1336i \\ 0 + 0.1336i & -0.0945 - 0.0945i & 0.1336 & -0.0945 + 0.0945i & 0.0945 - 0.0945i & -0.1336 & 0.0945 + 0.0945i \\ -0.0945 + 0.0945i & 0 - 0.1336i & -0.0945 - 0.0945i & 0.1336 & 0 - 0.1336i & 0.0945 - 0.0945i & -0.1336 \end{bmatrix}$$

$W\_co\_8Tx\_L\_7(:,:,18) =$ $$\begin{bmatrix} 0.1336 & -0.0945 - 0.0945i & 0 + 0.1336i & 0.0945 - 0.0945i & -0.0945 + 0.0945i & 0 - 0.1336i & 0.0945 + 0.0945i \\ -0.0945 + 0.0945i & 0.1336 & 0.0945 + 0.0945i & 0 - 0.1336i & 0.1336 & 0.0945 - 0.0945i & 0 + 0.1336i \\ 0 - 0.1336i & 0.0945 - 0.0945i & 0.1336 & 0.0945 + 0.0945i & 0.0945 + 0.0945i & 0.1336 & 0.0945 - 0.0945i \\ 0.0945 + 0.0945i & 0 + 0.1336i & 0.0945 - 0.0945i & 0.1336 & 0 - 0.1336i & 0.0945 + 0.0945i & 0.1336 \\ 0.1336 & -0.0945 - 0.0945i & 0 + 0.1336i & 0.0945 - 0.0945i & 0.0945 - 0.0945i & 0 + 0.1336i & -0.0945 - 0.0945i \\ -0.0945 + 0.0945i & 0.1336 & 0.0945 + 0.0945i & 0 - 0.1336i & -0.1336 & -0.0945 + 0.0945i & 0 - 0.1336i \\ 0 - 0.1336i & 0.0945 - 0.0945i & 0.1336 & 0.0945 + 0.0945i & -0.0945 - 0.0945i & -0.1336 & -0.0945 + 0.0945i \\ 0.0945 + 0.0945i & 0 + 0.1336i & 0.0945 - 0.0945i & 0.1336 & 0 + 0.1336i & -0.0945 - 0.0945i & -0.1336 \end{bmatrix}$$

$W\_co\_8Tx\_L\_7(:,:,19) =$ $$\begin{bmatrix} 0.1336 & -0.0945 - 0.0945i & 0 + 0.1336i & 0.0945 - 0.0945i & 0.0945 + 0.0945i & 0 + 0.1336i & -0.0945 + 0.0945i \\ -0.0945 + 0.0945i & 0.1336 & 0.0945 + 0.0945i & 0 - 0.1336i & 0.1336 & -0.0945 - 0.0945i & 0 - 0.1336i \\ 0 - 0.1336i & 0.0945 - 0.0945i & 0.1336 & 0.0945 + 0.0945i & -0.0945 + 0.0945i & 0.1336 & -0.0945 - 0.0945i \\ 0.0945 + 0.0945i & 0 + 0.1336i & 0.0945 - 0.0945i & 0.1336 & 0 + 0.1336i & -0.0945 + 0.0945i & 0.1336 \\ 0.1336 & -0.0945 - 0.0945i & 0 + 0.1336i & 0.0945 - 0.0945i & -0.0945 - 0.0945i & 0 - 0.1336i & 0.0945 - 0.0945i \\ -0.0945 + 0.0945i & 0.1336 & 0.0945 + 0.0945i & 0 - 0.1336i & -0.1336 & 0.0945 + 0.0945i & 0 + 0.1336i \\ 0 - 0.1336i & 0.0945 - 0.0945i & 0.1336 & 0.0945 + 0.0945i & 0.0945 - 0.0945i & -0.1336 & 0.0945 + 0.0945i \\ 0.0945 + 0.0945i & 0 + 0.1336i & 0.0945 - 0.0945i & 0.1336 & 0 - 0.1336i & 0.0945 - 0.0945i & -0.1336 \end{bmatrix}$$

$W\_co\_8Tx\_L\_7(:,:,20) =$ $$\begin{bmatrix} 0.1336 & -0.0945 + 0.0945i & 0 - 0.1336i & 0.0945 + 0.0945i & 0.0945 - 0.0945i & 0 + 0.1336i & -0.0945 + 0.0945i \\ -0.0945 - 0.0945i & 0.1336 & 0.0945 - 0.0945i & 0 + 0.1336i & 0.1336 & -0.0945 - 0.0945i & 0 - 0.1336i \\ 0 + 0.1336i & 0.0945 + 0.0945i & 0.1336 & 0.0945 - 0.0945i & -0.0945 + 0.0945i & 0.1336 & -0.0945 - 0.0945i \\ 0.0945 - 0.0945i & 0 - 0.1336i & 0.0945 + 0.0945i & 0.1336 & 0 + 0.1336i & -0.0945 + 0.0945i & 0.1336 \\ 0.1336 & -0.0945 + 0.0945i & 0 - 0.1336i & 0.0945 + 0.0945i & -0.0945 - 0.0945i & 0 - 0.1336i & 0.0945 - 0.0945i \\ -0.0945 - 0.0945i & 0.1336 & 0.0945 - 0.0945i & 0 + 0.1336i & -0.1336 & 0.0945 + 0.0945i & 0 + 0.1336i \\ 0 + 0.1336i & 0.0945 + 0.0945i & 0.1336 & 0.0945 - 0.0945i & 0.0945 - 0.0945i & -0.1336 & 0.0945 + 0.0945i \\ 0.0945 - 0.0945i & 0 - 0.1336i & 0.0945 + 0.0945i & 0.1336 & 0 - 0.1336i & 0.0945 - 0.0945i & -0.1336 \end{bmatrix}$$

$W\_co\_8Tx\_L\_7(:,:,21) = \begin{bmatrix} 0.1336 & 0.1336 & -0.1336 & -0.1336 & 0 - 0.1336i & 0.1336 & 0 - 0.1336i \\ 0.1336 & 0.1336 & 0.1336 & 0.1336 & 0.1336 & 0 - 0.1336i & -0.1336 \\ -0.1336 & 0.1336 & 0.1336 & -0.1336 & 0 + 0.1336i & 0.1336 & 0 + 0.1336i \\ -0.1336 & 0.1336 & -0.1336 & 0.1336 & -0.1336 & 0 - 0.1336i & 0.1336 \\ 0.1336 & 0.1336 & -0.1336 & -0.1336 & 0 + 0.1336i & -0.1336 & 0 + 0.1336i \\ 0.1336 & 0.1336 & 0.1336 & 0.1336 & -0.1336 & 0 + 0.1336i & 0.1336 \\ -0.1336 & 0.1336 & 0.1336 & -0.1336 & 0 - 0.1336i & -0.1336 & 0 - 0.1336i \\ -0.1336 & 0.1336 & -0.1336 & 0.1336 & 0.1336 & 0 + 0.1336i & -0.1336 \end{bmatrix}$ TABLE 2-continued $$W\_co\_8Tx\_L\_7(:,:,22) = \begin{bmatrix} 0.1336 & 0.1336 & -0.1336 & -0.1336 & -0.1336 & -0.1336 & 0.1336 \\ 0.1336 & 0.1336 & 0.1336 & 0.1336 & 0.1336 & -0.1336 & 0.1336 \\ -0.1336 & 0.1336 & 0.1336 & -0.1336 & -0.1336 & 0.1336 & 0.1336 \\ -0.1336 & 0.1336 & -0.1336 & 0.1336 & 0.1336 & 0.1336 & 0.1336 \\ 0.1336 & 0.1336 & -0.1336 & -0.1336 & 0.1336 & 0.1336 & -0.1336 \\ 0.1336 & 0.1336 & 0.1336 & 0.1336 & -0.1336 & 0.1336 & -0.1336 \\ -0.1336 & 0.1336 & 0.1336 & -0.1336 & 0.1336 & -0.1336 & -0.1336 \\ -0.1336 & 0.1336 & -0.1336 & 0.1336 & -0.1336 & -0.1336 & -0.1336 \end{bmatrix}$$

$$W\_co\_8Tx\_L\_7(:,:,23) = \begin{bmatrix} 0.1336 & 0.1336 & -0.1336 & -0.1336 & 0+0.1336i & 0.1336 & 0+0.1336i \\ 0.1336 & 0.1336 & 0.1336 & 0.1336 & 0.1336 & 0+0.1336i & -0.1336 \\ -0.1336 & 0.1336 & 0.1336 & -0.1336 & 0-0.1336i & 0.1336 & 0-0.1336i \\ -0.1336 & 0.1336 & -0.1336 & 0.1336 & -0.1336 & 0+0.1336i & 0.1336 \\ 0.1336 & 0.1336 & -0.1336 & -0.1336 & 0-0.1336i & -0.1336 & 0-0.1336i \\ 0.1336 & 0.1336 & 0.1336 & 0.1336 & -0.1336 & 0-0.1336i & 0.1336 \\ -0.1336 & 0.1336 & 0.1336 & -0.1336 & 0+0.1336i & -0.1336 & 0+0.1336i \\ -0.1336 & 0.1336 & -0.1336 & 0.1336 & 0.1336 & 0-0.1336i & -0.1336 \end{bmatrix}$$

$$W\_co\_8Tx\_L\_7(:,:,24) = \begin{bmatrix} 0.1336 & 0-0.1336i & 0.1336 & 0-0.1336i & -0.1336 & -0.1336 & 0.1336 \\ 0+0.1336i & 0.1336 & 0-0.1336i & -0.1336 & 0.1336 & -0.1336 & 0.1336 \\ 0.1336 & 0+0.1336i & 0.1336 & 0+0.1336i & -0.1336 & 0.1336 & 0.1336 \\ 0+0.1336i & -0.1336 & 0-0.1336i & 0.1336 & 0.1336 & 0.1336 & 0.1336 \\ 0.1336 & 0-0.1336i & 0.1336 & 0-0.1336i & 0.1336 & 0.1336 & -0.1336 \\ 0+0.1336i & 0.1336 & 0-0.1336i & -0.1336 & -0.1336 & 0.1336 & -0.1336 \\ 0.1336 & 0+0.1336i & 0.1336 & 0+0.1336i & 0.1336 & -0.1336 & -0.1336 \\ 0+0.1336i & -0.1336 & 0-0.1336i & 0.1336 & -0.1336 & -0.1336 & -0.1336 \end{bmatrix}$$

$$W\_co\_8Tx\_L\_7(:,:,25) = \begin{bmatrix} 0.1336 & 0-0.1336i & 0.1336 & 0-0.1336i & 0+0.1336i & 0.1336 & 0+0.1336i \\ 0+0.1336i & 0.1336 & 0-0.1336i & -0.1336 & 0.1336 & 0+0.1336i & -0.1336 \\ 0.1336 & 0+0.1336i & 0.1336 & 0+0.1336i & 0-0.1336i & 0.1336 & 0-0.1336i \\ 0+0.1336i & -0.1336 & 0-0.1336i & 0.1336 & -0.1336 & 0+0.1336i & 0.1336 \\ 0.1336 & 0-0.1336i & 0.1336 & 0-0.1336i & 0-0.1336i & -0.1336 & 0-0.1336i \\ 0+0.1336i & 0.1336 & 0-0.1336i & -0.1336 & -0.1336 & 0-0.1336i & 0.1336 \\ 0.1336 & 0+0.1336i & 0.1336 & 0+0.1336i & 0+0.1336i & -0.1336 & 0+0.1336i \\ 0+0.1336i & -0.1336 & 0-0.1336i & 0.1336 & 0.1336 & 0-0.1336i & -0.1336 \end{bmatrix}$$

$$W\_co\_8Tx\_L\_7(:,:,26) = \begin{bmatrix} 0.1336 & -0.1336 & -0.1336 & 0.1336 & 0+0.1336i & 0.1336 & 0+0.1336i \\ -0.1336 & 0.1336 & -0.1336 & 0.1336 & 0.1336 & 0+0.1336i & -0.1336 \\ -0.1336 & -0.1336 & 0.1336 & 0.1336 & 0-0.1336i & 0.1336 & 0-0.1336i \\ 0.1336 & 0.1336 & 0.1336 & 0.1336 & -0.1336 & 0+0.1336i & 0.1336 \\ 0.1336 & -0.1336 & -0.1336 & 0.1336 & 0-0.1336i & -0.1336 & 0-0.1336i \\ -0.1336 & 0.1336 & -0.1336 & 0.1336 & -0.1336 & 0-0.1336i & 0.1336 \\ -0.1336 & -0.1336 & 0.1336 & 0.1336 & 0+0.1336i & -0.1336 & 0+0.1336i \\ 0.1336 & 0.1336 & 0.1336 & 0.1336 & 0.1336 & 0-0.1336i & -0.1336 \end{bmatrix}$$

The following Table 3 shows a multi-BS precoding matrix codebook generated when each of two BSs has 4 antennas and the number of transmission layers is 6.

TABLE 3

$$W\_co\_8Tx\_L\_6(:,:,1) = \begin{bmatrix} 0.1443 & 0.1443 & 0.1443 & 0.1443 & -0.1443 & 0+0.1443i \\ 0.1443 & 0.1443 & -0.1443 & -0.1443 & 0+0.1443i & 0.1443 \\ 0.1443 & -0.1443 & 0.1443 & -0.1443 & 0.1443 & 0+0.1443i \\ 0.1443 & -0.1443 & -0.1443 & 0.1443 & 0-0.1443i & 0.1443 \\ 0.1443 & 0.1443 & 0.1443 & 0.1443 & 0.1443 & 0-0.1443i \\ 0.1443 & 0.1443 & -0.1443 & -0.1443 & 0-0.1443i & -0.1443 \\ 0.1443 & -0.1443 & 0.1443 & -0.1443 & -0.1443 & 0-0.1443i \\ 0.1443 & -0.1443 & -0.1443 & 0.1443 & 0+0.1443i & -0.1443 \end{bmatrix}$$

$$W\_co\_8Tx\_L\_6(:,:,2) = \begin{bmatrix} 0.1443 & 0.1443 & 0.1443 & 0.1443 & 0.1443 & -0.1443 \\ 0.1443 & 0.1443 & -0.1443 & -0.1443 & 0.1443 & -0.1443 \\ 0.1443 & -0.1443 & 0.1443 & -0.1443 & 0.1443 & 0.1443 \\ 0.1443 & -0.1443 & -0.1443 & 0.1443 & 0.1443 & 0.1443 \\ 0.1443 & 0.1443 & 0.1443 & 0.1443 & -0.1443 & 0.1443 \\ 0.1443 & 0.1443 & -0.1443 & -0.1443 & -0.1443 & 0.1443 \\ 0.1443 & -0.1443 & 0.1443 & -0.1443 & -0.1443 & -0.1443 \\ 0.1443 & -0.1443 & -0.1443 & 0.1443 & -0.1443 & -0.1443 \end{bmatrix}$$

$$W\_co\_8Tx\_L\_6(:,:,3) = \begin{bmatrix} 0.1443 & 0.1443 & 0.1443 & 0.1443 & -0.1443 & 0-0.1443i \\ 0.1443 & 0.1443 & -0.1443 & -0.1443 & 0-0.1443i & 0.1443 \\ 0.1443 & -0.1443 & 0.1443 & -0.1443 & 0.1443 & 0-0.1443i \\ 0.1443 & -0.1443 & -0.1443 & 0.1443 & 0+0.1443i & 0.1443 \\ 0.1443 & 0.1443 & 0.1443 & 0.1443 & 0.1443 & 0+0.1443i \\ 0.1443 & 0.1443 & -0.1443 & -0.1443 & 0+0.1443i & -0.1443 \\ 0.1443 & -0.1443 & 0.1443 & -0.1443 & -0.1443 & 0+0.1443i \\ 0.1443 & -0.1443 & -0.1443 & 0.1443 & 0-0.1443i & -0.1443 \end{bmatrix}$$

$$W\_co\_8Tx\_L\_6(:,:,4) = \begin{bmatrix} 0.1443 & 0.1443 & 0.1443 & 0.1443 & -0.1443 & -0.1443 \\ 0.1443 & 0.1443 & -0.1443 & -0.1443 & 0.1443 & 0.1443 \\ 0.1443 & -0.1443 & 0.1443 & -0.1443 & 0.1443 & -0.1443 \\ 0.1443 & -0.1443 & -0.1443 & 0.1443 & -0.1443 & 0.1443 \\ 0.1443 & 0.1443 & 0.1443 & 0.1443 & 0.1443 & 0.1443 \\ 0.1443 & 0.1443 & -0.1443 & -0.1443 & -0.1443 & -0.1443 \\ 0.1443 & -0.1443 & 0.1443 & -0.1443 & -0.1443 & 0.1443 \\ 0.1443 & -0.1443 & -0.1443 & 0.1443 & 0.1443 & -0.1443 \end{bmatrix}$$

$$W\_co\_8Tx\_L\_6(:,:,5) = \begin{bmatrix} 0.1443 & 0.1443 & 0.1443 & 0.1443 & -0.1443 & 0.1443 \\ 0.1443 & 0.1443 & -0.1443 & -0.1443 & -0.1443 & 0.1443 \\ 0.1443 & -0.1443 & 0.1443 & -0.1443 & 0.1443 & 0.1443 \\ 0.1443 & -0.1443 & -0.1443 & 0.1443 & 0.1443 & 0.1443 \\ 0.1443 & 0.1443 & 0.1443 & 0.1443 & 0.1443 & -0.1443 \\ 0.1443 & 0.1443 & -0.1443 & -0.1443 & 0.1443 & -0.1443 \\ 0.1443 & -0.1443 & 0.1443 & -0.1443 & -0.1443 & -0.1443 \\ 0.1443 & -0.1443 & -0.1443 & 0.1443 & -0.1443 & -0.1443 \end{bmatrix}$$

$$W\_co\_8Tx\_L\_6(:,:,6) = \begin{bmatrix} 0.1443 & 0-0.1443i & -0.1443 & 0+0.1443i & 0.1443 & -0.1443 \\ 0+0.1443i & 0.1443 & 0+0.1443i & 0.1443 & 0.1443 & -0.1443 \\ -0.1443 & 0-0.1443i & 0.1443 & 0+0.1443i & 0.1443 & 0.1443 \\ 0-0.1443i & 0.1443 & 0-0.1443i & 0.1443 & 0.1443 & 0.1443 \\ 0.1443 & 0-0.1443i & -0.1443 & 0+0.1443i & -0.1443 & 0.1443 \\ 0+0.1443i & 0.1443 & 0+0.1443i & 0.1443 & -0.1443 & 0.1443 \\ -0.1443 & 0-0.1443i & 0.1443 & 0+0.1443i & -0.1443 & -0.1443 \\ 0-0.1443i & 0.1443 & 0-0.1443i & 0.1443 & -0.1443 & -0.1443 \end{bmatrix}$$

TABLE 3-continued $$W\_co\_8Tx\_L\_6(:,:,7) = \begin{bmatrix} 0.1443 & 0-0.1443i & -0.1443 & 0+0.1443i & -0.1443 & 0-0.1443i \\ 0+0.1443i & 0.1443 & 0+0.1443i & 0.1443 & 0-0.1443i & 0.1443 \\ -0.1443 & 0-0.1443i & 0.1443 & 0+0.1443i & 0.1443 & 0-0.1443i \\ 0-0.1443i & 0.1443 & 0-0.1443i & 0.1443 & 0+0.1443i & 0.1443 \\ 0.1443 & 0-0.1443i & -0.1443 & 0+0.1443i & 0.1443 & 0+0.1443i \\ 0+0.1443i & 0.1443 & 0+0.1443i & 0.1443 & 0+0.1443i & -0.1443 \\ -0.1443 & 0-0.1443i & 0.1443 & 0+0.1443i & -0.1443 & 0+0.1443i \\ 0-0.1443i & 0.1443 & 0-0.1443i & 0.1443 & 0-0.1443i & -0.1443 \end{bmatrix}$$

$$W\_co\_8Tx\_L\_6(:,:,8) = \begin{bmatrix} 0.1443 & 0-0.1443i & -0.1443 & 0+0.1443i & 0.1443 & 0-0.1443i \\ 0+0.1443i & 0.1443 & 0+0.1443i & 0.1443 & 0-0.1443i & -0.1443 \\ -0.1443 & 0-0.1443i & 0.1443 & 0+0.1443i & 0.1443 & 0+0.1443i \\ 0-0.1443i & 0.1443 & 0-0.1443i & 0.1443 & 0-0.1443i & 0.1443 \\ 0.1443 & 0-0.1443i & -0.1443 & 0+0.1443i & -0.1443 & 0+0.1443i \\ 0+0.1443i & 0.1443 & 0+0.1443i & 0.1443 & 0+0.1443i & 0.1443 \\ -0.1443 & 0-0.1443i & 0.1443 & 0+0.1443i & -0.1443 & 0-0.1443i \\ 0-0.1443i & 0.1443 & 0-0.1443i & 0.1443 & 0+0.1443i & -0.1443 \end{bmatrix}$$

$$W\_co\_8Tx\_L\_6(:,:,9) = \begin{bmatrix} 0.1443 & 0-0.1443i & -0.1443 & 0+0.1443i & 0.1443 & 0+0.1443i \\ 0+0.1443i & 0.1443 & 0+0.1443i & 0.1443 & 0+0.1443i & -0.1443 \\ -0.1443 & 0-0.1443i & 0.1443 & 0+0.1443i & 0.1443 & 0-0.1443i \\ 0-0.1443i & 0.1443 & 0-0.1443i & 0.1443 & 0+0.1443i & 0.1443 \\ 0.1443 & 0-0.1443i & -0.1443 & 0+0.1443i & -0.1443 & 0-0.1443i \\ 0+0.1443i & 0.1443 & 0+0.1443i & 0.1443 & 0-0.1443i & 0.1443 \\ -0.1443 & 0-0.1443i & 0.1443 & 0+0.1443i & -0.1443 & 0+0.1443i \\ 0-0.1443i & 0.1443 & 0-0.1443i & 0.1443 & 0-0.1443i & -0.1443 \end{bmatrix}$$

$$W\_co\_8Tx\_L\_6(:,:,10) = \begin{bmatrix} 0.1443 & -0.1443 & 0.1443 & -0.1443 & -0.1443 & 0-0.1443i \\ -0.1443 & 0.1443 & 0.1443 & -0.1443 & 0-0.1443i & 0.1443 \\ 0.1443 & 0.1443 & 0.1443 & 0.1443 & 0.1443 & 0-0.1443i \\ -0.1443 & -0.1443 & 0.1443 & 0.1443 & 0+0.1443i & 0.1443 \\ 0.1443 & -0.1443 & 0.1443 & -0.1443 & 0.1443 & 0+0.1443i \\ -0.1443 & 0.1443 & 0.1443 & -0.1443 & 0+0.1443i & -0.1443 \\ 0.1443 & 0.1443 & 0.1443 & 0.1443 & -0.1443 & 0+0.1443i \\ -0.1443 & -0.1443 & 0.1443 & 0.1443 & 0-0.1443i & -0.1443 \end{bmatrix}$$

$$W\_co\_8Tx\_L\_6(:,:,11) = \begin{bmatrix} 0.1443 & -0.1443 & 0.1443 & -0.1443 & -0.1443 & -0.1443 \\ -0.1443 & 0.1443 & 0.1443 & -0.1443 & 0.1443 & 0.1443 \\ 0.1443 & 0.1443 & 0.1443 & 0.1443 & 0.1443 & -0.1443 \\ -0.1443 & -0.1443 & 0.1443 & 0.1443 & -0.1443 & 0.1443 \\ 0.1443 & -0.1443 & 0.1443 & -0.1443 & 0.1443 & 0.1443 \\ -0.1443 & 0.1443 & 0.1443 & -0.1443 & -0.1443 & -0.1443 \\ 0.1443 & 0.1443 & 0.1443 & 0.1443 & -0.1443 & 0.1443 \\ -0.1443 & -0.1443 & 0.1443 & 0.1443 & 0.1443 & -0.1443 \end{bmatrix}$$

$$W\_co\_8Tx\_L\_6(:,:,12) = \begin{bmatrix} 0.1443 & -0.1443 & 0.1443 & -0.1443 & -0.1443 & 0.1443 \\ -0.1443 & 0.1443 & 0.1443 & -0.1443 & -0.1443 & 0.1443 \\ 0.1443 & 0.1443 & 0.1443 & 0.1443 & 0.1443 & 0.1443 \\ -0.1443 & -0.1443 & 0.1443 & 0.1443 & 0.1443 & 0.1443 \\ 0.1443 & -0.1443 & 0.1443 & -0.1443 & 0.1443 & -0.1443 \\ -0.1443 & 0.1443 & 0.1443 & -0.1443 & 0.1443 & -0.1443 \\ 0.1443 & 0.1443 & 0.1443 & 0.1443 & -0.1443 & -0.1443 \\ -0.1443 & -0.1443 & 0.1443 & 0.1443 & -0.1443 & -0.1443 \end{bmatrix}$$

TABLE 3-continued $$W\_co\_8Tx\_L\_6(:,:,13) = \begin{bmatrix} 0.1443 & 0+0.1443i & -0.1443 & 0-0.1443i & 0.1443 & 0-0.1443i \\ 0-0.1443i & 0.1443 & 0-0.1443i & 0.1443 & 0-0.1443i & -0.1443 \\ -0.1443 & 0+0.1443i & 0.1443 & 0-0.1443i & 0.1443 & 0+0.1443i \\ 0+0.1443i & 0.1443 & 0+0.1443i & 0.1443 & 0-0.1443i & 0.1443 \\ 0.1443 & 0+0.1443i & -0.1443 & 0-0.1443i & -0.1443 & 0+0.1443i \\ 0-0.1443i & 0.1443 & 0-0.1443i & 0.1443 & 0+0.1443i & 0.1443 \\ -0.1443 & 0+0.1443i & 0.1443 & 0-0.1443i & -0.1443 & 0-0.1443i \\ 0+0.1443i & 0.1443 & 0+0.1443i & 0.1443 & 0+0.1443i & -0.1443 \end{bmatrix}$$

$$W\_co\_8Tx\_L\_6(:,:,14) = \begin{bmatrix} 0.1443 & 0+0.1443i & -0.1443 & 0-0.1443i & 0.1443 & 0+0.1443i \\ 0-0.1443i & 0.1443 & 0-0.1443i & 0.1443 & 0+0.1443i & -0.1443 \\ -0.1443 & 0+0.1443i & 0.1443 & 0-0.1443i & 0.1443 & 0-0.1443i \\ 0+0.1443i & 0.1443 & 0+0.1443i & 0.1443 & 0+0.1443i & 0.1443 \\ 0.1443 & 0+0.1443i & -0.1443 & 0-0.1443i & -0.1443 & 0-0.1443i \\ 0-0.1443i & 0.1443 & 0-0.1443i & 0.1443 & 0-0.1443i & 0.1443 \\ -0.1443 & 0+0.1443i & 0.1443 & 0-0.1443i & -0.1443 & 0+0.1443i \\ 0+0.1443i & 0.1443 & 0+0.1443i & 0.1443 & 0-0.1443i & -0.1443 \end{bmatrix}$$

$$W\_co\_8Tx\_L\_6(:,:,15) = \begin{bmatrix} 0.1443 & 0.1021-0.1021i & 0-0.1443i & -0.1021-0.1021i & 0+0.1443i & 0.1021-0.1021i \\ 0.1021+0.1021i & 0.1443 & -0.1021+0.1021i & 0+0.1443i & 0.1021+0.1021i & 0-0.1443i \\ 0+0.1443i & -0.1021-0.1021i & 0.1443 & -0.1021+0.1021i & 0.1443 & 0.1021+0.1021i \\ -0.1021+0.1021i & 0-0.1443i & -0.1021-0.1021i & 0.1443 & 0.1021-0.1021i & 0.1443 \\ 0.1443 & 0.1021-0.1021i & 0-0.1443i & -0.1021-0.1021i & 0-0.1443i & -0.1021+0.1021i \\ 0.1021+0.1021i & 0.1443 & -0.1021+0.1021i & 0+0.1443i & -0.1021-0.1021i & 0+0.1443i \\ 0+0.1443i & -0.1021-0.1021i & 0.1443 & -0.1021+0.1021i & -0.1443 & -0.1021-0.1021i \\ -0.1021+0.1021i & 0-0.1443i & -0.1021-0.1021i & 0.1443 & -0.1021+0.1021i & -0.1443 \end{bmatrix}$$

$$W\_co\_8Tx\_L\_6(:,:,16) = \begin{bmatrix} 0.1443 & 0.1021-0.1021i & 0-0.1443i & -0.1021-0.1021i & 0-0.1443i & 0.1021+0.1021i \\ 0.1021+0.1021i & 0.1443 & -0.1021+0.1021i & 0+0.1443i & 0.1021-0.1021i & 0+0.1443i \\ 0+0.1443i & -0.1021-0.1021i & 0.1443 & -0.1021+0.1021i & 0.1443 & 0.1021-0.1021i \\ -0.1021+0.1021i & 0-0.1443i & -0.1021-0.1021i & 0.1443 & 0.1021+0.1021i & 0.1443 \\ 0.1443 & 0.1021-0.1021i & 0-0.1443i & -0.1021-0.1021i & 0+0.1443i & -0.1021-0.1021i \\ 0.1021+0.1021i & 0.1443 & -0.1021+0.1021i & 0+0.1443i & -0.1021+0.1021i & 0-0.1443i \\ 0+0.1443i & -0.1021-0.1021i & 0.1443 & -0.1021+0.1021i & -0.1443 & -0.1021+0.1021i \\ -0.1021+0.1021i & 0-0.1443i & -0.1021-0.1021i & 0.1443 & -0.1021-0.1021i & -0.1443 \end{bmatrix}$$

$$W\_co\_8Tx\_L\_6(:,:,17) = \begin{bmatrix} 0.1443 & 0.1021-0.1021i & 0-0.1443i & -0.1021-0.1021i & 0+0.1443i & -0.1021+0.1021i \\ 0.1021+0.1021i & 0.1443 & -0.1021+0.1021i & 0+0.1443i & -0.1021-0.1021i & 0-0.1443i \\ 0+0.1443i & -0.1021-0.1021i & 0.1443 & -0.1021+0.1021i & 0.1443 & -0.1021-0.1021i \\ -0.1021+0.1021i & 0-0.1443i & -0.1021-0.1021i & 0.1443 & -0.1021+0.1021i & 0.1443 \\ 0.1443 & 0.1021-0.1021i & 0-0.1443i & -0.1021-0.1021i & 0-0.1443i & 0.1021-0.1021i \\ 0.1021+0.1021i & 0.1443 & -0.1021+0.1021i & 0+0.1443i & 0.1021+0.1021i & 0+0.1443i \\ 0+0.1443i & -0.1021-0.1021i & 0.1443 & -0.1021+0.1021i & -0.1443 & 0.1021+0.1021i \\ -0.1021+0.1021i & 0-0.1443i & -0.1021-0.1021i & 0.1443 & 0.1021-0.1021i & -0.1443 \end{bmatrix}$$

$$W\_co\_8Tx\_L\_6(:,:,18) = \begin{bmatrix} 0.1443 & -0.1021-0.1021i & 0+0.1443i & 0.1021-0.1021i & 0-0.1443i & 0.1021+0.1021i \\ -0.1021+0.1021i & 0.1443 & 0.1021+0.1021i & 0-0.1443i & 0.1021-0.1021i & 0+0.1443i \\ 0-0.1443i & 0.1021-0.1021i & 0.1443 & 0.1021+0.1021i & 0.1443 & 0.1021-0.1021i \\ 0.1021+0.1021i & 0+0.1443i & 0.1021-0.1021i & 0.1443 & 0.1021+0.1021i & 0.1443 \\ 0.1443 & -0.1021-0.1021i & 0+0.1443i & 0.1021-0.1021i & 0+0.1443i & -0.1021-0.1021i \\ -0.1021+0.1021i & 0.1443 & 0.1021+0.1021i & 0-0.1443i & -0.1021+0.1021i & 0-0.1443i \\ 0-0.1443i & 0.1021-0.1021i & 0.1443 & 0.1021+0.1021i & -0.1443 & -0.1021+0.1021i \\ 0.1021+0.1021i & 0+0.1443i & 0.1021-0.1021i & 0.1443 & -0.1021-0.1021i & -0.1443 \end{bmatrix}$$

TABLE 3-continued $$W\_co\_8Tx\_L\_6(:,:,19) = \begin{bmatrix} 0.1443 & -0.1021-0.1021i & 0+0.1443i & 0.1021-0.1021i & 0+0.1443i & -0.1021+0.1021i \\ -0.1021+0.1021i & 0.1443 & 0.1021+0.1021i & 0-0.1443i & -0.1021-0.1021i & 0-0.1443i \\ 0-0.1443i & 0.1021-0.1021i & 0.1443 & 0.1021+0.1021i & 0.1443 & -0.1021-0.1021i \\ 0.1021+0.1021i & 0+0.1443i & 0.1021-0.1021i & 0.1443 & -0.1021+0.1021i & 0.1443 \\ 0.1443 & -0.1021-0.1021i & 0+0.1443i & 0.1021-0.1021i & 0-0.1443i & 0.1021-0.1021i \\ -0.1021+0.1021i & 0.1443 & 0.1021+0.1021i & 0-0.1443i & 0.1021+0.1021i & 0+0.1443i \\ 0-0.1443i & 0.1021-0.1021i & 0.1443 & 0.1021+0.1021i & -0.1443 & 0.1021+0.1021i \\ 0.1021+0.1021i & 0+0.1443i & 0.1021-0.1021i & 0.1443 & 0.1021-0.1021i & -0.1443 \end{bmatrix}$$

$$W\_co\_8Tx\_L\_6(:,:,20) = \begin{bmatrix} 0.1443 & -0.1021+0.1021i & 0-0.1443i & 0.1021+0.1021i & 0+0.1443i & -0.1021+0.1021i \\ -0.1021-0.1021i & 0.1443 & 0.1021-0.1021i & 0+0.1443i & -0.1021-0.1021i & 0-0.1443i \\ 0+0.1443i & 0.1021+0.1021i & 0.1443 & 0.1021-0.1021i & 0.1443 & -0.1021-0.1021i \\ 0.1021-0.1021i & 0-0.1443i & 0.1021+0.1021i & 0.1443 & -0.1021+0.1021i & 0.1443 \\ 0.1443 & -0.1021+0.1021i & 0-0.1443i & 0.1021+0.1021i & 0-0.1443i & 0.1021-0.1021i \\ -0.1021-0.1021i & 0.1443 & 0.1021-0.1021i & 0+0.1443i & 0.1021+0.1021i & 0+0.1443i \\ 0+0.1443i & 0.1021+0.1021i & 0.1443 & 0.1021-0.1021i & -0.1443 & 0.1021+0.1021i \\ 0.1021-0.1021i & 0-0.1443i & 0.1021+0.1021i & 0.1443 & 0.1021-0.1021i & -0.1443 \end{bmatrix}$$

$$W\_co\_8Tx\_L\_6(:,:,21) = \begin{bmatrix} 0.1443 & 0.1443 & -0.1443 & -0.1443 & 0.1443 & 0-0.1443i \\ 0.1443 & 0.1443 & 0.1443 & 0.1443 & 0-0.1443i & -0.1443 \\ -0.1443 & 0.1443 & 0.1443 & -0.1443 & 0.1443 & 0+0.1443i \\ -0.1443 & 0.1443 & -0.1443 & 0.1443 & 0-0.1443i & 0.1443 \\ 0.1443 & 0.1443 & -0.1443 & -0.1443 & -0.1443 & 0+0.1443i \\ 0.1443 & 0.1443 & 0.1443 & 0.1443 & 0+0.1443i & 0.1443 \\ -0.1443 & 0.1443 & 0.1443 & -0.1443 & -0.1443 & 0-0.1443i \\ -0.1443 & 0.1443 & -0.1443 & 0.1443 & 0+0.1443i & -0.1443 \end{bmatrix}$$

$$W\_co\_8Tx\_L\_6(:,:,22) = \begin{bmatrix} 0.1443 & 0.1443 & -0.1443 & -0.1443 & -0.1443 & 0.1443 \\ 0.1443 & 0.1443 & 0.1443 & 0.1443 & -0.1443 & 0.1443 \\ -0.1443 & 0.1443 & 0.1443 & -0.1443 & 0.1443 & 0.1443 \\ -0.1443 & 0.1443 & -0.1443 & 0.1443 & 0.1443 & 0.1443 \\ 0.1443 & 0.1443 & -0.1443 & -0.1443 & 0.1443 & -0.1443 \\ 0.1443 & 0.1443 & 0.1443 & 0.1443 & 0.1443 & -0.1443 \\ -0.1443 & 0.1443 & 0.1443 & -0.1443 & -0.1443 & -0.1443 \\ -0.1443 & 0.1443 & -0.1443 & 0.1443 & -0.1443 & -0.1443 \end{bmatrix}$$

$$W\_co\_8Tx\_L\_6(:,:,23) = \begin{bmatrix} 0.1443 & 0.1443 & -0.1443 & -0.1443 & 0.1443 & 0+0.1443i \\ 0.1443 & 0.1443 & 0.1443 & 0.1443 & 0+0.1443i & -0.1443 \\ -0.1443 & 0.1443 & 0.1443 & -0.1443 & 0.1443 & 0-0.1443i \\ -0.1443 & 0.1443 & -0.1443 & 0.1443 & 0+0.1443i & 0.1443 \\ 0.1443 & 0.1443 & -0.1443 & -0.1443 & -0.1443 & 0-0.1443i \\ 0.1443 & 0.1443 & 0.1443 & 0.1443 & 0-0.1443i & 0.1443 \\ -0.1443 & 0.1443 & 0.1443 & -0.1443 & -0.1443 & 0+0.1443i \\ -0.1443 & 0.1443 & -0.1443 & 0.1443 & 0-0.1443i & -0.1443 \end{bmatrix}$$

$$W\_co\_8Tx\_L\_6(:,:,24) = \begin{bmatrix} 0.1443 & 0-0.1443i & 0.1443 & 0-0.1443i & -0.1443 & 0.1443 \\ 0+0.1443i & 0.1443 & 0-0.1443i & -0.1443 & -0.1443 & 0.1443 \\ 0.1443 & 0+0.1443i & 0.1443 & 0+0.1443i & 0.1443 & 0.1443 \\ 0+0.1443i & -0.1443 & 0-0.1443i & 0.1443 & 0.1443 & 0.1443 \\ 0.1443 & 0-0.1443i & 0.1443 & 0-0.1443i & 0.1443 & -0.1443 \\ 0+0.1443i & 0.1443 & 0-0.1443i & -0.1443 & 0.1443 & -0.1443 \\ 0.1443 & 0+0.1443i & 0.1443 & 0+0.1443i & -0.1443 & -0.1443 \\ 0+0.1443i & -0.1443 & 0-0.1443i & 0.1443 & -0.1443 & -0.1443 \end{bmatrix}$$

TABLE 3-continued $$W\_co\_8Tx\_L\_6(:,:,25) = \begin{bmatrix} 0.1443 & 0-0.1443i & 0.1443 & 0-0.1443i & 0.1443 & 0+0.1443i \\ 0+0.1443i & 0.1443 & 0-0.1443i & -0.1443 & 0+0.1443i & -0.1443 \\ 0.1443 & 0+0.1443i & 0.1443 & 0+0.1443i & 0.1443 & 0-0.1443i \\ 0+0.1443i & -0.1443 & 0-0.1443i & 0.1443 & 0+0.1443i & 0.1443 \\ 0.1443 & 0-0.1443i & 0.1443 & 0-0.1443i & -0.1443 & 0-0.1443i \\ 0+0.1443i & 0.1443 & 0-0.1443i & -0.1443 & 0-0.1443i & 0.1443 \\ 0.1443 & 0+0.1443i & 0.1443 & 0+0.1443i & -0.1443 & 0+0.1443i \\ 0+0.1443i & -0.1443 & 0-0.1443i & 0.1443 & 0-0.1443i & -0.1443 \end{bmatrix}$$

$$W\_co\_8Tx\_L\_6(:,:,26) = \begin{bmatrix} 0.1443 & -0.1443 & -0.1443 & 0.1443 & 0.1443 & 0+0.1443i \\ -0.1443 & 0.1443 & -0.1443 & 0.1443 & 0+0.1443i & -0.1443 \\ -0.1443 & -0.1443 & 0.1443 & 0.1443 & 0.1443 & 0-0.1443i \\ 0.1443 & 0.1443 & 0.1443 & 0.1443 & 0+0.1443i & 0.1443 \\ 0.1443 & -0.1443 & -0.1443 & 0.1443 & -0.1443 & 0-0.1443i \\ -0.1443 & 0.1443 & -0.1443 & 0.1443 & 0-0.1443i & 0.1443 \\ -0.1443 & -0.1443 & 0.1443 & 0.1443 & -0.1443 & 0+0.1443i \\ 0.1443 & 0.1443 & 0.1443 & 0.1443 & 0-0.1443i & -0.1443 \end{bmatrix}$$

The following Table 4 shows a multi-BS precoding matrix codebook generated when each of two BSs has 4 antennas and the number of transmission layers is 5.

TABLE 4

$$W\_co\_8Tx\_L\_5(:,:,1) = \begin{bmatrix} 0.1581 & 0.1581 & 0.1581 & 0.1581 & 0+0.1581i \\ 0.1581 & 0.1581 & -0.1581 & -0.1581 & 0.1581 \\ 0.1581 & -0.1581 & 0.1581 & -0.1581 & 0+0.1581i \\ 0.1581 & -0.1581 & -0.1581 & 0.1581 & 0.1581 \\ 0.1581 & 0.1581 & 0.1581 & 0.1581 & 0-0.1581i \\ 0.1581 & 0.1581 & -0.1581 & -0.1581 & -0.1581 \\ 0.1581 & -0.1581 & 0.1581 & -0.1581 & 0-0.1581i \\ 0.1581 & -0.1581 & -0.1581 & 0.1581 & -0.1581 \end{bmatrix}$$

$$W\_co\_8Tx\_L\_5(:,:,2) = \begin{bmatrix} 0.1581 & 0.1581 & 0.1581 & 0.1581 & -0.1581 \\ 0.1581 & 0.1581 & -0.1581 & -0.1581 & -0.1581 \\ 0.1581 & -0.1581 & 0.1581 & -0.1581 & 0.1581 \\ 0.1581 & -0.1581 & -0.1581 & 0.1581 & 0.1581 \\ 0.1581 & 0.1581 & 0.1581 & 0.1581 & 0.1581 \\ 0.1581 & 0.1581 & -0.1581 & -0.1581 & 0.1581 \\ 0.1581 & -0.1581 & 0.1581 & -0.1581 & -0.1581 \\ 0.1581 & -0.1581 & -0.1581 & 0.1581 & -0.1581 \end{bmatrix}$$

$$W\_co\_8Tx\_L\_5(:,:,3) = \begin{bmatrix} 0.1581 & 0.1581 & 0.1581 & 0.1581 & 0-0.1581i \\ 0.1581 & 0.1581 & -0.1581 & -0.1581 & 0.1581 \\ 0.1581 & -0.1581 & 0.1581 & -0.1581 & 0-0.1581i \\ 0.1581 & -0.1581 & -0.1581 & 0.1581 & 0.1581 \\ 0.1581 & 0.1581 & 0.1581 & 0.1581 & 0+0.1581i \\ 0.1581 & 0.1581 & -0.1581 & -0.1581 & -0.1581 \\ 0.1581 & -0.1581 & 0.1581 & -0.1581 & 0+0.1581i \\ 0.1581 & -0.1581 & -0.1581 & 0.1581 & -0.1581 \end{bmatrix}$$

TABLE 4-continued $$W\_co\_8Tx\_L\_5(:,:,4) = \begin{bmatrix} 0.1581 & 0.1581 & 0.1581 & 0.1581 & -0.1581 \\ 0.1581 & 0.1581 & -0.1581 & -0.1581 & 0.1581 \\ 0.1581 & -0.1581 & 0.1581 & -0.1581 & -0.1581 \\ 0.1581 & -0.1581 & -0.1581 & 0.1581 & 0.1581 \\ 0.1581 & 0.1581 & 0.1581 & 0.1581 & 0.1581 \\ 0.1581 & 0.1581 & -0.1581 & -0.1581 & -0.1581 \\ 0.1581 & -0.1581 & 0.1581 & -0.1581 & 0.1581 \\ 0.1581 & -0.1581 & -0.1581 & 0.1581 & -0.1581 \end{bmatrix}$$

$$W\_co\_8Tx\_L\_5(:,:,5) = \begin{bmatrix} 0.1581 & 0.1581 & 0.1581 & 0.1581 & 0.1581 \\ 0.1581 & 0.1581 & -0.1581 & -0.1581 & 0.1581 \\ 0.1581 & -0.1581 & 0.1581 & -0.1581 & 0.1581 \\ 0.1581 & -0.1581 & -0.1581 & 0.1581 & 0.1581 \\ 0.1581 & 0.1581 & 0.1581 & 0.1581 & -0.1581 \\ 0.1581 & 0.1581 & -0.1581 & -0.1581 & -0.1581 \\ 0.1581 & -0.1581 & 0.1581 & -0.1581 & -0.1581 \\ 0.1581 & -0.1581 & -0.1581 & 0.1581 & -0.1581 \end{bmatrix}$$

$$W\_co\_8Tx\_L\_5(:,:,6) = \begin{bmatrix} 0.1581 & 0-0.1581i & -0.1581 & 0+0.1581i & -0.1581 \\ 0+0.1581i & 0.1581 & 0+0.1581i & 0.1581 & -0.1581 \\ -0.1581 & 0-0.1581i & 0.1581 & 0+0.1581i & 0.1581 \\ 0-0.1581i & 0.1581 & 0-0.1581i & 0.1581 & 0.1581 \\ 0.1581 & 0-0.1581i & -0.1581 & 0+0.1581i & 0.1581 \\ 0+0.1581i & 0.1581 & 0+0.1581i & 0.1581 & 0.1581 \\ -0.1581 & 0-0.1581i & 0.1581 & 0+0.1581i & -0.1581 \\ 0-0.1581i & 0.1581 & 0-0.1581i & 0.1581 & -0.1581 \end{bmatrix}$$

$$W\_co\_8Tx\_L\_5(:,:,7) = \begin{bmatrix} 0.1581 & 0-0.1581i & -0.1581 & 0+0.1581i & 0-0.1581i \\ 0+0.1581i & 0.1581 & 0+0.1581i & 0.1581 & 0.1581 \\ -0.1581 & 0-0.1581i & 0.1581 & 0+0.1581i & 0-0.1581i \\ 0-0.1581i & 0.1581 & 0-0.1581i & 0.1581 & 0.1581 \\ 0.1581 & 0-0.1581i & -0.1581 & 0+0.1581i & 0+0.1581i \\ 0+0.1581i & 0.1581 & 0+0.1581i & 0.1581 & -0.1581 \\ -0.1581 & 0-0.1581i & 0.1581 & 0+0.1581i & 0+0.1581i \\ 0-0.1581i & 0.1581 & 0-0.1581i & 0.1581 & -0.1581 \end{bmatrix}$$

$$W\_co\_8Tx\_L\_5(:,:,8) = \begin{bmatrix} 0.1581 & 0-0.1581i & -0.1581 & 0+0.1581i & 0-0.1581i \\ 0+0.1581i & 0.1581 & 0+0.1581i & 0.1581 & -0.1581 \\ -0.1581 & 0-0.1581i & 0.1581 & 0+0.1581i & 0+0.1581i \\ 0-0.1581i & 0.1581 & 0-0.1581i & 0.1581 & 0.1581 \\ 0.1581 & 0-0.1581i & -0.1581 & 0+0.1581i & 0+0.1581i \\ 0+0.1581i & 0.1581 & 0+0.1581i & 0.1581 & 0.1581 \\ -0.1581 & 0-0.1581i & 0.1581 & 0+0.1581i & 0-0.1581i \\ 0-0.1581i & 0.1581 & 0-0.1581i & 0.1581 & -0.1581 \end{bmatrix}$$

$$W\_co\_8Tx\_L\_5(:,:,9) = \begin{bmatrix} 0.1581 & 0-0.1581i & -0.1581 & 0+0.1581i & 0+0.1581i \\ 0+0.1581i & 0.1581 & 0+0.1581i & 0.1581 & -0.1581 \\ -0.1581 & 0-0.1581i & 0.1581 & 0+0.1581i & 0-0.1581i \\ 0-0.1581i & 0.1581 & 0-0.1581i & 0.1581 & 0.1581 \\ 0.1581 & 0-0.1581i & -0.1581 & 0+0.1581i & 0-0.1581i \\ 0+0.1581i & 0.1581 & 0+0.1581i & 0.1581 & 0.1581 \\ -0.1581 & 0-0.1581i & 0.1581 & 0+0.1581i & 0+0.1581i \\ 0-0.1581i & 0.1581 & 0-0.1581i & 0.1581 & -0.1581 \end{bmatrix}$$

TABLE 4-continued $$W\_co\_8Tx\_L\_5(:,:,10) = \begin{bmatrix} 0.1581 & -0.1581 & 0.1581 & -0.1581 & 0-0.1581i \\ -0.1581 & 0.1581 & 0.1581 & -0.1581 & 0.1581 \\ 0.1581 & 0.1581 & 0.1581 & 0.1581 & 0-0.1581i \\ -0.1581 & -0.1581 & 0.1581 & 0.1581 & 0.1581 \\ 0.1581 & -0.1581 & 0.1581 & -0.1581 & 0+0.1581i \\ -0.1581 & 0.1581 & 0.1581 & -0.1581 & -0.1581 \\ 0.1581 & 0.1581 & 0.1581 & 0.1581 & 0+0.1581i \\ -0.1581 & -0.1581 & 0.1581 & 0.1581 & -0.1581 \end{bmatrix}$$

$$W\_co\_8Tx\_L\_5(:,:,11) = \begin{bmatrix} 0.1581 & -0.1581 & 0.1581 & -0.1581 & -0.1581 \\ -0.1581 & 0.1581 & 0.1581 & -0.1581 & 0.1581 \\ 0.1581 & 0.1581 & 0.1581 & 0.1581 & -0.1581 \\ -0.1581 & -0.1581 & 0.1581 & 0.1581 & 0.1581 \\ 0.1581 & -0.1581 & 0.1581 & -0.1581 & 0.1581 \\ -0.1581 & 0.1581 & 0.1581 & -0.1581 & -0.1581 \\ 0.1581 & 0.1581 & 0.1581 & 0.1581 & 0.1581 \\ -0.1581 & -0.1581 & 0.1581 & 0.1581 & -0.1581 \end{bmatrix}$$

$$W\_co\_8Tx\_L\_5(:,:,12) = \begin{bmatrix} 0.1581 & -0.1581 & 0.1581 & -0.1581 & 0.1581 \\ -0.1581 & 0.1581 & 0.1581 & -0.1581 & 0.1581 \\ 0.1581 & 0.1581 & 0.1581 & 0.1581 & 0.1581 \\ -0.1581 & -0.1581 & 0.1581 & 0.1581 & 0.1581 \\ 0.1581 & -0.1581 & 0.1581 & -0.1581 & -0.1581 \\ -0.1581 & 0.1581 & 0.1581 & -0.1581 & -0.1581 \\ 0.1581 & 0.1581 & 0.1581 & 0.1581 & -0.1581 \\ -0.1581 & -0.1581 & 0.1581 & 0.1581 & -0.1581 \end{bmatrix}$$

$$W\_co\_8Tx\_L\_5(:,:,13) = \begin{bmatrix} 0.1581 & 0+0.1581i & -0.1581 & 0-0.1581i & 0-0.1581i \\ 0-0.1581i & 0.1581 & 0-0.1581i & 0.1581 & -0.1581 \\ -0.1581 & 0+0.1581i & 0.1581 & 0-0.1581i & 0+0.1581i \\ 0+0.1581i & 0.1581 & 0+0.1581i & 0.1581 & 0.1581 \\ 0.1581 & 0+0.1581i & -0.1581 & 0-0.1581i & 0+0.1581i \\ 0-0.1581i & 0.1581 & 0-0.1581i & 0.1581 & 0.1581 \\ -0.1581 & 0+0.1581i & 0.1581 & 0-0.1581i & 0-0.1581i \\ 0+0.1581i & 0.1581 & 0+0.1581i & 0.1581 & -0.1581 \end{bmatrix}$$

$$W\_co\_8Tx\_L\_5(:,:,14) = \begin{bmatrix} 0.1581 & 0+0.1581i & -0.1581 & 0-0.1581i & 0+0.1581i \\ 0-0.1581i & 0.1581 & 0-0.1581i & 0.1581 & -0.1581 \\ -0.1581 & 0+0.1581i & 0.1581 & 0-0.1581i & 0-0.1581i \\ 0+0.1581i & 0.1581 & 0+0.1581i & 0.1581 & 0.1581 \\ 0.1581 & 0+0.1581i & -0.1581 & 0-0.1581i & 0-0.1581i \\ 0-0.1581i & 0.1581 & 0-0.1581i & 0.1581 & 0.1581 \\ -0.1581 & 0+0.1581i & 0.1581 & 0-0.1581i & 0+0.1581i \\ 0+0.1581i & 0.1581 & 0+0.1581i & 0.1581 & -0.1581 \end{bmatrix}$$

$$W\_co\_8Tx\_L\_5(:,:,15) = \begin{bmatrix} 0.1581 & 0.1118-0.1118i & 0-0.1581i & -0.1118-0.1118i & 0.1118-0.1118i \\ 0.1118+0.1118i & 0.1581 & -0.1118+0.1118i & 0+0.1581i & 0-0.1581i \\ 0+0.1581i & -0.1118-0.1118i & 0.1581 & -0.1118+0.1118i & 0.1118+0.1118i \\ -0.1118+0.1118i & 0-0.1581i & -0.1118-0.1118i & 0.1581 & 0.1581 \\ 0.1581 & 0.1118-0.1118i & 0-0.1581i & -0.1118-0.1118i & -0.1118+0.1118i \\ 0.1118+0.1118i & 0.1581 & -0.1118+0.1118i & 0+0.1581i & 0+0.1581i \\ 0+0.1581i & -0.1118-0.1118i & 0.1581 & -0.1118+0.1118i & -0.1118-0.1118i \\ -0.1118+0.1118i & 0-0.1581i & -0.1118-0.1118i & 0.1581 & -0.1581 \end{bmatrix}$$

TABLE 4-continued $$W\_co\_8Tx\_L\_5(:,:,16) = \begin{bmatrix} 0.1581 & 0.1118-0.1118i & 0-0.1581i & -0.1118-0.1118i & 0.1118+0.1118i \\ 0.1118+0.1118i & 0.1581 & -0.1118+0.1118i & 0+0.1581i & 0+0.1581i \\ 0+0.1581i & -0.1118-0.1118i & 0.1581 & -0.1118+0.1118i & 0.1118-0.1118i \\ -0.1118+0.1118i & 0-0.1581i & -0.1118-0.1118i & 0.1581 & 0.1581 \\ 0.1581 & 0.1118-0.1118i & 0-0.1581i & -0.1118-0.1118i & -0.1118-0.1118i \\ 0.1118+0.1118i & 0.1581 & -0.1118+0.1118i & 0+0.1581i & 0-0.1581i \\ 0+0.1581i & -0.1118-0.1118i & 0.1581 & -0.1118+0.1118i & -0.1118+0.1118i \\ -0.1118+0.1118i & 0-0.1581i & -0.1118-0.1118i & 0.1581 & -0.1581 \end{bmatrix}$$

$$W\_co\_8Tx\_L\_5(:,:,17) = \begin{bmatrix} 0.1581 & 0.1118-0.1118i & 0-0.1581i & -0.1118-0.1118i & -0.1118+0.1118i \\ 0.1118+0.1118i & 0.1581 & -0.1118+0.1118i & 0+0.1581i & 0-0.1581i \\ 0+0.1581i & -0.1118-0.1118i & 0.1581 & -0.1118+0.1118i & -0.1118-0.1118i \\ -0.1118+0.1118i & 0-0.1581i & -0.1118-0.1118i & 0.1581 & 0.1581 \\ 0.1581 & 0.1118-0.1118i & 0-0.1581i & -0.1118-0.1118i & 0.1118-0.1118i \\ 0.1118+0.1118i & 0.1581 & -0.1118+0.1118i & 0+0.1581i & 0+0.1581i \\ 0+0.1581i & -0.1118-0.1118i & 0.1581 & -0.1118+0.1118i & 0.1118+0.1118i \\ -0.1118+0.1118i & 0-0.1581i & -0.1118-0.1118i & 0.1581 & -0.1581 \end{bmatrix}$$

$$W\_co\_8Tx\_L\_5(:,:,18) = \begin{bmatrix} 0.1581 & -0.1118-0.1118i & 0+0.1581i & 0.1118-0.1118i & 0.1118+0.1118i \\ -0.1118+0.1118i & 0.1581 & 0.1118+0.1118i & 0-0.1581i & 0+0.1581i \\ 0-0.1581i & 0.1118-0.1118i & 0.1581 & 0.1118+0.1118i & 0.1118-0.1118i \\ 0.1118+0.1118i & 0+0.1581i & 0.1118-0.1118i & 0.1581 & 0.1581 \\ 0.1581 & -0.1118-0.1118i & 0+0.1581i & 0.1118-0.1118i & -0.1118-0.1118i \\ -0.1118+0.1118i & 0.1581 & 0.1118+0.1118i & 0-0.1581i & 0-0.1581i \\ 0-0.1581i & 0.1118-0.1118i & 0.1581 & 0.1118+0.1118i & -0.1118+0.1118i \\ 0.1118+0.1118i & 0+0.1581i & 0.1118-0.1118i & 0.1581 & -0.1581 \end{bmatrix}$$

$$W\_co\_8Tx\_L\_5(:,:,19) = \begin{bmatrix} 0.1581 & -0.1118-0.1118i & 0+0.1581i & 0.1118-0.1118i & -0.1118+0.1118i \\ -0.1118+0.1118i & 0.1581 & 0.1118+0.1118i & 0-0.1581i & 0-0.1581i \\ 0-0.1581i & 0.1118-0.1118i & 0.1581 & 0.1118+0.1118i & -0.1118-0.1118i \\ 0.1118+0.1118i & 0+0.1581i & 0.1118-0.1118i & 0.1581 & 0.1581 \\ 0.1581 & -0.1118-0.1118i & 0+0.1581i & 0.1118-0.1118i & 0.1118-0.1118i \\ -0.1118+0.1118i & 0.1581 & 0.1118+0.1118i & 0-0.1581i & 0+0.1581i \\ 0-0.1581i & 0.1118-0.1118i & 0.1581 & 0.1118+0.1118i & 0.1118+0.1118i \\ 0.1118+0.1118i & 0+0.1581i & 0.1118-0.1118i & 0.1581 & -0.1581 \end{bmatrix}$$

$$W\_co\_8Tx\_L\_5(:,:,20) = \begin{bmatrix} 0.1581 & -0.1118+0.1118i & 0-0.1581i & 0.1118-0.1118i & -0.1118+0.1118i \\ -0.1118-0.1118i & 0.1581 & 0.1118-0.1118i & 0+0.1581i & 0-0.1581i \\ 0+0.1581i & 0.1118+0.1118i & 0.1581 & 0.1118-0.1118i & -0.1118-0.1118i \\ 0.1118-0.1118i & 0-0.1581i & 0.1118+0.1118i & 0.1581 & 0.1581 \\ 0.1581 & -0.1118+0.1118i & 0-0.1581i & 0.1118-0.1118i & 0.1118-0.1118i \\ -0.1118-0.1118i & 0.1581 & 0.1118-0.1118i & 0+0.1581i & 0+0.1581i \\ 0+0.1581i & 0.1118+0.1118i & 0.1581 & 0.1118-0.1118i & 0.1118+0.1118i \\ 0.1118-0.1118i & 0-0.1581i & 0.1118+0.1118i & 0.1581 & -0.1581 \end{bmatrix}$$

$$W\_co\_8Tx\_L\_5(:,:,21) = \begin{bmatrix} 0.1581 & 0.1581 & -0.1581 & -0.1581 & 0-0.1581i \\ 0.1581 & 0.1581 & 0.1581 & 0.1581 & -0.1581 \\ -0.1581 & 0.1581 & 0.1581 & -0.1581 & 0+0.1581i \\ -0.1581 & 0.1581 & -0.1581 & 0.1581 & 0.1581 \\ 0.1581 & 0.1581 & -0.1581 & -0.1581 & 0+0.1581i \\ 0.1581 & 0.1581 & 0.1581 & 0.1581 & 0.1581 \\ -0.1581 & 0.1581 & 0.1581 & -0.1581 & 0-0.1581i \\ -0.1581 & 0.1581 & -0.1581 & 0.1581 & -0.1581 \end{bmatrix}$$

TABLE 4-continued $$W\_co\_8Tx\_L\_5(:,:,22) = \begin{bmatrix} 0.1581 & 0.1581 & -0.1581 & -0.1581 & 0.1581 \\ 0.1581 & 0.1581 & 0.1581 & 0.1581 & 0.1581 \\ -0.1581 & 0.1581 & 0.1581 & -0.1581 & 0.1581 \\ -0.1581 & 0.1581 & -0.1581 & 0.1581 & 0.1581 \\ 0.1581 & 0.1581 & -0.1581 & -0.1581 & -0.1581 \\ 0.1581 & 0.1581 & 0.1581 & 0.1581 & -0.1581 \\ -0.1581 & 0.1581 & 0.1581 & -0.1581 & -0.1581 \\ -0.1581 & 0.1581 & -0.1581 & 0.1581 & -0.1581 \end{bmatrix}$$

$$W\_co\_8Tx\_L\_5(:,:,23) = \begin{bmatrix} 0.1581 & 0.1581 & -0.1581 & -0.1581 & 0+0.1581i \\ 0.1581 & 0.1581 & 0.1581 & 0.1581 & -0.1581 \\ -0.1581 & 0.1581 & 0.1581 & -0.1581 & 0-0.1581i \\ -0.1581 & 0.1581 & -0.1581 & 0.1581 & 0.1581 \\ 0.1581 & 0.1581 & -0.1581 & -0.1581 & 0-0.1581i \\ 0.1581 & 0.1581 & 0.1581 & 0.1581 & 0.1581 \\ -0.1581 & 0.1581 & 0.1581 & -0.1581 & 0+0.1581i \\ -0.1581 & 0.1581 & -0.1581 & 0.1581 & -0.1581 \end{bmatrix}$$

$$W\_co\_8Tx\_L\_5(:,:,24) = \begin{bmatrix} 0.1581 & 0-0.1581i & 0.1581 & 0-0.1581i & 0.1581 \\ 0+0.1581i & 0.1581 & 0-0.1581i & -0.1581 & 0.1581 \\ 0.1581 & 0+0.1581i & 0.1581 & 0+0.1581i & 0.1581 \\ 0+0.1581i & -0.1581 & 0-0.1581i & 0.1581 & 0.1581 \\ 0.1581 & 0-0.1581i & 0.1581 & 0-0.1581i & -0.1581 \\ 0+0.1581i & 0.1581 & 0-0.1581i & -0.1581 & -0.1581 \\ 0.1581 & 0+0.1581i & 0.1581 & 0+0.1581i & -0.1581 \\ 0+0.1581i & -0.1581 & 0-0.1581i & 0.1581 & -0.1581 \end{bmatrix}$$

$$W\_co\_8Tx\_L\_5(:,:,25) = \begin{bmatrix} 0.1581 & 0-0.1581i & 0.1581 & 0-0.1581i & 0+0.1581i \\ 0+0.1581i & 0.1581 & 0-0.1581i & -0.1581 & -0.1581 \\ 0.1581 & 0+0.1581i & 0.1581 & 0+0.1581i & 0-0.1581i \\ 0+0.1581i & -0.1581 & 0-0.1581i & 0.1581 & 0.1581 \\ 0.1581 & 0-0.1581i & 0.1581 & 0-0.1581i & 0-0.1581i \\ 0+0.1581i & 0.1581 & 0-0.1581i & -0.1581 & 0.1581 \\ 0.1581 & 0+0.1581i & 0.1581 & 0+0.1581i & 0+0.1581i \\ 0+0.1581i & -0.1581 & 0-0.1581i & 0.1581 & -0.1581 \end{bmatrix}$$

$$W\_co\_8Tx\_L\_5(:,:,26) = \begin{bmatrix} 0.1581 & -0.1581 & -0.1581 & 0.1581 & 0+0.1581i \\ -0.1581 & 0.1581 & -0.1581 & 0.1581 & -0.1581 \\ -0.1581 & -0.1581 & 0.1581 & 0.1581 & 0-0.1581i \\ 0.1581 & 0.1581 & 0.1581 & 0.1581 & 0.1581 \\ 0.1581 & -0.1581 & -0.1581 & 0.1581 & 0-0.1581i \\ -0.1581 & 0.1581 & -0.1581 & 0.1581 & 0.1581 \\ -0.1581 & -0.1581 & 0.1581 & 0.1581 & 0+0.1581i \\ 0.1581 & 0.1581 & 0.1581 & 0.1581 & -0.1581 \end{bmatrix}$$

Next, let's assume $1 \leq L_{co} \leq N$.

This assumption corresponds to the case where a rank is less than the number of transmission antennas and a codebook may be configured such that row matrices $[W'_{11} \ W'_{12}]$ and $[W'_{21} \ W'_{22}]$ are orthogonal. For example, if there are natural numbers $L_1$ and $L_2$ satisfying $L_{co} = L_1 + L_2$, $W'_{11}$ may be selected from $W(N, L_1)$ and $W'_{12}$ may be selected from $W(N, L_2)$ so as to be orthogonal to each other. Similarly, $W'_{21}$ may be selected from $W(N, L_1)$ and $W'_{22}$ may be selected from $W(N, L_2)$ so as to be orthogonal to each other.

Thus, since orthogonality between column vectors of a matrix $$\begin{bmatrix} W'_{11} & W'_{12} \\ W'_{21} & W'_{22} \end{bmatrix}$$

is guaranteed when generating a row vector, a whole matrix $W_{co}$ becomes a unitary matrix even if the coefficient matrix A does not satisfy a unitary property. Accordingly, $\alpha_{ij}$ may be determined such that $|\alpha_{ij}|=1$. For example, $\alpha_{ij}$ may be $\pm 1$, $\pm j$, or $$\frac{\pm 1 \pm j}{\sqrt{2}}.$$

Here, ∥ denotes an absolute value. This may be expressed by the following Equation 9:

$$W_{co} = \frac{1}{\sqrt{2}} \begin{bmatrix} \alpha_{11} W_{11}^{N,L_1} & \alpha_{12} W_{12}^{N,L_2} \\ \alpha_{21} W_{21}^{N,L_1} & \alpha_{2} W_{22}^{N,L_2} \end{bmatrix} \quad \text{[Equation 9]}$$

-continued subject to $\left(W_{i1}^{N,L_1}\right)^{IT} \cdot \left(W_{i2}^{N,L_2}\right) = 0_{L_1 \times L_2}$, where $L_{ca} = L_1 + L_2$, $W_{i1}^{N,L_1} \in W(N, L_1)$, $W_{i2}^{N,L_2} \in W(N, L_2)$, $|\alpha_{ij}| = 1$ A multi-BS precoding matrix codebook when the number of transmission layers is 4 may be generated by selecting matrices satisfying orthogonality in a row direction among precoding matrix combinations in which the number of transmission layers is 2 from a single-BS codebook.

The following Table 5 shows a multi-BS precoding matrix codebook generated when each of two BSs has 4 antennas and the number of transmission layers is 4.

TABLE 5

$$W\_co\_8Tx\_L\_4(:,:,1) = \begin{bmatrix} 0.1768 & 0+0.1768i & 0.1768 & 0-0.1768i \\ 0+0.1768i & 0.1768 & 0+0.1768i & -0.1768 \\ -0.1768 & 0+0.1768i & 0.1768 & 0+0.1768i \\ 0-0.1768i & 0.1768 & 0+0.1768i & 0.1768 \\ 0.1768 & 0-0.1768i & -0.1768 & 0-0.1768i \\ 0+0.1768i & -0.1768 & 0-0.1768i & -0.1768 \\ 0.1768 & 0+0.1768i & 0.1768 & 0-0.1768i \\ 0+0.1768i & 0.1768 & 0+0.1768i & -0.1768 \end{bmatrix}$$

$$W\_co\_8Tx\_L\_4(:,:,2) = \begin{bmatrix} 0.1768 & 0.1768 & 0.1768 & -0.1768 \\ -0.1768 & 0.1768 & 0-0.1768i & 0-0.1768i \\ 0.1768 & 0.1768 & -0.1768 & 0.1768 \\ -0.1768 & 0.1768 & 0+0.1768i & 0+0.1768i \\ 0.1768 & -0.1768 & -0.1768 & -0.1768 \\ 0-0.1768i & 0-0.1768i & 0.1768 & -0.1768 \\ -0.1768 & 0.1768 & -0.1768 & -0.1768 \\ 0+0.1768i & 0+0.1768i & 0.1768 & -0.1768 \end{bmatrix}$$

$$W\_co\_8Tx\_L\_4(:,:,3) = \begin{bmatrix} 0.1768 & 0.1768 & 0.1768 & -0.1768 \\ -0.1768 & 0.1768 & 0.1768 & 0.1768 \\ 0.1768 & 0.1768 & -0.1768 & 0.1768 \\ -0.1768 & 0.1768 & -0.1768 & -0.1768 \\ 0.1768 & -0.1768 & -0.1768 & -0.1768 \\ 0.1768 & 0.1768 & 0.1768 & -0.1768 \\ -0.1768 & 0.1768 & -0.1768 & -0.1768 \\ -0.1768 & -0.1768 & 0.1768 & -0.1768 \end{bmatrix}$$

$$W\_co\_8Tx\_L\_4(:,:,4) = \begin{bmatrix} 0.1768 & 0.1768 & 0.1768 & -0.1768 \\ -0.1768 & 0.1768 & -0.1768 & -0.1768 \\ 0.1768 & 0.1768 & -0.1768 & 0.1768 \\ -0.1768 & 0.1768 & 0.1768 & 0.1768 \\ 0.1768 & -0.1768 & -0.1768 & -0.1768 \\ -0.1768 & -0.1768 & 0.1768 & -0.1768 \\ -0.1768 & 0.1768 & -0.1768 & -0.1768 \\ 0.1768 & 0.1768 & 0.1768 & -0.1768 \end{bmatrix}$$

TABLE 5-continued $$W\_co\_8Tx\_L\_4(:,:,5) = \begin{bmatrix} 0.1768 & 0.1250 - 0.1250i & 0.1768 & -0.1250 + 0.1250i \\ 0.1250 + 0.1250i & 0.1768 & -0.1250 - 0.1250i & 0.1768 \\ 0 + 0.1768i & -0.1250 - 0.1250i & 0 + 0.1768i & 0.1250 + 0.1250i \\ -0.1250 + 0.1250i & 0 - 0.1768i & 0.1250 - 0.1250i & 0 - 0.1768i \\ 0.1768 & -0.1250 + 0.1250i & -0.1768 & -0.1250 + 0.1250i \\ -0.1250 - 0.1250i & 0.1768 & -0.1250 - 0.1250i & -0.1768 \\ 0 + 0.1768i & 0.1250 + 0.1250i & 0 - 0.1768i & 0.1250 + 0.1250i \\ 0.1250 - 0.1250i & 0 - 0.1768i & 0.1250 - 0.1250i & 0 + 0.1768i \end{bmatrix}$$

$$W\_co\_8Tx\_L\_4(:,:,6) = \begin{bmatrix} 0.1768 & -0.1250 - 0.1250i & 0.1768 & 0.1250 + 0.1250i \\ -0.1250 + 0.1250i & 0.1768 & 0.1250 - 0.1250i & 0.1768 \\ 0 - 0.1768i & 0.1250 - 0.1250i & 0 - 0.1768i & -0.1250 + 0.1250i \\ 0.1250 + 0.1250i & 0 + 0.1768i & -0.1250 - 0.1250i & 0 + 0.1768i \\ 0.1768 & 0.1250 + 0.1250i & -0.1768 & 0.1250 + 0.1250i \\ 0.1250 - 0.1250i & 0.1768 & 0.1250 - 0.1250i & -0.1768 \\ 0 - 0.1768i & -0.1250 + 0.1250i & 0 + 0.1768i & -0.1250 + 0.1250i \\ -0.1250 - 0.1250i & 0 + 0.1768i & -0.1250 - 0.1250i & 0 - 0.1768i \end{bmatrix}$$

$$W\_co\_8Tx\_L\_4(:,:,7) = \begin{bmatrix} 0.1768 & 0 - 0.1768i & 0.1768 & 0 + 0.1768i \\ 0 + 0.1768i & -0.1768 & 0 - 0.1768i & -0.1768 \\ 0.1768 & 0 + 0.1768i & 0.1768 & 0 - 0.1768i \\ 0 + 0.1768i & 0.1768 & 0 - 0.1768i & 0.1768 \\ 0.1768 & 0 + 0.1768i & -0.1768 & 0 + 0.1768i \\ 0 - 0.1768i & -0.1768 & 0 - 0.1768i & 0.1768 \\ 0.1768 & 0 - 0.1768i & -0.1768 & 0 - 0.1768i \\ 0 - 0.1768i & 0.1768 & 0 - 0.1768i & -0.1768 \end{bmatrix}$$

$$W\_co\_8Tx\_L\_4(:,:,8) = \begin{bmatrix} 0.1768 & 0.1768 & 0.1768 & -0.1768 \\ 0.1768 & 0.1768 & -0.1768 & 0.1768 \\ 0.1768 & -0.1768 & 0.1768 & 0.1768 \\ -0.1768 & 0.1768 & 0.1768 & 0.1768 \\ 0.1768 & -0.1768 & -0.1768 & -0.1768 \\ -0.1768 & 0.1768 & -0.1768 & -0.1768 \\ 0.1768 & 0.1768 & -0.1768 & 0.1768 \\ 0.1768 & 0.1768 & 0.1768 & -0.1768 \end{bmatrix}$$

$$W\_co\_8Tx\_L\_4(:,:,9) = \begin{bmatrix} 0.1768 & -0.1768 & 0.1768 & 0.1768 \\ -0.1768 & 0.1768 & 0.1768 & 0.1768 \\ 0.1768 & 0.1768 & 0.1768 & -0.1768 \\ 0.1768 & 0.1768 & -0.1768 & 0.1768 \\ 0.1768 & 0.1768 & -0.1768 & 0.1768 \\ 0.1768 & 0.1768 & 0.1768 & -0.1768 \\ 0.1768 & -0.1768 & -0.1768 & -0.1768 \\ -0.1768 & 0.1768 & -0.1768 & -0.1768 \end{bmatrix}$$

The following Table 6 shows a multi-BS precoding matrix codebook generated when each of two BSs has 4 antennas and the number of transmission layers is 3. If the number of transmission layers is 3, one column may be eliminated from the case where the number of transmission layers is 4.

TABLE 6

$$W\_co\_8Tx\_L\_3(:,:,1) = \begin{bmatrix} 0.2041 & 0+0.2041i & 0.2041 \\ 0+0.2041i & 0.2041 & 0+0.2041i \\ -0.2041 & 0+0.2041i & 0.2041 \\ 0-0.2041i & 0.2041 & 0+0.2041i \\ 0.2041 & -0.2041 & 0-0.2041i \\ 0+0.2041i & 0-0.2041i & -0.2041 \\ 0.2041 & 0.2041 & 0-0.2041i \\ 0+0.2041i & 0+0.2041i & -0.2041 \end{bmatrix}$$

$$W\_co\_8Tx\_L\_3(:,:,2) = \begin{bmatrix} 0.2041 & 0.2041 & 0.2041 \\ -0.2041 & 0.2041 & 0-0.2041i \\ 0.2041 & 0.2041 & -0.2041 \\ -0.2041 & 0.2041 & 0+0.2041i \\ 0.2041 & -0.2041 & -0.2041 \\ 0-0.2041i & 0.2041 & -0.2041 \\ -0.2041 & -0.2041 & -0.2041 \\ 0+0.2041i & 0.2041 & -0.2041 \end{bmatrix}$$

$$W\_co\_8Tx\_L\_3(:,:,3) = \begin{bmatrix} 0.2041 & 0.2041 & 0.2041 \\ -0.2041 & 0.2041 & 0.2041 \\ 0.2041 & 0.2041 & -0.2041 \\ -0.2041 & 0.2041 & -0.2041 \\ 0.2041 & -0.2041 & -0.2041 \\ 0.2041 & 0.2041 & -0.2041 \\ -0.2041 & -0.2041 & -0.2041 \\ -0.2041 & 0.2041 & -0.2041 \end{bmatrix}$$

$$W\_co\_8Tx\_L\_3(:,:,4) = \begin{bmatrix} 0.2041 & 0.2041 & 0.2041 \\ -0.2041 & 0.2041 & -0.2041 \\ 0.2041 & 0.2041 & -0.2041 \\ -0.2041 & 0.2041 & 0.2041 \\ 0.2041 & -0.2041 & -0.2041 \\ -0.2041 & 0.2041 & -0.2041 \\ -0.2041 & -0.2041 & -0.2041 \\ 0.2041 & 0.2041 & -0.2041 \end{bmatrix}$$

$$W\_co\_8Tx\_L\_3(:,:,5) = \begin{bmatrix} 0.2041 & 0.1443-0.1443i & 0.2041 \\ 0.1443+0.1443i & 0.2041 & -0.1443-0.1443i \\ 0+0.2041i & -0.1443-0.1443i & 0+0.2041i \\ -0.1443+0.1443i & 0-0.2041i & 0.1443-0.1443i \\ 0.2041 & -0.2041 & -0.1443+0.1443i \\ -0.1443-0.1443i & -0.1443-0.1443i & -0.2041 \\ 0+0.2041i & 0-0.2041i & 0.1443+0.1443i \\ 0.1443-0.1443i & 0.1443-0.1443i & 0+0.2041i \end{bmatrix}$$

$$W\_co\_8Tx\_L\_3(:,:,6) = \begin{bmatrix} 0.2041 & -0.1443-0.1443i & 0.2041 \\ -0.1443+0.1443i & 0.2041 & 0.1443-0.1443i \\ 0-0.2041i & 0.1443-0.1443i & 0-0.2041i \\ 0.1443+0.1443i & 0+0.2041i & -0.1443-0.1443i \\ 0.2041 & -0.2041 & 0.1443+0.1443i \\ 0.1443-0.1443i & 0.1443-0.1443i & -0.2041 \\ 0-0.2041i & 0+0.2041i & -0.1443+0.1443i \\ -0.1443-0.1443i & -0.1443-0.1443i & 0-0.2041i \end{bmatrix}$$

TABLE 6-continued $$W\_co\_8Tx\_L\_3(:,:,7) = \begin{bmatrix} 0.2041 & 0-0.2041i & 0.2041 \\ 0+0.2041i & -0.2041 & 0-0.2041i \\ 0.2041 & 0+0.2041i & 0.2041 \\ 0+0.2041i & 0.2041 & 0-0.2041i \\ 0.2041 & -0.2041 & 0+0.2041i \\ 0-0.2041i & 0-0.2041i & 0.2041 \\ 0.2041 & -0.2041 & 0-0.2041i \\ 0-0.2041i & 0-0.2041i & -0.2041 \end{bmatrix}$$

$$W\_co\_8Tx\_L\_3(:,:,8) = \begin{bmatrix} 0.2041 & 0.2041 & 0.2041 \\ 0.2041 & 0.2041 & -0.2041 \\ 0.2041 & -0.2041 & 0.2041 \\ -0.2041 & 0.2041 & 0.2041 \\ 0.2041 & -0.2041 & -0.2041 \\ -0.2041 & -0.2041 & -0.2041 \\ 0.2041 & -0.2041 & 0.2041 \\ 0.2041 & 0.2041 & -0.2041 \end{bmatrix}$$

$$W\_co\_8Tx\_L\_3(:,:,9) = \begin{bmatrix} 0.2041 & -0.2041 & 0.2041 \\ -0.2041 & 0.2041 & 0.2041 \\ 0.2041 & 0.2041 & 0.2041 \\ 0.2041 & 0.2041 & -0.2041 \\ 0.2041 & -0.2041 & 0.2041 \\ 0.2041 & 0.2041 & -0.2041 \\ 0.2041 & -0.2041 & -0.2041 \\ -0.2041 & -0.2041 & -0.2041 \end{bmatrix}$$

The following Table 7 shows a multi-BS precoding matrix codebook generated when each of two BSs has 4 antennas and the number of transmission layers is 2. If the number of transmission layers is 2, the multi-BS precoding matrix codebook may be generated by selecting matrices having orthogonality in a row direction among precoding matrix combinations in which the number of layers is 1 from a single-BS codebook.

TABLE 7

$$W\_co\_8Tx\_L\_2(:,:,1) = \begin{bmatrix} 0.2500 & 0.2500 \\ 0.2500 & -0.2500 \\ 0.2500 & 0.2500 \\ 0.2500 & -0.2500 \\ 0.2500 & -0.2500 \\ -0.2500 & -0.2500 \\ 0.2500 & -0.2500 \\ -0.2500 & -0.2500 \end{bmatrix}$$

$$W\_co\_8Tx\_L\_2(:,:,2) = \begin{bmatrix} 0.2500 & 0.2500 \\ 0.2500 & 0.2500 \\ 0.2500 & -0.2500 \\ 0.2500 & -0.2500 \\ 0.2500 & -0.2500 \\ 0.2500 & -0.2500 \\ -0.2500 & -0.2500 \\ -0.2500 & -0.2500 \end{bmatrix}$$

TABLE 7-continued $$W\_co\_8Tx\_L\_2(:,:,3) = \begin{bmatrix} 0.2500 & 0.2500 \\ 0.2500 & -0.2500 \\ 0.2500 & -0.2500 \\ 0.2500 & 0.2500 \\ 0.2500 & -0.2500 \\ -0.2500 & -0.2500 \\ -0.2500 & -0.2500 \\ 0.2500 & -0.2500 \end{bmatrix}$$

$$W\_co\_8Tx\_L\_2(:,:,4) = \begin{bmatrix} 0.2500 & 0.2500 \\ 0+0.2500i & 0-0.2500i \\ -0.2500 & -0.2500 \\ 0-0.2500i & 0+0.2500i \\ 0.2500 & -0.2500 \\ 0-0.2500i & 0-0.2500i \\ -0.2500 & 0.2500 \\ 0+0.2500i & 0+0.2500i \end{bmatrix}$$

$$W\_co\_8Tx\_L\_2(:,:,5) = \begin{bmatrix} 0.2500 & 0.2500 \\ 0+0.2500i & 0+0.2500i \\ -0.2500 & 0.2500 \\ 0-0.2500i & 0+0.2500i \\ 0.2500 & -0.2500 \\ 0+0.2500i & 0-0.2500i \\ 0.2500 & 0.2500 \\ 0+0.2500i & 0+0.2500i \end{bmatrix}$$

TABLE 7-continued $$W\_co\_8Tx\_L\_2(:,:,6) = \begin{bmatrix} 0.2500 & 0.2500 \\ 0+0.2500i & 0-0.2500i \\ -0.2500 & 0.2500 \\ 0-0.2500i & 0-0.2500i \\ 0.2500 & -0.2500 \\ 0-0.2500i & 0-0.2500i \\ 0.2500 & 0.2500 \\ 0-0.2500i & 0+0.2500i \end{bmatrix}$$

$$W\_co\_8Tx\_L\_2(:,:,7) = \begin{bmatrix} 0.2500 & 0.2500 \\ -0.2500 & 0.2500 \\ 0.2500 & -0.2500 \\ -0.2500 & -0.2500 \\ 0.2500 & -0.2500 \\ 0.2500 & 0.2500 \\ -0.2500 & -0.2500 \\ -0.2500 & 0.2500 \end{bmatrix}$$

$$W\_co\_8Tx\_L\_2(:,:,8) = \begin{bmatrix} 0.2500 & 0.2500 \\ -0.2500 & -0.2500 \\ 0.2500 & -0.2500 \\ -0.2500 & 0.2500 \\ 0.2500 & -0.2500 \\ -0.2500 & 0.2500 \\ -0.2500 & -0.2500 \\ 0.2500 & 0.2500 \end{bmatrix}$$

$$W\_co\_8Tx\_L\_2(:,:,9) = \begin{bmatrix} 0.2500 & 0.2500 \\ 0-0.2500i & 0+0.2500i \\ -0.2500 & 0.2500 \\ 0+0.2500i & 0+0.2500i \\ 0.2500 & -0.2500 \\ 0+0.2500i & 0+0.2500i \\ 0.2500 & 0.2500 \\ 0+0.2500i & 0-0.2500i \end{bmatrix}$$

$$W\_co\_8Tx\_L\_2(:,:,10) = \begin{bmatrix} 0.2500 & 0.2500 \\ 0-0.2500i & 0-0.2500i \\ -0.2500 & 0.2500 \\ 0+0.2500i & 0-0.2500i \\ 0.2500 & -0.2500 \\ 0-0.2500i & 0+0.2500i \\ 0.2500 & 0.2500 \\ 0-0.2500i & 0-0.2500i \end{bmatrix}$$

$$W\_co\_8Tx\_L\_2(:,:,11) = \begin{bmatrix} 0.2500 & 0.2500 \\ 0.1768+0.1768i & -0.1768+0.1768i \\ 0+0.2500i & 0-0.2500i \\ -0.1768+0.1768i & 0.1768+0.1768i \\ 0.2500 & -0.2500 \\ -0.1768+0.1768i & -0.1768-0.1768i \\ 0-0.2500i & 0-0.2500i \\ 0.1768+0.1768i & 0.1768-0.1768i \end{bmatrix}$$

$$W\_co\_8Tx\_L\_2(:,:,12) = \begin{bmatrix} 0.2500 & 0.2500 \\ 0.1768+0.1768i & -0.1768-0.1768i \\ 0+0.2500i & 0+0.2500i \\ -0.1768+0.1768i & 0.1768-0.1768i \\ 0.2500 & -0.2500 \\ -0.1768-0.1768i & -0.1768-0.1768i \\ 0+0.2500i & 0-0.2500i \\ 0.1768-0.1768i & 0.1768-0.1768i \end{bmatrix}$$

$$W\_co\_8Tx\_L\_2(:,:,13) = \begin{bmatrix} 0.2500 & 0.2500 \\ 0.1768+0.1768i & 0.1768-0.1768i \\ 0+0.2500i & 0-0.2500i \\ -0.1768+0.1768i & -0.1768-0.1768i \\ 0.2500 & -0.2500 \\ 0.1768-0.1768i & -0.1768-0.1768i \\ 0-0.2500i & 0-0.2500i \\ -0.1768-0.1768i & 0.1768-0.1768i \end{bmatrix}$$

$$W\_co\_8Tx\_L\_2(:,:,14) = \begin{bmatrix} 0.2500 & 0.2500 \\ -0.1768+0.1768i & -0.1768-0.1768i \\ 0-0.2500i & 0+0.2500i \\ 0.1768+0.1768i & 0.1768-0.1768i \\ 0.2500 & -0.2500 \\ -0.1768-0.1768i & 0.1768-0.1768i \\ 0+0.2500i & 0+0.2500i \\ 0.1768-0.1768i & -0.1768-0.1768i \end{bmatrix}$$

$$W\_co\_8Tx\_L\_2(:,:,15) = \begin{bmatrix} 0.2500 & 0.2500 \\ -0.1768+0.1768i & 0.1768-0.1768i \\ 0-0.2500i & 0-0.2500i \\ 0.1768+0.1768i & -0.1768-0.1768i \\ 0.2500 & -0.2500 \\ 0.1768-0.1768i & 0.1768-0.1768i \\ 0-0.2500i & 0+0.2500i \\ -0.1768-0.1768i & -0.1768-0.1768i \end{bmatrix}$$

$$W\_co\_8Tx\_L\_2(:,:,16) = \begin{bmatrix} 0.2500 & 0.2500 \\ -0.1768-0.1768i & 0.1768-0.1768i \\ 0+0.2500i & 0-0.2500i \\ 0.1768-0.1768i & -0.1768-0.1768i \\ 0.2500 & -0.2500 \\ 0.1768-0.1768i & 0.1768+0.1768i \\ 0-0.2500i & 0-0.2500i \\ -0.1768-0.1768i & -0.1768+0.1768i \end{bmatrix}$$

$$W\_co\_8Tx\_L\_2(:,:,17) = \begin{bmatrix} 0.2500 & 0.2500 \\ 0.2500 & -0.2500 \\ -0.2500 & -0.2500 \\ -0.2500 & 0.2500 \\ 0.2500 & -0.2500 \\ 0.2500 & 0.2500 \\ -0.2500 & -0.2500 \\ 0.2500 & 0.2500 \end{bmatrix}$$

TABLE 7-continued $$W\_co\_8Tx\_L\_2(:,:,18) = \begin{bmatrix} 0.2500 & 0.2500 \\ 0+0.2500i & 0-0.2500i \\ 0.2500 & 0.2500 \\ 0+0.2500i & 0-0.2500i \\ 0.2500 & -0.2500 \\ 0-0.2500i & 0-0.2500i \\ 0.2500 & -0.2500 \\ 0-0.2500i & 0-0.2500i \end{bmatrix}$$

The following Table 8 shows a multi-BS precoding matrix codebook generated when each of two BSs has 4 antennas and the number of transmission layers is 1. If the number of transmission layers is 1, the multi-BS precoding matrix codebook may be generated by repeatedly arranging a precoding matrix when the number of transmission layers is 1 in a column direction in a single-BS codebook.

TABLE 8

$$W\_co\_8Tx\_L\_1(:,:,1) = \begin{bmatrix} 0.3536 \\ 0.3536 \\ 0.3536 \\ 0.3536 \\ 0.3536 \\ 0.3536 \\ 0.3536 \\ 0.3536 \end{bmatrix}$$

$$W\_co\_8Tx\_L\_1(:,:,2) = \begin{bmatrix} 0.3536 \\ 0+0.3536i \\ -0.3536 \\ 0-0.3536i \\ 0.3536 \\ 0+0.3536i \\ -0.3536 \\ 0-0.3536i \end{bmatrix}$$

$$W\_co\_8Tx\_L\_1(:,:,3) = \begin{bmatrix} 0.3536 \\ -0.3536 \\ 0.3536 \\ -0.3536 \\ 0.3536 \\ -0.3536 \\ 0.3536 \\ -0.3536 \end{bmatrix}$$

$$W\_co\_8Tx\_L\_1(:,:,4) = \begin{bmatrix} 0.3536 \\ 0-0.3536i \\ -0.3536 \\ 0+0.3536i \\ 0.3536 \\ 0-0.3536i \\ -0.3536 \\ 0+0.3536i \end{bmatrix}$$

TABLE 8-continued $$W\_co\_8Tx\_L\_1(:,:,5) = \begin{bmatrix} 0.3536 \\ 0.2500+0.2500i \\ 0+0.3536i \\ -0.2500+0.2500i \\ 0.3536 \\ 0.2500+0.2500i \\ 0+0.3536i \\ -0.2500+0.2500i \end{bmatrix}$$

$$W\_co\_8Tx\_L\_1(:,:,6) = \begin{bmatrix} 0.3536 \\ -0.2500+0.2500i \\ 0-0.3536i \\ 0.2500+0.2500i \\ 0.3536 \\ -0.2500+0.2500i \\ 0-0.3536i \\ 0.2500+0.2500i \end{bmatrix}$$

$$W\_co\_8Tx\_L\_1(:,:,7) = \begin{bmatrix} 0.3536 \\ -0.2500-0.2500i \\ 0+0.3536i \\ 0.2500-0.2500i \\ 0.3536 \\ -0.2500-0.2500i \\ 0+0.3536i \\ 0.2500-0.2500i \end{bmatrix}$$

$$W\_co\_8Tx\_L\_1(:,:,8) = \begin{bmatrix} 0.3536 \\ 0.2500-0.2500i \\ 0-0.3536i \\ -0.2500-0.2500i \\ 0.3536 \\ 0.2500-0.2500i \\ 0-0.3536i \\ -0.2500-0.2500i \end{bmatrix}$$

$$W\_co\_8Tx\_L\_1(:,:,9) = \begin{bmatrix} 0.3536 \\ 0.3536 \\ -0.3536 \\ -0.3536 \\ 0.3536 \\ 0.3536 \\ -0.3536 \\ -0.3536 \end{bmatrix}$$

$$W\_co\_8Tx\_L\_1(:,:,10) = \begin{bmatrix} 0.3536 \\ 0+0.3536i \\ 0.3536 \\ 0+0.3536i \\ 0.3536 \\ 0+0.3536i \\ 0.3536 \\ 0+0.3536i \end{bmatrix}$$

$$W\_co\_8Tx\_L\_1(:,:,11) = \begin{bmatrix} 0.3536 \\ -0.3536 \\ -0.3536 \\ 0.3536 \\ 0.3536 \\ -0.3536 \\ -0.3536 \\ 0.3536 \end{bmatrix}$$

$$W\_co\_8Tx\_L\_1(:,:,12) = \begin{bmatrix} 0.3536 \\ 0 - 0.3536i \\ 0.3536 \\ 0 - 0.3536i \\ 0.3536 \\ 0 - 0.3536i \\ 0.3536 \\ 0 - 0.3536i \end{bmatrix}$$

$$W\_co\_8Tx\_L\_1(:,:,13) = \begin{bmatrix} 0.3536 \\ 0.3536 \\ 0.3536 \\ -0.3536 \\ 0.3536 \\ 0.3536 \\ 0.3536 \\ -0.3536 \end{bmatrix}$$

$$W\_co\_8Tx\_L\_1(:,:,14) = \begin{bmatrix} 0.3536 \\ 0.3536 \\ -0.3536 \\ 0.3536 \\ 0.3536 \\ 0.3536 \\ -0.3536 \\ 0.3536 \end{bmatrix}$$

$$W\_co\_8Tx\_L\_1(:,:,15) = \begin{bmatrix} 0.3536 \\ -0.3536 \\ 0.3536 \\ 0.3536 \\ 0.3536 \\ -0.3536 \\ 0.3536 \\ 0.3536 \end{bmatrix}$$

$$W\_co\_8Tx\_L\_1(:,:,16) = \begin{bmatrix} -0.3536 \\ 0.3536 \\ 0.3536 \\ 0.3536 \\ -0.3536 \\ 0.3536 \\ 0.3536 \\ 0.3536 \end{bmatrix}$$

$$W\_co\_8Tx\_L\_2(:,:,19) = \begin{bmatrix} 0.2500 & 0.2500 \\ 0.2500 & 0.2500 \\ 0.2500 & -0.2500 \\ -0.2500 & 0.2500 \\ 0.2500 & -0.2500 \\ 0.2500 & -0.2500 \\ -0.2500 & -0.2500 \\ 0.2500 & 0.2500 \end{bmatrix}$$

$$W\_co\_8Tx\_L\_2(:,:,20) = \begin{bmatrix} 0.2500 & 0.2500 \\ 0.2500 & -0.2500 \\ 0.2500 & 0.2500 \\ -0.2500 & 0.2500 \\ 0.2500 & -0.2500 \\ -0.2500 & -0.2500 \\ 0.2500 & -0.2500 \\ 0.2500 & 0.2500 \end{bmatrix}$$

$$W\_co\_8Tx\_L\_2(:,:,21) = \begin{bmatrix} 0.2500 & -0.2500 \\ 0.2500 & 0.2500 \\ 0.2500 & 0.2500 \\ -0.2500 & 0.2500 \\ -0.2500 & -0.2500 \\ 0.2500 & -0.2500 \\ 0.2500 & -0.2500 \\ 0.2500 & 0.2500 \end{bmatrix}$$

$$W\_co\_8Tx\_L\_2(:,:,22) = \begin{bmatrix} 0.2500 & 0.2500 \\ 0.2500 & -0.2500 \\ -0.2500 & 0.2500 \\ 0.2500 & 0.2500 \\ 0.2500 & -0.2500 \\ -0.2500 & -0.2500 \\ 0.2500 & 0.2500 \\ 0.2500 & -0.2500 \end{bmatrix}$$

$$W\_co\_8Tx\_L\_2(:,:,23) = \begin{bmatrix} 0.2500 & -0.2500 \\ 0.2500 & 0.2500 \\ -0.2500 & 0.2500 \\ 0.2500 & 0.2500 \\ -0.2500 & -0.2500 \\ 0.2500 & -0.2500 \\ 0.2500 & 0.2500 \\ 0.2500 & -0.2500 \end{bmatrix}$$

$$W\_co\_8Tx\_L\_2(:,:,24) = \begin{bmatrix} 0.2500 & -0.2500 \\ -0.2500 & 0.2500 \\ 0.2500 & 0.2500 \\ 0.2500 & 0.2500 \\ -0.2500 & -0.2500 \\ 0.2500 & 0.2500 \\ 0.2500 & -0.2500 \\ 0.2500 & -0.2500 \end{bmatrix}$$

A codebook of a specific size may be selected from among the precoding matrices of the above-described embodiments. An embodiment of a 3-bit (8) codebook or a 4-bit codebook per rank is proposed. In the present embodiment, a matrix may be selected to maximize a minimum chordal distance between precoding matrices from among the embodiments of precoding matrix generation per rank. A thesis "Limited Feedback Unitary Precoding for Spatial Multiplexing Systems" by David J. Love and Robert W. Heath, Jr. mathematically demonstrated that selecting a matrix to maximize a chordal distance is optimal.

First, an LTE-A 3-bit codebook is as follows. Embodiments are shown in which each of two BSs has 4 antennas and the number of transmission layers is 1 to 8.

| W_CoMP_L_1_3 bit(:, :, 1) = |
|---|
| 0.3536 |
| 0.3536 |
| 0.3536 |
| 0.3536 |
| 0.3536 |
| 0.3536 |
| −0.3536 |
| −0.3536 |

| W_CoMP_L_1_3 bit(:, :, 2) = |
|---|
| 0.3536 |
| 0 + 0.3536i |
| −0.3536 |
| 0 − 0.3536i |
| 0.3536 |
| 0 − 0.3536i |
| −0.3536 |
| 0 + 0.3536i |

| W_CoMP_L_1_3 bit(:, :, 3) = |
|---|
| 0.3536 |
| −0.3536 |
| 0.3536 |
| −0.3536 |
| 0.3536 |
| −0.3536 |
| −0.3536 |
| 0.3536 |

| W_CoMP_L_1_3 bit(:, :, 4) = |
|---|
| 0.3536 |
| 0 − 0.3536i |
| −0.3536 |
| 0 − 0.3536i |
| 0.3536 |
| 0 + 0.3536i |
| 0.3536 |
| 0 + 0.3536i |

| W_CoMP_L_1_3 bit(:, :, 5) = |
|---|
| 0.3536 |
| 0.2500 + 0.2500i |
| 0 + 0.3536i |
| −0.2500 + 0.2500i |
| 0.3536 |
| −0.2500 + 0.2500i |
| 0 − 0.3536i |
| 0.2500 + 0.2500i |

| W_CoMP_L_1_3 bit(:, :, 6) = |
|---|
| 0.3536 |
| −0.2500 − 0.2500i |
| 0 + 0.3536i |
| 0.2500 − 0.2500i |
| 0.3536 |
| 0.2500 − 0.2500i |
| 0 − 0.3536i |
| −0.2500 − 0.2500i |

| W_CoMP_L_1_3 bit(:, :, 7) = |
|---|
| 0.3536 |
| 0 + 0.3536i |
| 0.3536 |
| 0 + 0.3536i |
| 0.3536 |
| 0 − 0.3536i |
| 0.3536 |
| 0 − 0.3536i |

| W_CoMP_L_1_3 bit(:, :, 8) = |
|---|
| 0.3536 |
| 0.3536 |
| 0.3536 |
| −0.3536 |
| −0.3536 |
| 0.3536 |
| 0.3536 |
| 0.3536 |

| W_CoMP_L_2_3 bit(:, :, 1) = | |
|---|---|
| 0.2500 | 0.25 |
| 0.2500 | −0.25 |
| 0.2500 | 0.25 |
| 0.2500 | −0.25 |
| 0.2500 | −0.25 |
| −0.2500 | −0.25 |
| 0.2500 | −0.25 |
| −0.2500 | −0.25 |

| W_CoMP_L_2_3 bit(:, :, 2) = | |
|---|---|
| 0.2500 | 0.25 |
| 0.2500 | 0.25 |
| 0.2500 | −0.25 |
| 0.2500 | −0.25 |
| 0.2500 | −0.25 |
| 0.2500 | −0.25 |
| −0.2500 | −0.25 |
| −0.2500 | −0.25 |

| W_CoMP_L_2_3 bit(:, :, 3) = | |
|---|---|
| 0.2500 | 0.25 |
| 0.2500 | −0.25 |
| 0.2500 | −0.25 |
| 0.2500 | 0.25 |
| 0.2500 | −0.25 |
| −0.2500 | −0.25 |

-continued

| W_CoMP_L_2_3 bit(:, :, 3) = | |
|---|---|
| −0.2500 | −0.25 |
| 0.2500 | −0.25 |

| W_CoMP_L_2_3 bit(:, :, 4) = | |
|---|---|
| 0.2500 | 0.25 |
| 0 + 0.2500i | 0 − 0.2500i |
| −0.2500 | −0.25 |
| 0 − 0.2500i | 0 + 0.2500i |
| 0.2500 | −0.25 |
| 0 − 0.2500i | 0 − 0.2500i |
| −0.2500 | 0.25 |
| 0 + 0.2500i | 0 + 0.2500i |

| W_CoMP_L_2_3 bit(:, :, 5) = | |
|---|---|
| 0.2500 | 0.25 |
| 0 + 0.2500i | 0 + 0.2500i |
| −0.2500 | 0.25 |
| 0 − 0.2500i | 0 + 0.2500i |
| 0.2500 | −0.25 |
| 0 + 0.2500i | 0 − 0.2500i |
| 0.2500 | 0.25 |
| 0 + 0.2500i | 0 + 0.2500i |

| W_CoMP_L_2_3 bit(:, :, 6) = | |
|---|---|
| 0.2500 | 0.25 |
| 0 + 0.2500i | 0 − 0.2500i |
| −0.2500 | 0.25 |
| 0 − 0.2500i | 0 − 0.2500i |
| 0.2500 | −0.25 |
| 0 − 0.2500i | 0 − 0.2500i |
| 0.2500 | 0.25 |
| 0 − 0.2500i | 0 + 0.2500i |

| W_CoMP_L_2_3 bit(:, :, 7) = | |
|---|---|
| 0.2500 | 0.25 |
| −0.2500 | 0.25 |
| 0.2500 | −0.25 |
| −0.2500 | −0.25 |
| 0.2500 | −0.25 |
| 0.2500 | 0.25 |
| −0.2500 | −0.25 |
| −0.2500 | 0.25 |

| W_CoMP_L_2_3 bit(:, :, 8) = | |
|---|---|
| 0.2500 | 0.25 |
| −0.2500 | −0.25 |
| 0.2500 | −0.25 |
| −0.2500 | 0.25 |
| 0.2500 | −0.25 |
| −0.2500 | 0.25 |
| −0.2500 | −0.25 |
| 0.2500 | 0.25 |

| W_CoMP_L_3_3 bit(:, :, 1) = | | |
|---|---|---|
| 0.2041 | 0 + 0.2041i | 0.2041 |
| 0 + 0.2041i | 0.2041 | 0 + 0.2041i |
| −0.2041 | 0 + 0.2041i | 0.2041 |
| 0 − 0.2041i | 0.2041 | 0 + 0.2041i |
| 0.2041 | −0.2041 | 0 − 0.2041i |
| 0 + 0.2041i | 0 − 0.2041i | −0.2041 |
| 0.2041 | 0.2041 | 0 − 0.2041i |
| 0 + 0.2041i | 0 + 0.2041i | −0.2041 |

| W_CoMP_L_3_3 bit(:, :, 2) = | | |
|---|---|---|
| 0.2041 | 0.2041 | 0.2041 |
| −0.2041 | 0.2041 | 0.2041 |
| 0.2041 | 0.2041 | −0.2041 |
| −0.2041 | 0.2041 | −0.2041 |
| 0.2041 | −0.2041 | −0.2041 |
| 0.2041 | 0.2041 | −0.2041 |
| −0.2041 | −0.2041 | −0.2041 |
| −0.2041 | 0.2041 | −0.2041 |

| W_CoMP_L_3_3 bit(:, :, 3) = | | |
|---|---|---|
| 0.2041 | 0.2041 | 0.2041 |
| −0.2041 | 0.2041 | −0.2041 |
| 0.2041 | 0.2041 | −0.2041 |
| −0.2041 | 0.2041 | 0.2041 |
| 0.2041 | −0.2041 | −0.2041 |
| −0.2041 | 0.2041 | −0.2041 |
| −0.2041 | −0.2041 | −0.2041 |
| 0.2041 | 0.2041 | −0.2041 |

| W_CoMP_L_3_3 bit(:, :, 4) = | | |
|---|---|---|
| 0.2041 | 0.1443 − 0.1443i | 0.2041 |
| 0.1443 + 0.1443i | 0.2041 | −0.1443 − 0.1443i |
| 0 + 0.2041i | −0.1443 − 0.1443i | 0 + 0.2041i |
| −0.1443 + 0.1443i | 0 − 0.2041i | 0.1443 − 0.1443i |
| 0.2041 | −0.2041 | −0.1443 + 0.1443i |
| −0.1443 − 0.1443i | −0.1443 − 0.1443i | −0.2041 |
| 0 + 0.2041i | 0 − 0.2041i | 0.1443 + 0.1443i |
| 0.1443 − 0.1443i | 0.1443 − 0.1443i | 0 + 0.2041i |

| W_CoMP_L_3_3 bit(:, :, 5) = | | |
|---|---|---|
| 0.2041 | −0.1443 − 0.1443i | 0.2041 |
| −0.1443 + 0.1443i | 0.2041 | 0.1443 − 0.1443i |
| 0 − 0.2041i | 0.1443 − 0.1443i | 0 − 0.2041i |
| 0.1443 + 0.1443i | 0 + 0.2041i | −0.1443 − 0.1443i |
| 0.2041 | −0.2041 | 0.1443 + 0.1443i |
| 0.1443 − 0.1443i | 0.1443 − 0.1443i | −0.2041 |
| 0 − 0.2041i | 0 + 0.2041i | −0.1443 + 0.1443i |
| −0.1443 − 0.1443i | −0.1443 − 0.1443i | 0 − 0.2041i |

| W_CoMP_L_3_3 bit(:, :, 6) = | | |
|---|---|---|
| 0.2041 | 0 − 0.2041i | 0.2041 |
| 0 + 0.2041i | −0.2041 | 0 − 0.2041i |
| 0.2041 | 0 + 0.2041i | 0.2041 |
| 0 + 0.2041i | 0.2041 | 0 − 0.2041i |
| 0.2041 | −0.2041 | 0 + 0.2041i |
| 0 − 0.2041i | 0 − 0.2041i | 0.2041 |

W_CoMP_L_3_3 bit(:, :, 6) =

| 0.2041 | −0.2041 | 0 − 0.2041i |
|---|---|---|
| 0 − 0.2041i | 0 − 0.2041i | −0.2041 |

W_CoMP_L_3_3 bit(:, :, 7) =

| 0.2041 | 0.2041 | 0.2041 |
|---|---|---|
| 0.2041 | 0.2041 | −0.2041 |
| 0.2041 | −0.2041 | 0.2041 |
| −0.2041 | 0.2041 | 0.2041 |
| 0.2041 | −0.2041 | −0.2041 |
| −0.2041 | −0.2041 | −0.2041 |
| 0.2041 | −0.2041 | 0.2041 |
| 0.2041 | 0.2041 | −0.2041 |

W_CoMP_L_3_3 bit(:, :, 8) =

| 0.2041 | −0.2041 | 0.2041 |
|---|---|---|
| −0.2041 | 0.2041 | 0.2041 |
| 0.2041 | 0.2041 | 0.2041 |
| 0.2041 | 0.2041 | −0.2041 |
| 0.2041 | −0.2041 | 0.2041 |
| 0.2041 | 0.2041 | −0.2041 |
| 0.2041 | −0.2041 | −0.2041 |
| −0.2041 | −0.2041 | −0.2041 |

W_CoMP_L_4_3 bit(:, :, 1) =

| 0.1768 | 0 + 0.1768i | 0.1768 | 0 − 0.1768i |
|---|---|---|---|
| 0 + 0.1768i | 0 + 0.1768i | 0.1768 | −0.1768 |
| −0.1768 | 0 + 0.1768i | 0.1768 | 0 + 0.1768i |
| 0 − 0.1768i | 0.1768 | 0 + 0.1768i | 0.1768 |
| 0.1768 | 0 − 0.1768i | −0.1768 | 0 − 0.1768i |
| 0 + 0.1768i | −0.1768 | 0 − 0.1768i | −0.1768 |
| 0.1768 | 0 + 0.1768i | 0.1768 | 0 − 0.1768i |
| 0 + 0.1768i | 0.1768 | 0 + 0.1768i | −0.1768 |

W_CoMP_L_4_3 bit(:, :, 2) =

| 0.1768 | 0.1768 | 0.1768 | −0.1768 |
|---|---|---|---|
| −0.1768 | 0.1768 | 0 − 0.1768i | 0 − 0.1768i |
| 0.1768 | 0.1768 | −0.1768 | 0.1768 |
| −0.1768 | 0.1768 | 0 + 0.1768i | 0 + 0.1768i |
| 0.1768 | −0.1768 | −0.1768 | −0.1768 |
| 0 − 0.1768i | 0 − 0.1768i | 0.1768 | −0.1768 |
| −0.1768 | 0.1768 | −0.1768 | −0.1768 |
| 0 + 0.1768i | 0 + 0.1768i | 0.1768 | −0.1768 |

W_CoMP_L_4_3 bit(:, :, 3) =

| 0.1768 | 0.1768 | 0.1768 | −0.1768 |
|---|---|---|---|
| −0.1768 | 0.1768 | 0.1768 | 0.1768 |
| 0.1768 | 0.1768 | −0.1768 | 0.1768 |
| −0.1768 | 0.1768 | −0.1768 | −0.1768 |
| 0.1768 | −0.1768 | −0.1768 | −0.1768 |
| 0.1768 | 0.1768 | 0.1768 | −0.1768 |
| −0.1768 | 0.1768 | −0.1768 | −0.1768 |
| −0.1768 | −0.1768 | 0.1768 | −0.1768 |

W_CoMP_L_4_3 bit(:, :, 4) =

| 0.1768 | 0.1768 | 0.1768 | −0.1768 |
|---|---|---|---|
| −0.1768 | 0.1768 | −0.1768 | −0.1768 |
| 0.1768 | 0.1768 | −0.1768 | 0.1768 |
| −0.1768 | 0.1768 | 0.1768 | 0.1768 |
| 0.1768 | −0.1768 | −0.1768 | −0.1768 |
| −0.1768 | −0.1768 | 0.1768 | −0.1768 |
| −0.1768 | −0.1768 | −0.1768 | −0.1768 |
| 0.1768 | 0.1768 | 0.1768 | −0.1768 |

W_CoMP_L_4_3 bit(:, :, 5) =

| 0.1768 | 0.1250 − 0.1250i | 0.1768 | −0.1250 + 0.1250i |
|---|---|---|---|
| 0.1250 + 0.1250i | 0.1768 | −0.1250 − 0.1250i | 0.1768 |
| 0 + 0.1768i | −0.1250 − 0.1250i | 0 + 0.1768i | 0.1250 + 0.1250i |
| −0.1250 + 0.1250i | 0 − 0.1768i | 0.1250 − 0.1250i | 0 − 0.1768i |
| 0.1768 | −0.1250 − 0.1250i | −0.1768 | −0.1250 + 0.1250i |
| −0.1250 − 0.1250i | 0.1768 | −0.1250 − 0.1250i | −0.1768 |
| 0 + 0.1768i | 0.1250 + 0.1250i | 0 − 0.1768i | 0.1250 + 0.1250i |
| 0.1250 − 0.1250i | 0 − 0.1768i | 0.1250 − 0.1250i | 0 + 0.1768i |

W_CoMP_L_4_3 bit(:, :, 6) =

| 0.1768 | −0.1250 − 0.1250i | 0.1768 | 0.1250 + 0.1250i |
|---|---|---|---|
| −0.1250 + 0.1250i | 0.1768 | 0.1250 − 0.1250i | 0.1768 |
| 0 − 0.1768i | 0.1250 − 0.1250i | 0 − 0.1768i | −0.1250 + 0.1250i |
| 0.1250 + 0.1250i | 0 + 0.1768i | −0.1250 − 0.1250i | 0 + 0.1768i |
| 0.1768 | 0.1250 + 0.1250i | −0.1768 | 0.1250 + 0.1250i |
| 0.1250 − 0.1250i | 0.1768 | 0.1250 − 0.1250i | −0.1768 |
| 0 − 0.1768i | −0.1250 + 0.1250i | 0 + 0.1768i | −0.1250 + 0.1250i |
| −0.1250 − 0.1250i | 0 + 0.1768i | −0.1250 − 0.1250i | 0 − 0.1768i |

W_CoMP_L_4_3 bit(:, :, 7) =

| 0.1768 | 0 − 0.1768i | 0.1768 | 0 + 0.1768i |
|---|---|---|---|
| 0 + 0.1768i | −0.1768 | 0 − 0.1768i | −0.1768 |
| 0.1768 | 0 + 0.1768i | 0.1768 | 0 − 0.1768i |
| 0 + 0.1768i | 0.1768 | 0 − 0.1768i | 0.1768 |
| 0.1768 | 0 + 0.1768i | −0.1768 | 0 + 0.1768i |
| 0 − 0.1768i | −0.1768 | 0 − 0.1768i | 0.1768 |
| 0.1768 | 0 − 0.1768i | −0.1768 | 0 − 0.1768i |
| 0 − 0.1768i | 0.1768 | 0 − 0.1768i | −0.1768 |

W_CoMP_L_4_3 bit(:, :, 8) =

| 0.1768 | −0.1768 | 0.1768 | 0.1768 |
|---|---|---|---|
| −0.1768 | 0.1768 | 0.1768 | 0.1768 |
| 0.1768 | 0.1768 | 0.1768 | −0.1768 |
| 0.1768 | 0.1768 | −0.1768 | 0.1768 |
| 0.1768 | 0.1768 | −0.1768 | 0.1768 |
| 0.1768 | 0.1768 | 0.1768 | −0.1768 |
| 0.1768 | −0.1768 | −0.1768 | −0.1768 |
| −0.1768 | 0.1768 | −0.1768 | −0.1768 |

W_CoMP_L_5_3 bit(:, :, 1) =

| 0.1581 | 0.1581 | 0.1581 | 0.1581 | 0 + 0.1581i |
|---|---|---|---|---|
| 0.1581 | 0.1581 | −0.1581 | −0.1581 | 0.1581 |
| 0.1581 | −0.1581 | 0.1581 | −0.1581 | 0 + 0.1581i |
| 0.1581 | −0.1581 | −0.1581 | 0.1581 | 0.1581 |
| 0.1581 | 0.1581 | 0.1581 | 0.1581 | 0 − 0.1581i |
| 0.1581 | 0.1581 | −0.1581 | −0.1581 | −0.1581 |
| 0.1581 | −0.1581 | 0.1581 | −0.1581 | 0 − 0.1581i |
| 0.1581 | −0.1581 | −0.1581 | 0.1581 | −0.1581 |

W_CoMP_L_5_3 bit(:, :, 2) =

| 0.1581 | 0.1581 | 0.1581 | 0.1581 | −0.1581 |
|---|---|---|---|---|
| 0.1581 | 0.1581 | −0.1581 | −0.1581 | −0.1581 |
| 0.1581 | −0.1581 | 0.1581 | −0.1581 | 0.1581 |
| 0.1581 | −0.1581 | −0.1581 | 0.1581 | 0.1581 |
| 0.1581 | 0.1581 | 0.1581 | 0.1581 | 0.1581 |
| 0.1581 | 0.1581 | −0.1581 | −0.1581 | 0.1581 |
| 0.1581 | −0.1581 | 0.1581 | −0.1581 | −0.1581 |
| 0.1581 | −0.1581 | −0.1581 | 0.1581 | −0.1581 |

W_CoMP_L_5_3 bit(:, :, 3) =

| 0.1581 | 0.1581 | 0.1581 | 0.1581 | 0 − 0.1581i |
|---|---|---|---|---|
| 0.1581 | 0.1581 | −0.1581 | −0.1581 | 0.1581 |
| 0.1581 | −0.1581 | 0.1581 | −0.1581 | 0 − 0.1581i |
| 0.1581 | −0.1581 | −0.1581 | 0.1581 | 0.1581 |
| 0.1581 | 0.1581 | 0.1581 | 0.1581 | 0 + 0.1581i |
| 0.1581 | 0.1581 | −0.1581 | −0.1581 | −0.1581 |
| 0.1581 | −0.1581 | 0.1581 | −0.1581 | 0 + 0.1581i |
| 0.1581 | −0.1581 | −0.1581 | 0.1581 | −0.1581 |

W_CoMP_L_5_3 bit(:, :, 4) =

| 0.1581 | 0.1581 | 0.1581 | 0.1581 | −0.1581 |
|---|---|---|---|---|
| 0.1581 | 0.1581 | −0.1581 | −0.1581 | 0.1581 |
| 0.1581 | −0.1581 | 0.1581 | −0.1581 | −0.1581 |
| 0.1581 | −0.1581 | −0.1581 | 0.1581 | 0.1581 |
| 0.1581 | 0.1581 | 0.1581 | 0.1581 | 0.1581 |
| 0.1581 | 0.1581 | −0.1581 | −0.1581 | −0.1581 |
| 0.1581 | −0.1581 | 0.1581 | −0.1581 | 0.1581 |
| 0.1581 | −0.1581 | −0.1581 | 0.1581 | −0.1581 |

W_CoMP_L_5_3 bit(:, :, 5) =

| 0.1581 | 0.1581 | 0.1581 | 0.1581 | 0.1581 |
|---|---|---|---|---|
| 0.1581 | 0.1581 | −0.1581 | −0.1581 | 0.1581 |
| 0.1581 | −0.1581 | 0.1581 | −0.1581 | 0.1581 |
| 0.1581 | −0.1581 | −0.1581 | 0.1581 | 0.1581 |
| 0.1581 | 0.1581 | 0.1581 | 0.1581 | −0.1581 |
| 0.1581 | 0.1581 | −0.1581 | −0.1581 | −0.1581 |
| 0.1581 | −0.1581 | 0.1581 | −0.1581 | −0.1581 |
| 0.1581 | −0.1581 | −0.1581 | 0.1581 | −0.1581 |

W_CoMP_L_5_3 bit(:, :, 6) =

| 0.1581 | 0 − 0.1581i | −0.1581 | 0 + 0.1581i | 0 − 0.1581i |
|---|---|---|---|---|
| 0 + 0.1581i | 0.1581 | 0 + 0.1581i | 0.1581 | −0.1581 |
| −0.1581 | 0 − 0.1581i | 0.1581 | 0 + 0.1581i | 0 + 0.1581i |
| 0 − 0.1581i | 0.1581 | 0 − 0.1581i | 0.1581 | 0.1581 |
| 0.1581 | 0 − 0.1581i | −0.1581 | 0 + 0.1581i | 0 + 0.1581i |
| 0 + 0.1581i | 0.1581 | 0 + 0.1581i | 0.1581 | 0.1581 |
| −0.1581 | 0 − 0.1581i | 0.1581 | 0 + 0.1581i | 0 − 0.1581i |
| 0 − 0.1581i | 0.1581 | 0 − 0.1581i | 0.1581 | −0.1581 |

W_CoMP_L_5_3 bit(:, :, 7) =

| 0.1581 | 0 − 0.1581i | −0.1581 | 0 + 0.1581i | 0 + 0.1581i |
|---|---|---|---|---|
| 0 + 0.1581i | 0.1581 | 0 + 0.1581i | 0.1581 | −0.1581 |
| −0.1581 | 0 − 0.1581i | 0.1581 | 0 + 0.1581i | 0 − 0.1581i |
| 0 − 0.1581i | 0.1581 | 0 − 0.1581i | 0.1581 | 0.1581 |
| 0.1581 | 0 − 0.1581i | −0.1581 | 0 + 0.1581i | 0 − 0.1581i |
| 0 + 0.1581i | 0.1581 | 0 + 0.1581i | 0.1581 | 0.1581 |
| −0.1581 | 0 − 0.1581i | 0.1581 | 0 + 0.1581i | 0 + 0.1581i |
| 0 − 0.1581i | 0.1581 | 0 − 0.1581i | 0.1581 | −0.1581 |

| W_CoMP_L_5_3 bit(:, :, 8) = ||||| 
|---|---|---|---|---|
| 0.1581 | 0.1118 − 0.1118i | 0 − 0.1581i | −0.1118 − 0.1118i | 0.1118 − 0.1118i |
| 0.1118 + 0.1118i | 0.1581 | −0.1118 + 0.1118i | 0 + 0.1581i | 0 − 0.1581i |
| 0 + 0.1581i | −0.1118 − 0.1118i | 0.1581 | −0.1118 + 0.1118i | 0.1118 + 0.1118i |
| −0.1118 + 0.1118i | 0 − 0.1581i | −0.1118 − 0.1118i | 0.1581 | 0.1581 |
| 0.1581 | 0.1118 − 0.1118i | 0 − 0.1581i | −0.1118 − 0.1118i | −0.1118 + 0.1118i |
| 0.1118 + 0.1118i | 0.1581 | −0.1118 + 0.1118i | 0 + 0.1581i | 0 + 0.1581i |
| 0 + 0.1581i | −0.1118 − 0.1118i | 0.1581 | −0.1118 + 0.1118i | −0.1118 − 0.1118i |
| −0.1118 + 0.1118i | 0 − 0.1581i | −0.1118 − 0.1118i | 0.1581 | −0.1581 |

| W_CoMP_L_6_3 bit(:, :, 1) = ||||||
|---|---|---|---|---|---|
| 0.1443 | 0.1443 | 0.1443 | 0.1443 | −0.1443 | 0 + 0.1443i |
| 0.1443 | 0.1443 | −0.1443 | −0.1443 | 0 + 0.1443i | 0.1443 |
| 0.1443 | −0.1443 | 0.1443 | −0.1443 | 0.1443 | 0 + 0.1443i |
| 0.1443 | −0.1443 | −0.1443 | 0.1443 | 0 − 0.1443i | 0.1443 |
| 0.1443 | 0.1443 | 0.1443 | 0.1443 | 0.1443 | 0 − 0.1443i |
| 0.1443 | 0.1443 | −0.1443 | −0.1443 | 0 − 0.1443i | −0.1443 |
| 0.1443 | −0.1443 | 0.1443 | −0.1443 | −0.1443 | 0 − 0.1443i |
| 0.1443 | −0.1443 | −0.1443 | 0.1443 | 0 + 0.1443i | −0.1443 |

| W_CoMP_L_6_3 bit(:, :, 3) = ||||||
|---|---|---|---|---|---|
| 0.1443 | 0.1443 | 0.1443 | 0.1443 | −0.1443 | 0 − 0.1443i |
| 0.1443 | 0.1443 | −0.1443 | −0.1443 | 0 − 0.1443i | 0.1443 |
| 0.1443 | −0.1443 | 0.1443 | −0.1443 | 0.1443 | 0 − 0.1443i |
| 0.1443 | −0.1443 | −0.1443 | 0.1443 | 0 + 0.1443i | 0.1443 |
| 0.1443 | 0.1443 | 0.1443 | 0.1443 | 0.1443 | 0 + 0.1443i |
| 0.1443 | 0.1443 | −0.1443 | −0.1443 | 0 + 0.1443i | −0.1443 |
| 0.1443 | −0.1443 | 0.1443 | −0.1443 | −0.1443 | 0 + 0.1443i |
| 0.1443 | −0.1443 | −0.1443 | 0.1443 | 0 − 0.1443i | −0.1443 |

| W_CoMP_L_6_3 bit(:, :, 2) = ||||||
|---|---|---|---|---|---|
| 0.1443 | 0.1443 | 0.1443 | 0.1443 | 0.1443 | −0.1443 |
| 0.1443 | 0.1443 | −0.1443 | −0.1443 | 0.1443 | −0.1443 |
| 0.1443 | −0.1443 | 0.1443 | −0.1443 | 0.1443 | 0.1443 |
| 0.1443 | −0.1443 | −0.1443 | 0.1443 | 0.1443 | 0.1443 |
| 0.1443 | 0.1443 | 0.1443 | 0.1443 | −0.1443 | 0.1443 |
| 0.1443 | 0.1443 | −0.1443 | −0.1443 | −0.1443 | 0.1443 |
| 0.1443 | −0.1443 | 0.1443 | −0.1443 | −0.1443 | −0.1443 |
| 0.1443 | −0.1443 | −0.1443 | 0.1443 | −0.1443 | −0.1443 |

| W_CoMP_L_6_3 bit(:, :, 4) = ||||||
|---|---|---|---|---|---|
| 0.1443 | 0.1443 | 0.1443 | 0.1443 | −0.1443 | −0.1443 |
| 0.1443 | 0.1443 | −0.1443 | −0.1443 | 0.1443 | 0.1443 |
| 0.1443 | −0.1443 | 0.1443 | −0.1443 | 0.1443 | −0.1443 |
| 0.1443 | −0.1443 | −0.1443 | 0.1443 | −0.1443 | 0.1443 |
| 0.1443 | 0.1443 | 0.1443 | 0.1443 | 0.1443 | 0.1443 |
| 0.1443 | 0.1443 | −0.1443 | −0.1443 | −0.1443 | −0.1443 |
| 0.1443 | −0.1443 | 0.1443 | −0.1443 | −0.1443 | 0.1443 |
| 0.1443 | −0.1443 | −0.1443 | 0.1443 | 0.1443 | −0.1443 |

| W_CoMP_L_6_3 bit(:, :, 5) = ||||||
|---|---|---|---|---|---|
| 0.1443 | 0.1021 − 0.1021i | 0 − 0.1443i | −0.1021 − 0.1021i | 0 + 0.1443i | 0.1021 − 0.1021i |
| 0.1021 + 0.1021i | 0.1443 | −0.1021 + 0.1021i | 0 + 0.1443i | 0.1021 + 0.1021i | 0 − 0.1443i |
| 0 + 0.1443i | −0.1021 − 0.1021i | 0.1443 | −0.1021 + 0.1021i | 0.1443 | 0.1021 + 0.1021i |
| −0.1021 + 0.1021i | 0 − 0.1443i | −0.1021 − 0.1021i | 0.1443 | 0.1021 − 0.1021i | 0.1443 |
| 0.1443 | 0.1021 − 0.1021i | 0 − 0.1443i | −0.1021 − 0.1021i | 0 − 0.1443i | −0.1021 + 0.1021i |
| 0.1021 + 0.1021i | 0.1443 | −0.1021 + 0.1021i | 0 + 0.1443i | −0.1021 − 0.1021i | 0 + 0.1443i |
| 0 + 0.1443i | −0.1021 − 0.1021i | 0.1443 | −0.1021 + 0.1021i | −0.1443 | −0.1021 − 0.1021i |
| −0.1021 + 0.1021i | 0 − 0.1443i | −0.1021 − 0.1021i | 0.1443 | −0.1021 + 0.1021i | −0.1443 |

| W_CoMP_L_6_3 bit(:, :, 6) = ||||||
|---|---|---|---|---|---|
| 0.1443 | 0.1021 − 0.1021i | 0 − 0.1443i | −0.1021 − 0.1021i | 0 − 0.1443i | 0.1021 + 0.1021i |
| 0.1021 + 0.1021i | 0.1443 | −0.1021 + 0.1021i | 0 + 0.1443i | 0.1021 − 0.1021i | 0 + 0.1443i |
| 0 + 0.1443i | −0.1021 − 0.1021i | 0.1443 | −0.1021 + 0.1021i | 0.1443 | 0.1021 − 0.1021i |
| −0.1021 + 0.1021i | 0 − 0.1443i | −0.1021 − 0.1021i | 0.1443 | 0.1021 + 0.1021i | 0.1443 |
| 0.1443 | 0.1021 − 0.1021i | 0 − 0.1443i | −0.1021 − 0.1021i | 0 + 0.1443i | −0.1021 − 0.1021i |
| 0.1021 + 0.1021i | 0.1443 | −0.1021 + 0.1021i | 0 + 0.1443i | −0.1021 + 0.1021i | 0 − 0.1443i |
| 0 + 0.1443i | −0.1021 − 0.1021i | 0.1443 | −0.1021 + 0.1021i | −0.1443 | −0.1021 + 0.1021i |
| −0.1021 + 0.1021i | 0 − 0.1443i | −0.1021 − 0.1021i | 0.1443 | −0.1021 − 0.1021i | −0.1443 |

| W__CoMP__L__6__3 bit(:, :, 7) = | | | | | |
|---|---|---|---|---|---|
| 0.1443 | −0.1021 − 0.1021i | 0 + 0.1443i | 0.1021 − 0.1021i | 0 + 0.1443i | −0.1021 + 0.1021i |
| −0.1021 + 0.1021i | 0.1443 | 0.1021 + 0.1021i | 0 − 0.1443i | −0.1021 − 0.1021i | 0 − 0.1443i |
| 0 − 0.1443i | 0.1021 − 0.1021i | 0.1443 | 0.1021 + 0.1021i | 0.1443 | −0.1021 − 0.1021i |
| 0.1021 + 0.1021i | 0 + 0.1443i | 0.1021 − 0.1021i | 0.1443 | −0.1021 + 0.1021i | 0.1443 |
| 0.1443 | −0.1021 − 0.1021i | 0 + 0.1443i | 0.1021 − 0.1021i | 0 − 0.1443i | 0.1021 − 0.1021i |
| −0.1021 + 0.1021i | 0.1443 | 0.1021 + 0.1021i | 0 − 0.1443i | 0.1021 + 0.1021i | 0 + 0.1443i |
| 0 − 0.1443i | 0.1021 − 0.1021i | 0.1443 | 0.1021 + 0.1021i | −0.1443 | 0.1021 + 0.1021i |
| 0.1021 + 0.1021i | 0 + 0.1443i | 0.1021 − 0.1021i | 0.1443 | 0.1021 − 0.1021i | −0.1443 |

| W__CoMP__L__6__3 bit(:, :, 8) = | | | | | |
|---|---|---|---|---|---|
| 0.1443 | −0.1021 + 0.1021i | 0 − 0.1443i | 0.1021 + 0.1021i | 0 + 0.1443i | −0.1021 + 0.1021i |
| −0.1021 − 0.1021i | 0.1443 | 0.1021 − 0.1021i | 0 + 0.1443i | −0.1021 − 0.1021i | 0 − 0.1443i |
| 0 + 0.1443i | 0.1021 + 0.1021i | 0.1443 | 0.1021 − 0.1021i | 0.1443 | −0.1021 − 0.1021i |
| 0.1021 − 0.1021i | 0 − 0.1443i | 0.1021 + 0.1021i | 0.1443 | −0.1021 + 0.1021i | 0.1443 |
| 0.1443 | −0.1021 + 0.1021i | 0 − 0.1443i | 0.1021 + 0.1021i | 0 − 0.1443i | 0.1021 − 0.1021i |
| −0.1021 − 0.1021i | 0.1443 | 0.1021 − 0.1021i | 0 + 0.1443i | 0.1021 + 0.1021i | 0 + 0.1443i |
| 0 + 0.1443i | 0.1021 + 0.1021i | 0.1443 | 0.1021 − 0.1021i | −0.1443 | 0.1021 + 0.1021i |
| 0.1021 − 0.1021i | 0 − 0.1443i | 0.1021 + 0.1021i | 0.1443 | 0.1021 − 0.1021i | −0.1443 |

| W__CoMP__L__7__3bit(:, :, 1)= | | | | | | |
|---|---|---|---|---|---|---|
| 0.1336 | 0.1336 | 0.1336 | 0.1336 | 0 − 0.1336i | −0.1336 | 0 + 0.1336i |
| 0.1336 | 0.1336 | −0.1336 | −0.1336 | 0.1336 | 0 + 0.1336i | 0.1336 |
| 0.1336 | −0.1336 | 0.1336 | −0.1336 | 0 − 0.1336i | 0.1336 | 0 + 0.1336i |
| 0.1336 | −0.1336 | −0.1336 | 0.1336 | 0.1336 | 0 − 0.1336i | 0.1336 |
| 0.1336 | 0.1336 | 0.1336 | 0.1336 | 0 + 0.1336i | 0.1336 | 0 − 0.1336i |
| 0.1336 | 0.1336 | −0.1336 | −0.1336 | −0.1336 | 0 − 0.1336i | −0.1336 |
| 0.1336 | −0.1336 | 0.1336 | −0.1336 | 0 + 0.1336i | −0.1336 | 0 − 0.1336i |
| 0.1336 | −0.1336 | −0.1336 | 0.1336 | −0.1336 | 0 + 0.1336i | −0.1336 |

| W__CoMP__L__7__3bit(:, :, 2)= | | | | | | |
|---|---|---|---|---|---|---|
| 0.1336 | 0.1336 | 0.1336 | 0.1336 | −0.1336 | 0.1336 | −0.1336 |
| 0.1336 | 0.1336 | −0.1336 | −0.1336 | 0.1336 | 0.1336 | −0.1336 |
| 0.1336 | −0.1336 | 0.1336 | −0.1336 | 0.1336 | 0.1336 | 0.1336 |
| 0.1336 | −0.1336 | −0.1336 | 0.1336 | −0.1336 | 0.1336 | 0.1336 |
| 0.1336 | 0.1336 | 0.1336 | 0.1336 | 0.1336 | −0.1336 | 0.1336 |
| 0.1336 | 0.1336 | −0.1336 | −0.1336 | −0.1336 | −0.1336 | 0.1336 |
| 0.1336 | −0.1336 | 0.1336 | −0.1336 | −0.1336 | −0.1336 | −0.1336 |
| 0.1336 | −0.1336 | −0.1336 | 0.1336 | 0.1336 | −0.1336 | −0.1336 |

| W__CoMP__L__7__3bit(:, :, 4)= | | | | | | |
|---|---|---|---|---|---|---|
| 0.1336 | 0.1336 | 0.1336 | 0.1336 | 0.1336 | −0.1336 | −0.1336 |
| 0.1336 | 0.1336 | −0.1336 | −0.1336 | 0.1336 | 0.1336 | 0.1336 |
| 0.1336 | −0.1336 | 0.1336 | −0.1336 | 0.1336 | 0.1336 | −0.1336 |
| 0.1336 | −0.1336 | −0.1336 | 0.1336 | 0.1336 | −0.1336 | 0.1336 |
| 0.1336 | 0.1336 | 0.1336 | 0.1336 | −0.1336 | 0.1336 | 0.1336 |
| 0.1336 | 0.1336 | −0.1336 | −0.1336 | −0.1336 | −0.1336 | −0.1336 |
| 0.1336 | −0.1336 | 0.1336 | −0.1336 | −0.1336 | −0.1336 | 0.1336 |
| 0.1336 | −0.1336 | −0.1336 | 0.1336 | −0.1336 | 0.1336 | −0.1336 |

| W__CoMP__L__7__3bit(:, :, 3)= | | | | | | |
|---|---|---|---|---|---|---|
| 0.1336 | 0.1336 | 0.1336 | 0.1336 | 0 + 0.1336i | −0.1336 | 0 − 0.1336i |
| 0.1336 | 0.1336 | −0.1336 | −0.1336 | 0.1336 | 0 − 0.1336i | 0.1336 |
| 0.1336 | −0.1336 | 0.1336 | −0.1336 | 0 + 0.1336i | 0.1336 | 0 − 0.1336i |
| 0.1336 | −0.1336 | −0.1336 | 0.1336 | 0.1336 | 0 + 0.1336i | 0.1336 |
| 0.1336 | 0.1336 | 0.1336 | 0.1336 | 0 − 0.1336i | 0.1336 | 0 + 0.1336i |
| 0.1336 | 0.1336 | −0.1336 | −0.1336 | −0.1336 | 0 + 0.1336i | −0.1336 |
| 0.1336 | −0.1336 | 0.1336 | −0.1336 | 0 − 0.1336i | −0.1336 | 0 + 0.1336i |
| 0.1336 | −0.1336 | −0.1336 | 0.1336 | −0.1336 | 0 − 0.1336i | −0.1336 |

| W_CoMP_L_7_3bit(:, :, 5)= | | | | | | |
|---|---|---|---|---|---|---|
| 0.1336 | 0.1336 | 0.1336 | 0.1336 | −0.1336 | −0.1336 | 0.1336 |
| 0.1336 | 0.1336 | −0.1336 | −0.1336 | 0.1336 | −0.1336 | 0.1336 |
| 0.1336 | −0.1336 | 0.1336 | −0.1336 | −0.1336 | 0.1336 | 0.1336 |
| 0.1336 | −0.1336 | −0.1336 | 0.1336 | 0.1336 | 0.1336 | 0.1336 |

-continued

| W_CoMP_L_7_3bit(:, :, 5)= | | | | | | |
|---|---|---|---|---|---|---|
| 0.1336 | 0.1336 | 0.1336 | 0.1336 | 0.1336 | 0.1336 | −0.1336 |
| 0.1336 | 0.1336 | −0.1336 | −0.1336 | −0.1336 | 0.1336 | −0.1336 |
| 0.1336 | −0.1336 | 0.1336 | −0.1336 | 0.1336 | −0.1336 | −0.1336 |
| 0.1336 | −0.1336 | −0.1336 | 0.1336 | −0.1336 | −0.1336 | −0.1336 |

| W_CoMP_L_7_3bit(:, :, 6)= | | | | | | |
|---|---|---|---|---|---|---|
| 0.1336 | 0 − 0.1336i | −0.1336 | 0 + 0.1336i | 0 − 0.1336i | 0.1336 | 0 − 0.1336i |
| 0 + 0.1336i | 0.1336 | 0 + 0.1336i | 0.1336 | 0.1336 | 0 − 0.1336i | −0.1336 |
| −0.1336 | 0 − 0.1336i | 0.1336 | 0 + 0.1336i | 0 + 0.1336i | 0.1336 | 0 + 0.1336i |
| 0 − 0.1336i | 0.1336 | 0 − 0.1336i | 0.1336 | −0.1336 | 0 − 0.1336i | 0.1336 |
| 0.1336 | 0 − 0.1336i | −0.1336 | 0 + 0.1336i | 0 + 0.1336i | −0.1336 | 0 + 0.1336i |
| 0 + 0.1336i | 0.1336 | 0 + 0.1336i | 0.1336 | −0.1336 | 0 + 0.1336i | 0.1336 |
| −0.1336 | 0 − 0.1336i | 0.1336 | 0 + 0.1336i | 0 − 0.1336i | −0.1336 | 0 − 0.1336i |
| 0 − 0.1336i | 0.1336 | 0 − 0.1336i | 0.1336 | 0.1336 | 0 + 0.1336i | −0.1336 |

| W_CoMP_L 7_3bit(:, :, 7)= | | | | | | |
|---|---|---|---|---|---|---|
| 0.1336 | 0 − 0.1336i | −0.1336 | 0 + 0.1336i | 0 + 0.1336i | 0.1336 | 0 + 0.1336i |
| 0 + 0.1336i | 0.1336 | 0 + 0.1336i | 0.1336 | 0.1336 | 0 + 0.1336i | −0.1336 |
| −0.1336 | 0 − 0.1336i | 0.1336 | 0 + 0.1336i | 0 − 0.1336i | 0.1336 | 0 − 0.1336i |
| 0−0.1336i | 0.1336 | 0 − 0.1336i | 0.1336 | −0.1336 | 0 + 0.1336i | 0.1336 |
| 0.1336 | 0 − 0.1336i | −0.1336 | 0 + 0.1336i | 0 − 0.1336i | −0.1336 | 0 − 0.1336i |
| 0 + 0.1336i | 0.1336 | 0 + 0.1336i | 0.1336 | −0.1336 | 0 − 0.1336i | 0.1336 |
| −0.1336 | 0 − 0.1336i | 0.1336 | 0 + 0.1336i | 0 + 0.1336i | −0.1336 | 0 + 0.1336i |
| 0−0.1336i | 0.1336 | 0 − 0.1336i | 0.1336 | 0.1336 | 0 − 0.1336i | −0.1336 |

| W_CoMP_L_7_3bit(:, :, 8) = | | | | | | |
|---|---|---|---|---|---|---|
| 0.1336 | 0.0945 − 0.0945i | 0 − 0.1336i | −0.0945 − 0.0945i | −0.0945 − 0.0945i | 0 + 0.1336i | 0.0945 − 0.0945i |
| 0.0945 + 0.0945i | 0.1336 | −0.0945 + 0.0945i | 0 + 0.1336i | 0.1336 | 0.0945 + 0.0945i | 0 − 0.1336i |
| 0 + 0.1336i | −0.0945 − 0.0945i | 0.1336 | −0.0945 + 0.0945i | 0.0945 − 0.0945i | 0.1336 | 0.0945 + 0.0945i |
| −0.0945 + 0.0945i | 0 − 0.1336i | −0.0945 − 0.0945i | 0.1336 | 0 + 0.1336i | 0.0945 − 0.0945i | 0.1336 |
| 0.1336 | 0.0945 − 0.0945i | 0 − 0.1336i | −0.0945 − 0.0945i | 0.0945 + 0.0945i | 0 − 0.1336i | −0.0945 + 0.0945i |
| 0.0945 + 0.0945i | 0.1336 | −0.0945 + 0.0945i | 0 + 0.1336i | −0.1336 | −0.0945 − 0.0945i | 0 + 0.1336i |
| 0 + 0.1336i | −0.0945 − 0.0945i | 0.1336 | −0.0945 + 0.0945i | −0.0945 + 0.0945i | −0.1336 | −0.0945 − 0.0945i |
| −0.0945 + 0.0945i | 0 − 0.1336i | −0.0945 − 0.0945i | 0.1336 | 0 − 0.1336i | −0.0945 + 0.0945i | −0.1336 |

| W_CoMP_L_8_3bit(:, :, 1)= | | | | | | | |
|---|---|---|---|---|---|---|---|
| 0.1250 | 0.125 | 0.125 | 0.125 | 0.125 | 0 − 0.1250i | −0.125 | 0 + 0.1250i |
| 0.1250 | 0.125 | −0.125 | −0.125 | 0 + 0.1250i | 0.125 | 0 + 0.1250i | 0.125 |
| 0.1250 | −0.125 | 0.125 | −0.125 | −0.125 | 0 − 0.1250i | 0.125 | 0 + 0.1250i |
| 0.1250 | −0.125 | −0.125 | 0.125 | 0 − 0.1250i | 0.125 | 0 − 0.1250i | 0.125 |
| 0.1250 | 0.125 | 0.125 | 0.125 | −0.125 | 0 + 0.1250i | 0.125 | 0 − 0.1250i |
| 0.1250 | 0.125 | −0.125 | −0.125 | 0 − 0.1250i | −0.125 | 0 − 0.1250i | −0.125 |
| 0.1250 | −0.125 | 0.125 | −0.125 | 0.125 | 0 + 0.1250i | −0.125 | 0 − 0.1250i |
| 0.1250 | −0.125 | −0.125 | 0.125 | 0 + 0.1250i | −0.125 | 0 + 0.1250i | −0.125 |

| W_CoMP_L_8_3bit(:, :, 2)= | | | | | | | |
|---|---|---|---|---|---|---|---|
| 0.125 | 0.125 | 0.125 | 0.125 | 0.125 | −0.125 | 0.125 | −0.125 |
| 0.125 | 0.125 | −0.125 | −0.125 | −0.125 | 0.125 | 0.125 | −0.125 |
| 0.125 | −0.125 | 0.125 | −0.125 | 0.125 | 0.125 | 0.125 | 0.125 |
| 0.125 | −0.125 | −0.125 | 0.125 | −0.125 | −0.125 | 0.125 | 0.125 |

| W_CoMP_L_8_3bit(:, :, 2)= | | | | | | | |
|---|---|---|---|---|---|---|---|
| 0.125 | 0.125 | 0.125 | 0.125 | −0.125 | 0.125 | −0.125 | 0.125 |
| 0.125 | 0.125 | −0.125 | −0.125 | 0.125 | −0.125 | −0.125 | 0.125 |
| 0.125 | −0.125 | 0.125 | −0.125 | −0.125 | −0.125 | −0.125 | −0.125 |
| 0.125 | −0.125 | −0.125 | 0.125 | 0.125 | 0.125 | −0.125 | −0.125 |

| W_CoMP_L_8_3bit(:, :, 3)= | | | | | | | |
|---|---|---|---|---|---|---|---|
| 0.1250 | 0 − 0.1250i | −0.125 | 0 + 0.1250i | 0.125 | 0 + 0.1250i | −0.125 | 0 − 0.1250i |
| 0 + 0.1250i | 0.125 | 0 + 0.1250i | 0.125 | 0 − 0.1250i | 0.125 | 0 − 0.1250i | 0.125 |
| −0.1250 | 0 − 0.1250i | 0.125 | 0 + 0.1250i | −0.125 | 0 + 0.1250i | 0.125 | 0 − 0.1250i |
| 0 − 0.1250i | 0.125 | 0 − 0.1250i | 0.125 | 0 + 0.1250i | 0.125 | 0 + 0.1250i | 0.125 |
| 0.1250 | 0 − 0.1250i | −0.125 | 0 + 0.1250i | −0.125 | 0 − 0.1250i | 0.125 | 0 + 0.1250i |
| 0 + 0.1250i | 0.125 | 0 + 0.1250i | 0.125 | 0 + 0.1250i | −0.125 | 0 + 0.1250i | −0.125 |
| −0.1250 | 0 − 0.1250i | 0.125 | 0 + 0.1250i | 0.125 | 0 − 0.1250i | −0.125 | 0 + 0.1250i |
| 0 − 0.1250i | 0.125 | 0 − 0.1250i | 0.125 | 0 − 0.1250i | −0.125 | 0 − 0.1250i | −0.125 |

| W_CoMP_L_8_3bit(:, :, 4)= | | | | | | | |
|---|---|---|---|---|---|---|---|
| 0.1250 | 0.0884 − 0.0884i | 0 − 0.1250i | −0.0884 − 0.0884i | 0.125 | −0.0884 − 0.0884i | 0 + 0.1250i | 0.0884 − 0.0884i |
| 0.0884 + 0.0884i | 0.125 | −0.0884 + 0.0884i | 0 + 0.1250i | −0.0884 + 0.0884i | 0.125 | 0.0884 + 0.0884i | 0 − 0.1250i |
| 0 + 0.1250i | −0.0884 − 0.0884i | 0.125 | −0.0884 + 0.0884i | 0 − 0.1250i | 0.0884 − 0.0884i | 0.125 | 0.0884 + 0.0884i |
| −0.0884 + 0.0884i | 0 − 0.125i | −0.0884 − 0.0884i | 0.125 | 0.0884 + 0.0884i | 0 + 0.1250i | 0.0884 − 0.0884i | 0.125 |
| 0.1250 | 0.0884 − 0.0884i | 0 − 0.1250i | −0.0884 − 0.0884i | −0.125 | 0.0884 + 0.0884i | 0 − 0.1250i | −0.0884 + 0.0884i |
| 0.0884 + 0.0884i | 0.125 | −0.0884 + 0.0884i | 0 + 0.1250i | 0.0884 − 0.0884i | −0.125 | −0.0884 − 0.0884i | 0 + 0.1250i |
| 0 + 0.1250i | −0.0884 − 0.0884i | 0.125 | −0.0884 + 0.0884i | 0 + 0.1250i | −0.0884 + 0.0884i | −0.125 | −0.0884 − 0.0884i |
| −0.0884 + 0.0884i | 0 − 0.1250i | −0.0884 − 0.0884i | 0.125 | −0.0884 − 0.0884i | 0 − 0.1250i | −0.0884 + 0.0884i | −0.125 |

| W_CoMP_L_8_3bit(:, :, 5)= | | | | | | | |
|---|---|---|---|---|---|---|---|
| 0.1250 | 0.0884 − 0.0884i | 0 − 0.1250i | −0.0884 − 0.0884i | 0.125 | −0.0884 + 0.0884i | 0 − 0.1250i | 0.0884 + 0.0884i |
| 0.0884 + 0.0884i | 0.125 | −0.0884 + 0.0884i | 0 + 0.1250i | −0.0884 − 0.0884i | 0.125 | 0.0884 − 0.0884i | 0 + 0.1250i |
| 0 + 0.1250i | −0.0884 − 0.0884i | 0.125 | −0.0884 + 0.0884i | 0 + 0.1250i | 0.0884 + 0.0884i | 0.125 | 0.0884 − 0.0884i |
| −0.0884 + 0.0884i | 0 − 0.1250i | −0.0884 − 0.0884i | 0.125 | 0.0884 − 0.0884i | 0 − 0.1250i | 0.0884 + 0.0884i | 0.125 |
| 0.1250 | 0.0884 − 0.0884i | 0 − 0.1250i | −0.0884 − 0.0884i | −0.125 | 0.0884 − 0.0884i | 0 + 0.1250i | −0.0884 − 0.0884i |
| 0.0884 + 0.0884i | 0.125 | −0.0884 + 0.0884i | 0 + 0.1250i | 0.0884 + 0.0884i | −0.125 | −0.0884 + 0.0884i | 0 − 0.1250i |
| 0 + 0.1250i | −0.0884 − 0.0884i | 0.125 | −0.0884 + 0.0884i | 0 − 0.1250i | −0.0884 − 0.0884i | −0.125 | −0.0884 + 0.0884i |
| −0.0884 + 0.0884i | 0 − 0.1250i | −0.0884 − 0.0884i | 0.125 | −0.0884 + 0.0884i | 0 + 0.1250i | −0.0884 − 0.0884i | −0.125 |

| W_CoMP_L_8_3bit(:, :, 6)= | | | | | | | |
|---|---|---|---|---|---|---|---|
| 0.1250 | 0.0884 − 0.0884i | 0 − 0.1250i | −0.0884 − 0.0884i | 0.125 | 0.0884 + 0.0884i | 0 + 0.1250i | −0.0884 + 0.0884i |
| 0.0884 + 0.0884i | 0.125 | −0.0884 + 0.0884i | 0 + 0.1250i | 0.0884 − 0.0884i | 0.125 | −0.0884 − 0.0884i | 0 − 0.1250i |

-continued

| | W_CoMP_L_8_3bit(:, :, 6)= |
|---|---|---|---|---|---|---|---|
| 0 + 0.1250i | −0.0884 − 0.0884i | 0.125 | −0.0884 + 0.0884i | 0 − 0.1250i | −0.0884 + 0.0884i | 0.125 | −0.0884 − 0.0884i |
| −0.0884 + 0.0884i | 0 − 0.1250i | −0.0884 − 0.0884i | 0.125 | −0.0884 − 0.0884i | 0 + 0.1250i | −0.0884 + 0.0884i | 0.125 |
| 0.1250 | 0.0884 − 0.0884i | 0 − 0.1250i | −0.0884 − 0.0884i | −0.125 | −0.0884 − 0.0884i | 0 − 0.1250i | 0.0884 − 0.0884i |
| 0.0884 + 0.0884i | 0.125 | −0.0884 + 0.0884i | 0 + 0.1250i | −0.0884 + 0.0884i | −0.125 | 0.0884 + 0.0884i | 0 + 0.1250i |
| 0 + 0.1250i | −0.0884 − 0.0884i | 0.125 | −0.0884 + 0.0884i | 0 + 0.1250i | 0.0884 − 0.0884i | −0.125 | 0.0884 + 0.0884i |
| −0.0884 + 0.0884i | 0 − 0.1250i | −0.0884 − 0.0884i | 0.125 | 0.0884 + 0.0884i | 0 − 0.1250i | 0.0884 − 0.0884i | −0.125 |

| | W_CoMP_L_8_3bit(:, :, 7)= |
|---|---|---|---|---|---|---|---|
| 0.1250 | −0.0884 − 0.0884i | 0 + 0.1250i | 0.0884 − 0.0884i | 0.125 | −0.0884 + 0.0884i | 0 − 0.1250i | 0.0884 + 0.0884i |
| −0.0884 + 0.0884i | 0.125 | 0.0884 + 0.0884i | 0 − 0.1250i | −0.0884 − 0.0884i | 0.125 | 0.0884 − 0.0884i | 0 + 0.1250i |
| 0 − 0.1250i | 0.0884 − 0.0884i | 0.125 | 0.0884 + 0.0884i | 0 + 0.1250i | 0.0884 + 0.0884i | 0.125 | 0.0884 − 0.0884i |
| 0.0884 + 0.0884i | 0 + 0.1250i | 0.0884 − 0.0884i | 0.125 | 0.0884 − 0.0884i | 0 − 0.1250i | 0.0884 + 0.0884i | 0.125 |
| 0.1250 | −0.0884 − 0.0884i | 0 + 0.1250i | 0.0884 − 0.0884i | −0.125 | 0.0884 − 0.0884i | 0 + 0.1250i | −0.0884 − 0.0884i |
| −0.0884 + 0.0884i | 0.125 | 0.0884 + 0.0884i | 0 − 0.1250i | 0.0884 + 0.0884i | −0.125 | −0.0884 + 0.0884i | 0 − 0.1250i |
| 0 − 0.1250i | 0.0884 − 0.0884i | 0.125 | 0.0884 + 0.0884i | 0 − 0.1250i | −0.0884 − 0.0884i | −0.125 | −0.0884 + 0.0884i |
| 0.0884 + 0.0884i | 0 + 0.1250i | 0.0884 − 0.0884i | 0.125 | −0.0884 + 0.0884i | 0 + 0.1250i | −0.0884 − 0.0884i | −0.125 |

| | W_CoMP_L_8_3bit(:, :, 8)= |
|---|---|---|---|---|---|---|---|
| 0.1250 | −0.0884 − 0.0884i | 0 + 0.1250i | 0.0884 − 0.0884i | 0.125 | 0.0884 + 0.0884i | 0 + 0.1250i | −0.0884 + 0.0884i |
| −0.0884 + 0.0884i | 0.125 | 0.0884 + 0.0884i | 0 − 0.1250i | 0.0884 − 0.0884i | 0.125 | −0.0884 − 0.0884i | 0 − 0.1250i |
| 0 − 0.1250i | 0.0884 − 0.0884i | 0.125 | 0.0884 + 0.0884i | 0 − 0.1250i | −0.0884 + 0.0884i | 0.125 | −0.0884 − 0.0884i |
| 0.0884 + 0.0884i | 0 + 0.1250i | 0.0884 − 0.0884i | 0.125 | −0.0884 − 0.0884i | 0 + 0.1250i | −0.0884 + 0.0884i | 0.125 |
| 0.1250 | −0.0884 − 0.0884i | 0 + 0.1250i | 0.0884 − 0.0884i | −0.125 | −0.0884 − 0.0884i | 0 − 0.1250i | 0.0884 − 0.0884i |
| −0.0884 + 0.0884i | 0.125 | 0.0884 + 0.0884i | 0 − 0.1250i | −0.0884 + 0.0884i | −0.125 | 0.0884 + 0.0884i | 0 + 0.1250i |
| 0 − 0.1250i | 0.0884 − 0.0884i | 0.125 | 0.0884 + 0.0884i | 0 + 0.1250i | 0.0884 − 0.0884i | −0.125 | 0.0884 + 0.0884i |
| 0.0884 + 0.0884i | 0 + 0.1250i | 0.0884 − 0.0884i | 0.125 | 0.0884 + 0.0884i | 0 − 0.1250i | 0.0884 − 0.0884i | −0.125 |

Next, an embodiment of a 4-bit codebook is shown in which the numbers of transmission layers are 1 and 2 (i.e. in case of L=1 and 2).

| W_CoMP_L_1_4 bit(:, :, 1) = |
|---|
| 0.3536 |
| 0.3536 |
| 0.3536 |
| 0.3536 |
| 0.3536 |
| −0.3536 |
| 0.3536 |
| −0.3536 |

| W_CoMP_L_1_4 bit(:, :, 2) = |
|---|
| 0.3536 |
| 0.3536 |
| 0.3536 |
| 0.3536 |
| 0.3536 |
| 0.3536 |
| −0.3536 |
| −0.3536 |

| W_CoMP_L_1_4 bit(:, :, 3) = |
|---|
| 0.3536 |
| 0.3536 |
| 0.3536 |
| 0.3536 |
| 0.3536 |
| −0.3536 |
| −0.3536 |
| 0.3536 |

| W_CoMP_L_1_4 bit(:, :, 4) = |
|---|
| 0.3536 |
| 0 + 0.3536i |
| −0.3536 |
| 0 − 0.3536i |
| 0.3536 |
| 0 − 0.3536i |
| −0.3536 |
| 0 + 0.3536i |

| W_CoMP_L_1_4 bit(:, :, 5) = |
|---|
| 0.3536 |
| 0 + 0.3536i |
| −0.3536 |
| 0 − 0.3536i |
| 0.3536 |
| 0 + 0.3536i |
| 0.3536 |
| 0 + 0.3536i |

| W_CoMP_L_1_4 bit(:, :, 6) = |
|---|
| 0.3536 |
| 0 + 0.3536i |
| −0.3536 |
| 0 − 0.3536i |
| 0.3536 |
| 0 − 0.3536i |
| 0.3536 |
| 0 − 0.3536i |

| W_CoMP_L_1_4 bit(:, :, 7) = |
|---|
| 0.3536 |
| −0.3536 |
| 0.3536 |
| −0.3536 |
| 0.3536 |
| 0.3536 |
| −0.3536 |
| −0.3536 |

| W_CoMP_L_1_4 bit(:, :, 8) = |
|---|
| 0.3536 |
| −0.3536 |
| 0.3536 |
| −0.3536 |
| 0.3536 |
| −0.3536 |
| −0.3536 |
| 0.3536 |

| W_CoMP_L_1_4 bit(:, :, 9) = |
|---|
| 0.3536 |
| 0 − 0.3536i |
| −0.3536 |
| 0 + 0.3536i |
| 0.3536 |
| 0 + 0.3536i |
| 0.3536 |
| 0 + 0.3536i |

| W_CoMP_L_1_4 bit(:, :, 10) = |
|---|
| 0.3536 |
| 0 − 0.3536i |
| −0.3536 |
| 0 + 0.3536i |
| 0.3536 |
| 0 − 0.3536i |
| 0.3536 |
| 0 − 0.3536i |

| W_CoMP_L_1_4 bit(:, :, 11) = |
|---|
| 0.3536 |
| 0.3536 |
| 0.3536 |
| −0.3536 |
| 0.3536 |
| 0.3536 |
| −0.3536 |
| 0.3536 |

| W_CoMP_L_1_4 bit(:, :, 12) = |
|---|
| 0.3536 |
| 0.3536 |
| 0.3536 |
| −0.3536 |
| 0.3536 |
| −0.3536 |
| 0.3536 |
| 0.3536 |

| W_CoMP_L_1_4 bit(:, :, 13) = |
|---|
| 0.3536 |
| 0.3536 |
| 0.3536 |
| −0.3536 |
| −0.3536 |
| 0.3536 |

W_CoMP_L_1_4 bit(:, :, 13) =

0.3536
0.3536

W_CoMP_L_1_4 bit(:, :, 14) =

0.3536
0.3536
−0.3536
0.3536
0.3536
−0.3536
0.3536
0.3536

W_CoMP_L_1_4 bit(:, :, 15) =

0.3536
0.3536
−0.3536
0.3536
−0.3536
0.3536
0.3536
0.3536

W_CoMP_L_1_4 bit(:, :, 16) =

0.3536
−0.3536
0.3536
0.3536
−0.3536
0.3536
0.3536
0.3536

W_CoMP_L_2_4 bit(:, :, 1) =

| 0.25 | 0.25 |
| 0.25 | −0.25 |
| 0.25 | 0.25 |
| 0.25 | −0.25 |
| 0.25 | −0.25 |
| −0.25 | −0.25 |
| 0.25 | −0.25 |
| −0.25 | −0.25 |

W_CoMP_L_2_4 bit(:, :, 2) =

| 0.25 | 0.25 |
| 0.25 | 0.25 |
| 0.25 | −0.25 |
| 0.25 | −0.25 |
| 0.25 | −0.25 |
| 0.25 | −0.25 |
| −0.25 | −0.25 |
| −0.25 | −0.25 |

W_CoMP_L_2_4 bit(:, :, 3) =

| 0.25 | 0.25 |
| 0.25 | −0.25 |
| 0.25 | −0.25 |
| 0.25 | 0.25 |
| 0.25 | −0.25 |
| −0.25 | −0.25 |
| −0.25 | −0.25 |
| 0.25 | −0.25 |

W_CoMP_L_2_4 bit(:, :, 4) =

| 0.25 | 0.25 |
| 0 + 0.2500i | 0 − 0.2500i |
| −0.25 | −0.25 |
| 0 − 0.2500i | 0 + 0.2500i |
| 0.25 | −0.25 |
| 0 − 0.2500i | 0 − 0.2500i |
| −0.25 | 0.25 |
| 0 + 0.2500i | 0 + 0.2500i |

W_CoMP_L_2_4 bit(:, :, 5) =

| 0.25 | 0.25 |
| 0 + 0.2500i | 0 + 0.2500i |
| −0.25 | 0.25 |
| 0 − 0.2500i | 0 + 0.2500i |
| 0.25 | −0.25 |
| 0 + 0.2500i | 0 − 0.2500i |
| 0.25 | 0.25 |
| 0 + 0.2500i | 0 + 0.2500i |

W_CoMP_L_2_4 bit(:, :, 6) =

| 0.25 | 0.25 |
| 0 + 0.2500i | 0 − 0.2500i |
| −0.25 | 0.25 |
| 0 − 0.2500i | 0 − 0.2500i |
| 0.25 | −0.25 |
| 0 − 0.2500i | 0 − 0.2500i |
| 0.25 | 0.25 |
| 0 − 0.2500i | 0 + 0.2500i |

W_CoMP_L_2_4 bit(:, :, 7) =

| 0.25 | 0.25 |
| −0.25 | 0.25 |
| 0.25 | −0.25 |
| −0.25 | −0.25 |
| 0.25 | −0.25 |
| 0.25 | 0.25 |
| −0.25 | −0.25 |
| −0.25 | 0.25 |

W_CoMP_L_2_4 bit(:, :, 8) =

| 0.25 | 0.25 |
| −0.25 | −0.25 |
| 0.25 | −0.25 |
| −0.25 | 0.25 |
| 0.25 | −0.25 |
| −0.25 | 0.25 |
| 0.25 | −0.25 |
| −0.25 | 0.25 |

-continued

| W_CoMP_L_2_4 bit(:, :, 8) = | |
|---|---|
| −0.25 | −0.25 |
| 0.25 | 0.25 |

| W_CoMP_L_2_4 bit(:, :, 9) = | |
|---|---|
| 0.25 | 0.25 |
| 0 − 0.2500i | 0 + 0.2500i |
| −0.25 | 0.25 |
| 0 + 0.2500i | 0 + 0.2500i |
| 0.25 | −0.25 |
| 0 + 0.2500i | 0 + 0.2500i |
| 0.25 | 0.25 |
| 0 + 0.2500i | 0 − 0.2500i |

| W_CoMP_L_2_4 bit(:, :, 10) = | |
|---|---|
| 0.25 | 0.25 |
| 0 − 0.2500i | 0 − 0.2500i |
| −0.25 | 0.25 |
| 0 + 0.2500i | 0 − 0.2500i |
| 0.25 | −0.25 |
| 0 − 0.2500i | 0 + 0.2500i |
| 0.25 | 0.25 |
| 0 − 0.2500i | 0 − 0.2500i |

| W_CoMP_L_2_4 bit(:, :, 11) = | |
|---|---|
| 0.25 | 0.25 |
| 0.1768 + 0.1768i | −0.1768 + 0.1768i |
| 0 + 0.2500i | 0 − 0.2500i |
| −0.1768 + 0.1768i | 0.1768 + 0.1768i |
| 0.25 | −0.25 |
| −0.1768 + 0.1768i | −0.1768 − 0.1768i |
| 0 − 0.2500i | 0 − 0.2500i |
| 0.1768 + 0.1768i | 0.1768 − 0.1768i |

| W_CoMP_L_2_4 bit(:, :, 12) = | |
|---|---|
| 0.25 | 0.25 |
| 0.1768 + 0.1768i | −0.1768 − 0.1768i |
| 0 + 0.2500i | 0 + 0.2500i |
| −0.1768 + 0.1768i | 0.1768 + 0.1768i |
| 0.25 | −0.25 |
| −0.1768 − 0.1768i | −0.1768 − 0.1768i |
| 0 + 0.2500i | 0 − 0.2500i |
| 0.1768 − 0.1768i | 0.1768 − 0.1768i |

| W_CoMP_L_2_4 bit(:, :, 13) = | |
|---|---|
| 0.25 | 0.25 |
| 0.1768 + 0.1768i | 0.1768 − 0.1768i |
| 0 + 0.2500i | 0 − 0.2500i |
| −0.1768 + 0.1768i | −0.1768 − 0.1768i |
| 0.25 | −0.25 |
| 0.1768 − 0.1768i | −0.1768 − 0.1768i |
| 0 − 0.2500i | 0 − 0.2500i |
| −0.1768 − 0.1768i | 0.1768 − 0.1768i |

| W_CoMP_L_2_4 bit(:, :, 14) = | |
|---|---|
| 0.25 | 0.25 |
| −0.1768 + 0.1768i | −0.1768 − 0.1768i |
| 0 − 0.2500i | 0 + 0.2500i |
| 0.1768 + 0.1768i | 0.1768 − 0.1768i |
| 0.25 | −0.25 |
| −0.1768 − 0.1768i | 0.1768 − 0.1768i |
| 0 + 0.2500i | 0 + 0.2500i |
| 0.1768 − 0.1768i | −0.1768 − 0.1768i |

| W_CoMP_L_2_4 bit(:, :, 15) = | |
|---|---|
| 0.25 | 0.25 |
| −0.1768 + 0.1768i | 0.1768 − 0.1768i |
| 0 − 0.2500i | 0 − 0.2500i |
| 0.1768 + 0.1768i | −0.1768 − 0.1768i |
| 0.25 | −0.25 |
| 0.1768 − 0.1768i | 0.1768 − 0.1768i |
| 0 − 0.2500i | 0 + 0.2500i |
| −0.1768 − 0.1768i | −0.1768 − 0.1768i |

| W_CoMP_L_2_4 bit(:, :, 16) = | |
|---|---|
| 0.25 | 0.25 |
| −0.1768 − 0.1768i | 0.1768 − 0.1768i |
| 0 + 0.2500i | 0 − 0.2500i |
| 0.1768 − 0.1768i | −0.1768 − 0.1768i |
| 0.25 | −0.25 |
| 0.1768 − 0.1768i | 0.1768 + 0.1768i |
| 0 − 0.2500i | 0 − 0.2500i |
| −0.1768 − 0.1768i | −0.1768 + 0.1768i |

If the number of BSs participating in cooperation in the above-described two-BS cooperative scheme is increased, a precoding matrix should be re-configured. The following Equation 10 shows a matrix equation expressing precoding matrix configuration when three BSs are cooperative ($L_{co}=3N$).

$$W_{co}^{3N} = \frac{1}{\sqrt{3}} \begin{bmatrix} a_1 W_{11}^{N,L} & a_{12} W_{12}^{N,L} & a_{13} W_{13}^{N,L} \\ a_{21} W_{21}^{N,L} & a_{22} W_{22}^{N,L} & a_{23} W_{23}^{N,L} \\ a_{31} W_{31}^{N,L} & a_{32} W_{32}^{N,L} & a_{33} W_{33}^{N,L} \end{bmatrix} \quad \text{[Equation 10]}$$

Hereinafter, a method for generating a precoding matrix codebook when three BSs are cooperative will be described.

First, three row precoding matrices may be selected such that a minimum subspace distance is maximized. Namely, three equations are selected to maximize a subspace distance with respect to matrices having a minimum subspace distance. That is, an equation such as $$\max_{W_i, W_j} \min d_{SSD}(W_i, W_j)$$

may be used.

The same column precoding matrix is used when the magnitudes of antennas are all the same. A coefficient $\alpha_{ij}$ satisfying $A^H A = I$ (where I is a unitary matrix) in front of a matrix is determined to be $$W_{co}^H \cdot W_{co} = \frac{1}{L_{co}} I_{L_{co} \times L_{co}}.$$

For example, a coefficient of a DFT may be used.

A difference with a precoding matrix codebook for two-BS cooperation is that a minimum subspace distance is selected to be maximized in order to maximally reduce a correlation between row matrices when selecting row matrices. If orthogoality in a row direction is possible, matrices are selected to be orthogonal. If orthogoality in a row direction is not possible, matrices are selected such that column matrices are the same, $\alpha_{ij}$ satisfies $A^H A = I$, and $$W_{co}^H \cdot W_{co} = \frac{1}{L_{co}} I_{L_{co} \times L_{co}},$$

while a subspace distance is being maximized. A method for configuring a precoding matrix with respect to other numbers of transmission layers is the same as the method in the two-BS scheme.

Hereinafter, a more general design scheme for generating a multi-BS precoding matrix set $W_{co}$ will be described and a multi-BS precoding matrix design scheme when the numbers of antennas of cooperative BSs are different will be proposed. It is assumed that an existing single-BS precoding matrix is a unitary matrix and may use a precoding matrix reflected in the LTE communication standard.

A set indicating a usable combination of a precoding matrix $W_{ij}^{N_i,L_j}$ constituting a multi-BS precoding matrix set $W_{co}$ is defined as a PMI set $S_W$ and a set indicating a usable combination for a coefficient matrix $\alpha_{ij}$ is defined as a rotation set $S_A$.

In order for the multi-BS precoding matrix set $W_{co}$ generated from the PMI set $S_W$ and the rotation set $S_A$ to satisfy a unitary precoding matrix property, the PMI set $S_W$ and the rotation set $S_A$ should satisfy the following properties.

First, an r×c block matrix W (where r is the number of transmission layers and c is the number of antennas) constituting the PMI set $S_W$ has the following property.

$$W = \begin{bmatrix} W_{11}^{N_1,L_1} & W_{12}^{N_1,L_2} & \cdots & W_{1c}^{N_1,L_c} \\ W_{21}^{N_2,L_1} & W_{22}^{N_2,L_2} & \cdots & W_{2c}^{N_2,L_c} \\ \vdots & \vdots & \ddots & \vdots \\ W_{r1}^{N_r,L_1} & W_{r2}^{N_r,L_2} & \cdots & W_{rc}^{N_r,L_c} \end{bmatrix},$$ (Property 1)

$$\left(W_{im}^{N_i,L_m}\right)^H W_{in}^{N_i,L_n} = \left(W_{jm}^{N_j,L_m}\right)^H W_{jn}^{N_j,L_n},$$

where $i = 1, \ldots, r, j = 1, \ldots,$ $r, m = 1, \ldots, c, n = 1, \ldots, c$ That is, Property 1 means that the product of a Hermitian matrix of an arbitrary first precoding matrix in a first specific row and a second precoding matrix which is different from the first precoding matrix in the specific row is the same as the product of a Hermitian matrix of a third precoding matrix corresponding to the same column as the first precoding matrix in a second specific row and a fourth precoding matrix corresponding to the same column as the second precoding matrix in the second specific row.

Next, column vectors of an r×c rotation matrix A constituting the rotation set have an orthogonal property.

$$A = \begin{bmatrix} \alpha_{11} & \alpha_{12} & \cdots & \alpha_{1c} \\ \alpha_{21} & \alpha_{22} & \cdots & \alpha_{2c} \\ \vdots & \vdots & \ddots & \vdots \\ \alpha_{r1} & \alpha_{r2} & \cdots & \alpha_{rc} \end{bmatrix},$$ (Property 2)

$$\sum_{i=1}^{r} (\alpha_{im})^H \alpha_{in} = \begin{cases} 0 & m \neq n \\ 1 & m = n \end{cases}$$

The coefficient matrix A corresponds to a set of coefficients multiplied by single-BS precoding matrices (i.e. precoding matrices in W). Generally, a rotation set $S_A$ including R r×c rotation matrices may be determined by the following Equation 11. An additionally possible rotation set will be described hereinbelow.

$$S_A = \left\{ \begin{bmatrix} \alpha_{11}^k & \alpha_{12}^k & \cdots & \alpha_{1c}^k \\ \alpha_{21}^k & \alpha_{22}^k & \cdots & \alpha_{2c}^k \\ \vdots & \vdots & \ddots & \vdots \\ \alpha_{r1}^k & \alpha_{r2}^k & \cdots & \alpha_{rc}^k \end{bmatrix} \middle| \alpha_{mn}^k = \exp\left(j\frac{2\pi(m-1)}{c}\left((n-1)+\frac{k}{R}\right)\right), k = 0, \ldots, R-1 \right\}$$ [Equation 11]

<Case where the numbers of transmission antennas of two BSs (cells) are the same as N>

Assuming that an i-th precoding matrix for l-layer transmission when a BS having N transmission antennas performs existing single-cell transmission is $W_i^{N,1}$ a PMI set $S_W$ and a rotation set $S_A$ with respect to $1 \leq L_{co} \leq N$ and $N < L_{co} \leq 2N$ may be configured as follows:

(1) In case of $1 \leq L_{co} \leq N$

If $1 \leq L_{co} \leq N$

1) A PMI set $S_W$ may be generated in various forms as shown in the following Equation 12:

$$S_W^1 = \left\{ \begin{bmatrix} W_i^{N,L_{co}} \\ W_j^{N,L_{co}} \end{bmatrix} \middle| i = 1, \ldots, P_I, j = 1, \ldots, P_J \right\}$$ [Equation 12]

$$S_W^2 = \left\{ \begin{bmatrix} W_i^{N,L_{co}} \\ W_i^{N,L_{co}} \end{bmatrix} \middle| i = 1, \ldots, P_I \right\}$$

where $S_W^1$ and $S_W^2$ require feedback of $\lceil \log_2(P_I P_J) \rceil$-bit size and $\lceil \log_2(P_I) \rceil$-bit size, respectively, and $S_W^2$ is restricted to such that PMIs fed back to two cells are the same in order to reduce feedback overhead. Throughout this specification, $\lceil \ \rceil$ is a symbol denoting a ceil ( ) function which indicates the smallest integer which is not less than a factor in parentheses.

One of the above defined two sets may be used for feedback according to feedback size, and $P_I = 2^n$ and $P_J = 2^m$ may be satisfied to efficiently use a given feedback size.

2) Rotation set $S_A$

In case of $1 \leq L_{co} \leq N$, the rotation set $S_A$ may be configured as shown in the following Equation 13:

$$S_A = \left\{ [1\ 0]^H, [0\ 1]^H, [1\ e^{j\theta_i}]^H \mid \theta_i = \frac{2\pi i}{R}, i = 1, \ldots, R \right\} \quad \text{[Equation 13]}$$

For example, if R=2, then the rotation set may be $S_A=\{[1\ 0]^H, [1\ 0]^H, [1\ 1]^H, [1\ -1]^H\}$. As another example, if R=6, then the rotation set may be $S_A=\{[1\ 0]^H, [0\ 1]^H, [1\ 1]^H, [1-j]^H, [1\ -1]^H, [1\ j]^H, [1\ e^{j\pi/4}]^H, [1\ e^{-j\pi/4}]^H\}$ instead of applying Equation 13 in order to reduce calculation complexity. This is because the calculation complexity can be considerably reduced when a precoder is expressed only by real numbers or imaginary numbers.

α=0 indicates an operation in which each BS individually provides services to a UE of each cell in the same way as a conventional method by stopping cooperation when a channel from one cell (BS) instantaneously enters deep fading while cells perform cooperative communication.

Similarly, if three BSs participate in cooperation for signal transmission and if the number of transmission layers of cooperative BSs is $1 \leq L_{co} \leq N$, a PMI set may be determined by permitting each cell to independently change a precoder matrix index or using the same index. As another example, a rotation set as indicated by Equation 14 may be considered:

$$S_A^1 = \left\{ [0\ 1\ 1]^H, [1\ 0\ 1]^H, [1\ 1\ 0]^H, [1\ e^{j\theta_i}\ e^{j\theta_i}]^H \mid \theta_i = \frac{2\pi i}{R}, i = 1, \ldots, R \right\} \quad \text{[Equation 14]}$$

$$S_A^2 = \left\{ [0\ 1\ 1]^H, [1\ 0\ 1]^H, [1\ 1\ 0]^H, [1\ e^{j\theta_i}\ -e^{j\theta_i}]^H \mid \theta_i = \frac{2\pi i}{R}, i = 1, \ldots, R \right\}$$

$$S_A^3 = \left\{ [0\ 1\ 1]^H, [1\ 0\ 1]^H, [1\ 1\ 0]^H, [1\ e^{j\theta_i}\ e^{j\theta_k}]^H \mid \theta_i = \frac{2\pi i}{R}, \right.$$
$$\left. i = 1, \ldots, R, \theta_k = \frac{2\pi k}{R}, k = 1, \ldots, R \right\}$$

Since a possibility that two of three BSs (cells) enter deep fading is considerably low, it is efficient not to cover all BSs in consideration of feedback overhead. However, a rotation set may be configured by adding $[0\ 0\ 1]^H, [0\ 1\ 0]^H$, and $[1\ 0\ 0]^H$ to each set of Equation. 14.

(2) $N < L_{co} \leq 2N$

1) PMI set $S_w$

Various PMI sets such as $S_W^1, S_W^2$, and $S_W^3$ may be defined as shown below. Here, the PMI set is merely one example.

$$S_W^1 = \quad \text{[Equation 15]}$$

$$\left\{ \begin{bmatrix} W_i^{N,N} & W_{i'}^{N,L_{co}-N} \\ W_j^{N,N} & W_{j'}^{N,L_{co}-N} \end{bmatrix} \middle| i = 1, \ldots, P_I, j = 1, \ldots, P_J \right\}$$

$$S_W^2 = \left\{ \begin{bmatrix} W_i^{N,N} & W_j^{N,L_{co}-N} \\ W_i^{N,N} & W_j^{N,L_{co}-N} \end{bmatrix} \middle| i = 1, \ldots, P_I, j = 1, \ldots, P_J \right\}$$

$$S_W^3 = \left\{ \begin{bmatrix} W_i^{N,N} & W_i^{N,L_{co}-N} \\ W_i^{N,N} & W_i^{N,L_{co}-N} \end{bmatrix} \middle| i = 1, \ldots, P_I \right\}$$

In Equation 15, i' and j' of $S_W^1$ are precoding matrix indexes determined by a function f(i,j). The function f(i,j) indicates a function for obtaining i' and j' having the longest subspace distances between and $W_i^{N,N}$ and $W_{i'}^{N,L_{co}-N}$ and $W_j^{N,N}$ and $W_{j'}^{N,L_{co}-N}$ while satisfying Property 1 (i.e. $(W_i^{N,N})^H W_{i'}^{N,L_{co}-N} = (W_j^{N,N})^H W_{j'}^{N,L_{co}-N}$) described with reference to the r×c block matrix W constituting the PMI set. In other words, it is possible to know i' and j' having the lowest correlation by operation of the function f(i,j). If f(i,j) does not exist with respect to specific i and j, then i and j may be excluded from the set.

In Equation 15, precoding matrices which are elements of $S_W^2$ may be configured to select precoding matrices with the same index in a column direction. In this case, it is necessary to satisfy Property 1 in the above-described multi-BS precoding codebook W with respect to i and j.

Referring to Equation 15, both $S_W^1$ and $S_W^2$ require feedback of $\lceil \log_2(P_I P_J) \rceil$-bit size. $S_W^3$ is designed such that all precoding matrix indexes have the same value in order to further reduce feedback overhead and it can be appreciated that feedback of $\lceil \log_2(P_I) \rceil$-bit size is needed.

2) Rotation set $S_A$

The rotation set $S_A$ shown in Equation 16 requires feedback of $\lceil \log_2(R) \rceil$-bit size.

$$S_A \left\{ \begin{bmatrix} 1 & 1 \\ e^{j\theta_i} & -e^{j\theta_i} \end{bmatrix} \middle| \theta_i = \frac{2\pi i}{R}, i = 1, \ldots, R \right\} \quad \text{[Equation 16]}$$

In this case, $e^{j\theta_i}$ corresponds to a $2^q$-Phase Shift Keying (PSK) constellation point.

Next, a method for obtaining a multi-BS cooperative precoding matrix set $W_{co}$ when the numbers of transmission antennas of two BSs (cells) are different (the number of transmission antennas of BS 1 is $N_1$ and the number of transmission antennas of BS 2 is $N_2$) is described.

<Case where the numbers of transmission antennas of two BSs (cells) are different (the number of transmission antennas of BS 1 is $N_1$ and the number of transmission antennas of BS 2 is $N_2$)>

(1) $N_1 = 2N_2$

If the number of antennas of BS 1, ($N_1$), is twice the number of antennas of BS 2, ($N_2$), then PMI sets for $1 \leq L_{co} \leq N_2$, $N_2 < L_{co} \leq N_1$, and $N_1 < L_{co} \leq N_1 + N_2$ may be configured as follows.

1) In case of $1 \leq L_{co} \leq N_2$ $$S_W^1 = \left\{ \left[ \begin{array}{c} W_i^{N_1,L_{co}} \\ W_{j'}^{N_2,L_{co}} \end{array} \right] \middle| i = 1, \ldots, P_I, j = 1, \ldots, P_J \right\},$$ [Equation 17]

$$S_W^2 = \left\{ \left[ \begin{array}{c} W_i^{N_1,L_{co}} \\ W_i^{N_2,L_{co}} \end{array} \right] \middle| i = 1, \ldots, P_I \right\}$$

The PMI set shown in Equation 17 may consider two cases of i=j and i≠j as shown in Equation 12 and a rotation set may be configured by applying the same method as in Equation 13.

2) $N_2 < L_{co} \leq N_1$ $$S_W^1 = \left\{ \left[ \begin{array}{cc} W_i^{N_1,N_2} & W_{i'}^{N_1,L_{co}-N_2} \\ W_j^{N_2,N_2} & W_{j'}^{N_2,L_{co}-N_2} \end{array} \right] \middle| i = 1, \ldots, \right.$$ [Equation 18]

$$\left. P_I, j = 1, \ldots, P_J \right\},$$

$$S_W^2 = \left\{ \left[ \begin{array}{cc} W_i^{N_1,N_2} & W_j^{N_1,L_{co}-N_2} \\ W_{i'}^{N_2,N_2} & W_{j'}^{N_2,L_{co}-N_2} \end{array} \right] \middle| i = \right.$$

$$\left. 1, \ldots, P_I, j = 1, \ldots, P_J \right\},$$

$$S_W^3 = \left\{ \left[ \begin{array}{cc} W_i^{N_1,N_2} & W_i^{N_1,L_{co}-N_2} \\ W_i^{N_2,N_2} & W_i^{N_2,L_{co}-N_2} \end{array} \right] \middle| i = 1, \ldots, P_I \right\}$$

The PMI set $S_W$ may consider three cases similar to Equation 15 and the rotation set $S_A$ may be configured using the same method as in Equation 16. In this case, i' and j' of $S_W^1$ are precoding matrix indexes determined by a function $f_1(i,j)$. The function $f_1(i,j)$ indicates i' and j' having the longest subspace distances between $W_i^{N_1,N_2}$ and $W_{i'}^{N_1,L_{co}-N_2}$, $W_j^{N_2,N_2}$ and $W_{j'}^{N_2,L_{co}-N_2}$ while satisfying Property 1 (i.e. $(W_i^{N_1,N_2})^H W_{i'}^{N_1,L_{co}-N_2} = (W_j^{N_2,L_{co}-N_2})$) in a multi-BS precoding codebook W. It is possible to know i' and j' having the lowest correlation by operation of the function f(i, j).

If $f_1(i,j)$ does not exist with respect to specific i and j, then i and j may be excluded from the PMI set. Since a precoding matrix $W_i^{N_1,1}$ of $N_1$ antennas constituting the first row in $S_W^2$ and a precoding matrix $W_i^{N_2,1}$ of $N_2$ antennas constituting the second row are different, Property 1 is not guaranteed even if there is the same PMI in a column direction as in $S_W^2$ of Equation 15.

Accordingly, i' and j' of $W_{co}^2$ are precoding matrix indexes determined by a function $f_2(i,j)$. Using the function $f_2(i,j)$, i' and j' satisfying Property 1 (i.e. $(W_i^{N_1,N_2})^H W_{i'}^{N_1,L_{co}-N_2} = (W_{i'}^{N_2,N_2})^H W_{j'}^{N_2,L_{co}-N_2}$) in the multi-BS precoding codebook W can be obtained. If $f_2(i,j)$ does not exist with respect to specific i and j, then i and j may be excluded from the PMI set.

3) In case of $N_1 < L_{co} \leq N_1 + N_2$ $$S_W^1 = \left\{ \left[ \begin{array}{ccc} W_i^{N_2,N_2} & W_{i'}^{N_2,N_2} & W_{i''}^{N_2,L_{co}-2N_2} \\ W_j^{N_2,N_2} & W_{j'}^{N_2,N_2} & W_{j''}^{N_2,L_{co}-2N_2} \\ W_k^{N_2,N_2} & W_{k'}^{N_2,N_2} & W_{k''}^{N_2,L_{co}-2N_2} \end{array} \right] \middle| i = 1, \ldots, \right.$$ [Equation 19]

$$\left. P_I, j = 1, \ldots, P_J, k = 1, \ldots, P_K \right\},$$

$$S_W^2 = \left\{ \left[ \begin{array}{ccc} W_i^{N_2,N_2} & W_j^{N_2,N_2} & W_k^{N_2,L_{co}-2N_2} \\ W_i^{N_2,N_2} & W_j^{N_2,N_2} & W_k^{N_2,L_{co}-2N_2} \\ W_i^{N_2,N_2} & W_j^{N_2,N_2} & W_k^{N_2,L_{co}-2N_2} \end{array} \right] \middle| i = \right.$$

$$\left. 1, \ldots, P_I, j = 1, \ldots, P_J, k = 1, \ldots, P_K \right\},$$

$$S_W^3 = \left\{ \left[ \begin{array}{ccc} W_i^{N_2,N_2} & W_i^{N_2,N_2} & W_i^{N_2,L_{co}-2N_2} \\ W_i^{N_2,N_2} & W_i^{N_2,N_2} & W_i^{N_2,L_{co}-2N_2} \\ W_i^{N_2,N_2} & W_i^{N_2,N_2} & W_i^{N_2,L_{co}-2N_2} \end{array} \right] \middle| i = 1, \ldots, P_I \right\}$$

Here, i', j',k',i", j" and k" are precoding matrix indexes determined by a function f(i,j,k). The function f(i,j,k) indicates i',j',k',i", j" and k" satisfying Property 1 in the multi-BS precoding codebook W. In other words, the following Equation 20 is satisfied with respect to the precoding matrix indexes i', j',k',i", j" and k" calculated through the function f (i,j,k).

$$(W_i^{N_2,N_2})^H W_{i''}^{N_2,L_{co}-2N_2} = (W_{i'}^{N_2,N_2})^H W_{j''}^{N_2,L_{co}-2N_2} = (W_k^{N_2,N_2})^H W_{k''}^{N_2,L_{co}-2N_2},$$

$$(W_i^{N_2,N_2})^H W_{i'}^{N_2,N_2} = (W_j^{N_2,N_2})^H W_{j'}^{N_2,N_2} = (W_k^{N_2,N_2})^H W_{k'}^{N_2,N_2},$$

$$(W_{i'}^{N_2,N_2})^H W_{i''}^{N_2,L_{co}-2N_2} = (W_{j'}^{N_2,N_2})^H W_{j''}^{N_2,L_{co}-2N_2} = (W_{k'}^{N_2,N_2})^H W_{k''}^{N_2,L_{co}-2N_2}$$ [Equation 20]

If f(i,j,k) does not exist with respect to specific i, j, and k, then the precoding matrix indexes i, j, and k may be excluded from the PMI set.

(2) $N_1 = ZN_2$ (where Z is a natural number except for 1)

If the number ($N_1$) of antennas of BS 1 is a natural multiple of the number ($N_2$) of antennas of BS 2, PMI sets for $1 \leq L_{co} \leq N_2$ and $N_2 < L_{co} \leq N_1 + N_2$ may be configured by the following Equation 21 and Equation 22:

1) $1 \leq L_{co} \leq N_2$ $$S_W^1 = \left\{ \left[ \begin{array}{c} W_i^{N_1,L_{co}} \\ W_j^{N_2,L_{co}} \end{array} \right] \middle| i = 1, \ldots, P_I, j = 1, \ldots, P_J \right\},$$ [Equation 21]

$$S_W^2 = \left\{ \left[ \begin{array}{c} W_i^{N_1,L_{co}} \\ W_i^{N_2,L_{co}} \end{array} \right] \middle| i = 1, \ldots, P_I \right\}$$

A PMI set may consider two cases of i=j and i≠j as shown in Equation 12 and a rotation set may be configured by applying the same method as in Equation 13.

2) $N_2 < L_{co} \leq N_1 + N_2$

A PMI set having an $\lceil L_{co}/N_2 \rceil \times \lceil L_{co}/N_2 \rceil$ block matrix as an element may be any one of three sets shown in Equation 22.

$$S_W^1 = \left\{ \begin{bmatrix} w_{i_{11}}^{m_1,N_2} & w_{i_{12}}^{m_1,N_2} & \cdots & w_{i_{1(C-1)}}^{m_1,N_2} & w_{i_{1C}}^{m_1,L_{co}-(C-1)N_2} \\ \vdots & \vdots & & \vdots & \\ w_{i_{(C-1)1}}^{m_{C-1},N_2} & w_{i_{(C-1)2}}^{m_{C-1},N_2} & \cdots & w_{i_{(C-1)(C-1)}}^{m_{C-1},N_2} & w_{i_{(C-1)C}}^{m_{C-1},L_{co}-(C-1)N_2} \\ w_{i_{C1}}^{N_2,N_2} & w_{i_{C2}}^{N_2,N_2} & \cdots & w_{i_{C(C-1)}}^{N_2,N_2} & w_{i_{CC}}^{N_2,L_{co}-(C-1)N_2} \end{bmatrix} \middle| i_{n1} = 1, \ldots, P_n, n = 1, \ldots, C \right\},$$

$$S_W^2 = \left\{ \begin{bmatrix} w_{i_{11}}^{m_1,N_2} & w_{i_{12}}^{m_1,N_2} & \cdots & w_{i_{1(C-1)}}^{m_1,N_2} & w_{i_{1C}}^{m_1,L_{co}-(C-1)N_2} \\ \vdots & \vdots & & \vdots & \\ w_{i_{(C-1)1}}^{m_{C-1},N_2} & w_{i_{(C-1)2}}^{m_{C-1},N_2} & \cdots & w_{i_{(C-1)(C-1)}}^{m_{C-1},N_2} & w_{i_{(C-1)C}}^{m_{C-1},L_{co}-(C-1)N_2} \\ w_{i_{C1}}^{N_2,N_2} & w_{i_{C2}}^{N_2,N_2} & \cdots & w_{i_{C(C-1)}}^{N_2,N_2} & w_{i_{CC}}^{N_2,L_{co}-(C-1)N_2} \end{bmatrix} \middle| i_{1n} = 1, \ldots, P_n, n = 1, \ldots, C \right\},$$

$$S_W^3 = \left\{ \begin{bmatrix} w_i^{m_1,N_2} & w_i^{m_1,N_2} & \cdots & w_i^{m_1,N_2} & w_i^{m_1,L_{co}-(C-1)N_2} \\ \vdots & \vdots & & \vdots & \\ w_i^{m_{C-1},N_2} & w_i^{m_{C-1},N_2} & \cdots & w_i^{m_{C-1},N_2} & w_i^{m_{C-1},L_{co}-(C-1)N_2} \\ w_i^{N_2,N_2} & w_i^{N_2,N_2} & \cdots & w_i^{N_2,N_2} & w_i^{N_2,L_{co}-(C-1)N_2} \end{bmatrix} \middle| i = 1, \ldots, P \right\},$$

[Equation 22]

where $N_1 = \sum_{i=1}^{C-1} m_i$, $N_2 \leq m_i$, $C = \lceil L_{co}/N_2 \rceil$.

A PMI $i_{mn}$ (where m=1, ..., C, n=2, ..., C) except for $i_{11}, i_{21}, \ldots, i_{C1}$ from $S_W^1$ is determined by a function $f_1(i_{11}, i_{21}, \ldots, i_{C1})$, and the function $f_1(i_{11}, i_{21}, \ldots, i_{C1})$ indicates $i_{mn}$ that Property 1 in the multi-BS precoding codebook W is satisfied. If $f_1(i_{11}, i_{21}, \ldots, i_{C1})$ does not exist with respect to specific $i_{11}, i_{21}, \ldots, i_{C1}$, then $i_{11}, i_{21}, \ldots, i_{C1}$ may be excluded from the PMI set. Similarly, a PMI $i_{mn}$ (where m=2, ..., C, n=1, ..., C) except for $i_{11}, i_{12}, \ldots, i_{1C}$ from $S_W^2$ is determined by a function $f_2(i_{11}, i_{12}, \ldots, i_{1C})$. The function $f_2(i_{11}, i_{12}, \ldots, i_{1C})$ indicates $i_{mn}$ satisfying Property 1 in the multi-BS precoding codebook W. If $f_2(i_{11}, i_{12}, \ldots, i_{1C})$ does not exist with respect to specific $i_{11,12}, \ldots, i_{1C}$, then $i_{11}, i_{12}, \ldots, i_{1C}$ may be excluded from the PMI set.

Figure 4:
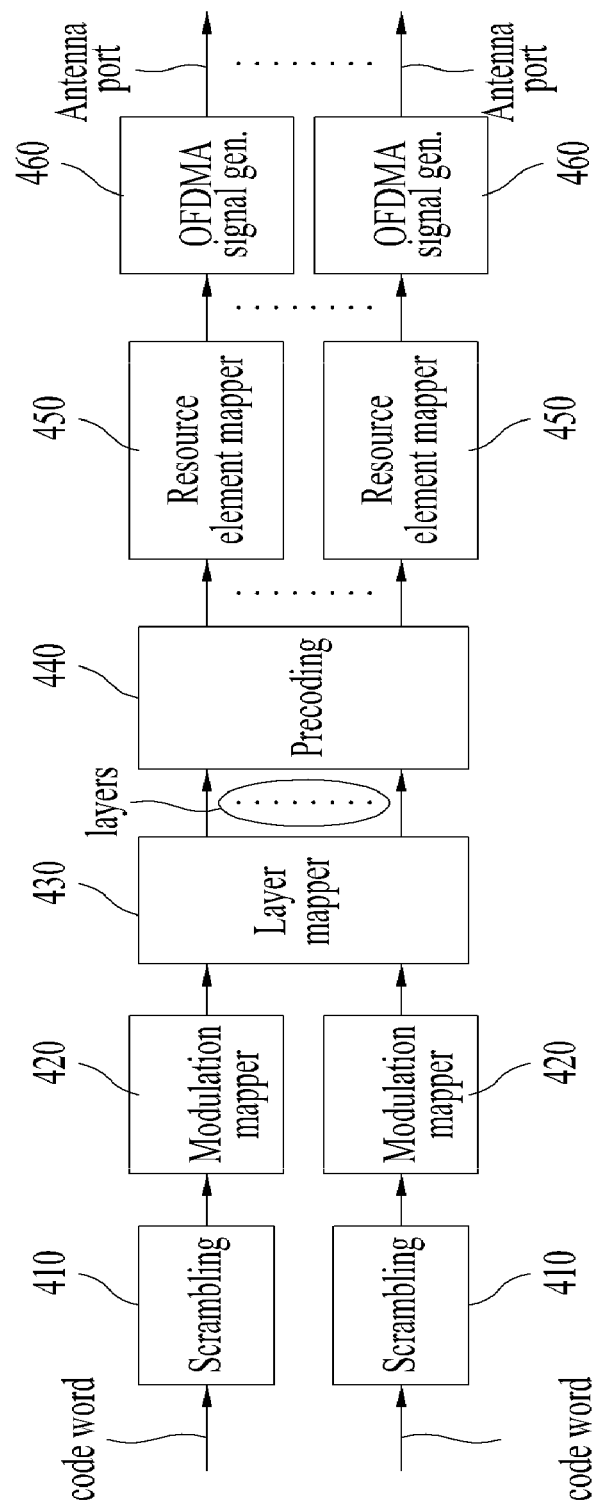
FIG. 4 is a block diagram illustrating an exemplary embodiment of the structure of an OFDM/MIMO transmitter to which precoding is introduced.

FIG. 4 is a block diagram illustrating an exemplary embodiment of the structure of an OFDM/MIMO transmitter to which precoding is introduced.

Referring to FIG. 4, a transmitter of a wireless communication system according to the present invention may include scrambling modules 410, modulation mappers 420, a layer mapper 430, a precoding module 440, resource element mappers 450, and OFDMA signal generators 460.

Transmitted data is restored in a receiver with a channel estimation value estimated by an additional pilot channel (or reference channel). Accordingly, in transmitting an OFDM signal in the transmitter, the configuration of the pilot channel for channel estimation plays an important role in restoring a signal of the receiver. To configure a MIMO channel, channel estimation for each antenna is needed and a corresponding pilot signal is inserted for transmission to a time axis and a frequency axis with a constant pattern with respect to each antenna.

The scrambling modules 410 randomly scramble encoded signals input to the OFDM/MIMO transmitter. The modulation mappers 420 may modulate the scrambled signals to forms suitable for transmission. The layer mapper 430 may map the modulated signals to transmission layers. The precoding module 440 may perform beamforming to support multi-layer transmission in a MIMO system.

The resource element mappers 450 may insert corresponding pilot signals for channel estimation to every antenna with a constant pattern. The OFDM signal generators 460 may insert OFDM signals into the modulated signals and the inserted signals may be transmitted to the receiver through antenna ports.

Figure 5:
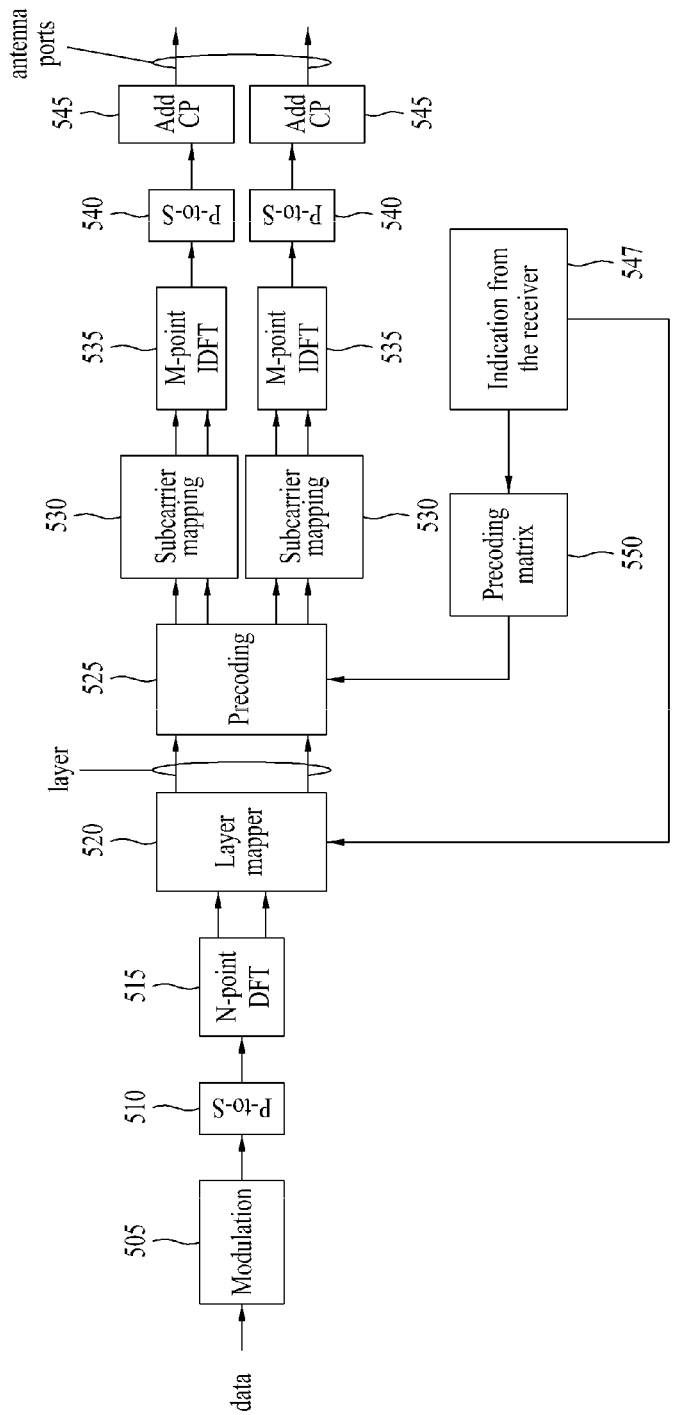
FIG. 5 is a block diagram illustrating an exemplary embodiment of the structure of a receiving side in which Single Carrier-Frequency Division Multiplexing Access (SC-FDMA) is applied to a MIMO technique.

FIG. 5 is a block diagram illustrating an exemplary embodiment of the structure of a receiving side in which Single Carrier-Frequency Division Multiplexing Access (SC-FDMA) is applied to a MIMO technique.

Referring to FIG. 5, a receiving side in a wireless communication system according to the present invention may include a modulation module 505, a Serial-to-Parallel (S-to-P) converter 510, an N-point DFT module 515, a layer mapper 520, a precoding module 525, subcarrier mapping modules 530, M-point IDFT modules 535, Parallel-to-Serial (P-to-S) converters 540, and CP addition modules 545.

If uplink SC-FDMA is applied to a MIMO technique, a layer mapping process and a precoding process may be added to an SC-FDMA system.

The modulation module 505 may modulate transmission data to generate symbols. The S-to-P converter 510 converts serially modulated symbols into parallel symbols. The N-point DFT module 515 applies DFT to the parallel symbols to obtain symbols of a frequency domain. The layer mapper 520 ma the symbols of each frequency domain to layers.

The precoding module 525 may perform precoding. A precoding matrix 550 used for precoding may be determined by indication from a BS.

The subcarrier mapping modules 530 map subcarriers in units of antennas. The M-point IDFT modules 535 may perform Inverse Discrete Fourier Transform (IDFT). In this case, a DFT interval and an IDFT interval may differ. The P-to-S converters 540 may perform P-to-S conversion. The CP addition modules 545 may add a Cyclic Prefix (CP) before transmission. It is assumed that a BS obtains channel information at regular intervals and informs a UE of the number of transmission layers and a precoding matrix to be used by the UE, based on the channel information.

Figure 6:
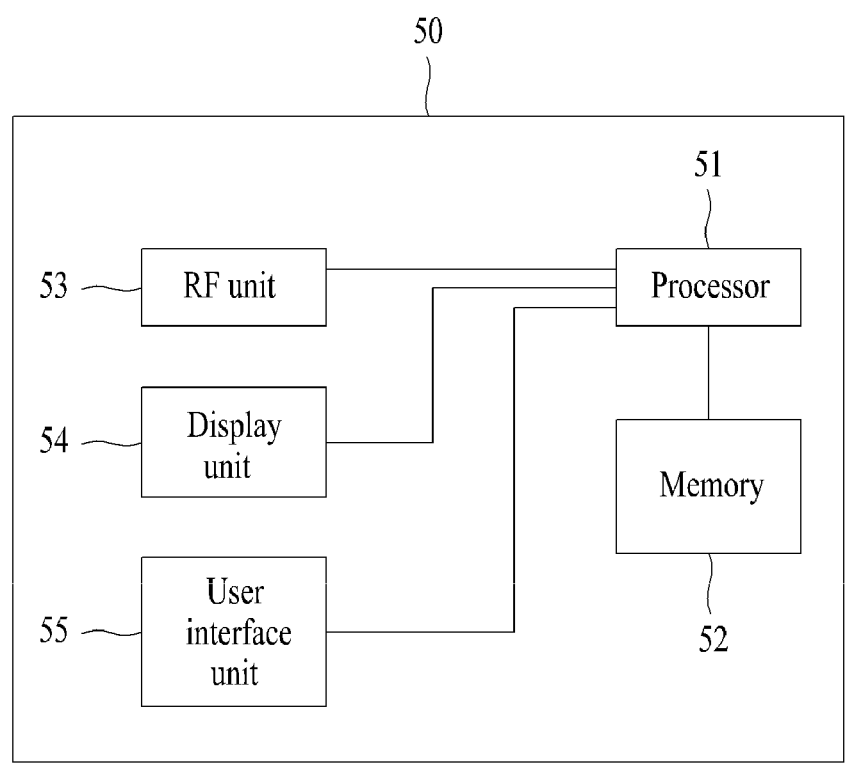
FIG. 6 is a diagram illustrating constituent elements of a device 50.

FIG. 6 is a diagram illustrating constituent elements of a device 50. The device 50 may be a UE or a BS. The device 50 includes a processor 51, a memory 52, a Radio Frequency (RF) unit 53, a display unit 54, and a user interface unit 55. Layers of a radio interface protocol are implemented within the processor 51. The processor 51 provides a control plane and a user plane. A function of each layer may be implemented within the processor 51. The processor 51 may include a contention resolution timer. The memory 52 is connected to the processor 51 to store an operating system, applications, and general files. If the device 50 is a UE, the display unit 54 displays various information and may use a well-known element such as a Liquid Crystal Display (LCD) or an Organic Light Emitting Diode (OLED). The user interface unit 55 may be comprised of a combination of well-known user interfaces such as a keypad and a touch screen. The RF unit 53 may be connected to the processor 51 to transmit and receive radio signals. The RF unit 53 may include a transmission module (not shown) and a reception module (not shown). The RF unit 53 receives control information including zone allocation information from a BS, and the processor 51 controls the UE 50 to communicate with the BS through a corresponding zone based on the zone allocation information.

The layers of the radio interface protocol between a UE and a network include a first layer L1, a second layer L2, and a third layer L3, based on three lower layers of a well-known Open System Interconnection (OSI) model in a communication system. A physical layer or a PHY layer belongs to the first layer and an information transmission service is provided through the physical layer. A Radio Resource Control (RRC) layer belongs to the third layer and provides control radio resources between the UE and the network. The UE and the network exchange RRC messages through the RRC layer.

The above-described embodiments are combinations of elements and features of the present invention in a predetermined type. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims which are not explicitly dependent on each other can be combined to provide an embodiment or new claims can be added through amendment after this application is filed.

The embodiments according to the present invention can be implemented by various means, for example, hardware, firmware, software, or combinations thereof. In case of hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In case of firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

Industrial Applicability

The method for generating a codebook for multi-cell cooperation according to the present invention and the method and apparatus for transmitting feedback information and data using the same may be applied to mobile communication systems such as an LTE system and an IEEE 802.16m system.

The invention claimed is:

1. A method for transmitting feedback information at a User Equipment (UE) in a wireless communication system operating in a Base Station (BS) cooperative mode, the method comprising:

estimating a channel between the UE and each BS using a channel measurement signal received from each BS operating in the BS cooperative mode;

selecting a multi-BS precoding matrix from a predefined multi-BS precoding matrix codebook based on the estimated channel; and transmitting identification information of the selected multi-BS precoding matrix to a serving BS, wherein the predefined multi-BS precoding matrix codebook is configured to include row precoding matrices of one or more same rows, column precoding matrices of same columns that are identical to each other, and a coefficient matrix having a unitary property, and wherein the row precoding matrices of the predefined multi-BS precoding matrix codebook are selected from a predefined single-BS precoding matrix codebook such that a subspace distance between precoding matrices of the predefined single-BS precoding matrix codebook is maximized.

2. The method of claim 1, wherein column vectors are eliminated from the predefined multi-BS precoding matrix codebook in order of a minimum magnitude of a subspace distance between a plurality of column vectors corresponding to a number of transmission antennas of each BS and the other column vectors, and the predefined multi-BS precoding matrix codebook is generated by multiplying $$\sqrt{\frac{\text{total number of transmission antennas}}{\text{number of ranks}}}$$

by the coefficient matrix.

3. The method of claim 1, wherein the coefficient matrix is a Discrete Fourier Transform (DFT) coefficient matrix.

4. A method for transmitting feedback information at a User Equipment (UE) in a wireless communication system operating in a Base Station (BS) cooperative mode, the method comprising:

estimating a channel between the UE and each BS using a channel measurement signal received from each BS operating in the BS cooperative mode;

selecting a multi-BS precoding matrix from a predefined multi-BS precoding matrix codebook based on the estimated channel; and transmitting identification information of the selected multi-BS precoding matrix to a serving BS, wherein:
the predefined multi-BS precoding matrix codebook includes one or more single-BS precoding matrices and a coefficient matrix which is a set of coefficients, each of the coefficients multiplied by a respectively corresponding one of the one or more single-BS precoding matrices;
a product of the multi-BS precoding matrix and a Hermitian matrix of the multi-BS precoding matrix is a unitary matrix;
row precoding matrices in the predefined multi-BS precoding matrix codebook are orthogonal to each other;
elements of the coefficient matrix are generated such that an absolute value of each of the elements is 1; and
a subspace distance between the row precoding matrices is defined by the following equation A:

$$d_{SSD}(U, V) = \sqrt{\max(m, n) - \sum_{i=1}^{N}\sum_{j=1}^{N}|u_i^H v_j|^2}$$ [Equation A]

where U and V denote subspaces, m and n respectively denote dimensions of U and V, N is an integer greater than or equal to either of m or n, and H denotes Hermitian which is a conjugate transpose operation.

5. A method for transmitting data in a wireless communication system operating in a Base Station (BS) cooperative mode, the method comprising:
receiving identification information of a multi-BS precoding matrix selected from a predefined multi-BS precoding matrix codebook from a User Equipment (UE);
precoding data to be transmitted using the multi-BS precoding matrix indicated by the identification information; and
transmitting the precoded data to the UE using multiple antennas,
wherein the predefined multi-BS precoding matrix codebook is configured to include row precoding matrices of one or more same rows, column precoding matrices of same columns that are identical to each other, and a coefficient matrix having a unitary property, and
wherein the row precoding matrices of the predefined multi-BS precoding matrix codebook are selected from a predefined single-BS precoding matrix codebook such that a subspace distance between precoding matrices of the predefined single-BS precoding matrix codebook is maximized.

6. The method of claim 5, wherein column vectors are eliminated from the predefined multi-BS precoding matrix codebook in order of a minimum magnitude of a subspace distance between a plurality of column vectors corresponding to a number of transmission antennas of each BS and the other column vectors, and the predefined multi-BS precoding matrix codebook is generated by multiplying $$\sqrt{\frac{\text{total number of transmission antennas}}{\text{number of ranks}}}$$

by the coefficient matrix.

7. A method for transmitting data in a wireless communication system operating in a Base Station (BS) cooperative mode, the method comprising:
receiving identification information of a multi-BS precoding matrix selected from a predefined multi-BS precoding matrix codebook from a User Equipment (UE);
precoding data to be transmitted using the multi-BS precoding matrix indicated by the identification information; and
transmitting the precoded data to the UE using multiple antennas,
wherein:
the predefined multi-BS precoding matrix codebook includes one or more single-BS precoding matrices and a coefficient matrix which is a set of coefficients, each of the coefficients multiplied by a respectively corresponding one of the one or more single-BS precoding matrices;
a product of the multi-BS precoding matrix and a Hermitian matrix of the multi-BS precoding matrix is a unitary matrix;
row precoding matrices in the predefined multi-BS precoding matrix codebook are orthogonal to each other;
elements of the coefficient matrix are generated such that an absolute value of each of the elements is 1; and
a subspace distance between the row precoding matrices is defined by the following equation B:

$$d_{SSD}(U, V) = \sqrt{\max(m, n) - \sum_{i=1}^{N}\sum_{j=1}^{N}|u_i^H v_j|^2}$$ [Equation B]

where U and V denote subspaces, m and n respectively denote dimensions of U and V, N is an integer greater than or equal to either m or n, and H denotes Hermitian which is a conjugate transpose operation.

8. A method for transmitting feedback information at a User Equipment (UE) in a wireless communication system operating in a Base Station (BS) cooperative mode, the method comprising:
estimating a channel between the UE and each BS using a channel measurement signal received from each BS operating in the BS cooperative mode;
selecting a multi-BS precoding matrix from a predefined multi-BS precoding matrix codebook based on the estimated channel; and
transmitting identification information of the selected multi-BS precoding matrix to a serving BS,
wherein:
the predefined multi-BS precoding matrix codebook includes one or more single-BS precoding matrices and a coefficient matrix which is a set of coefficients, each of the coefficients multiplied by a respectively corresponding one of the one or more single-BS precoding matrices;
a product of the multi-BS precoding matrix and a Hermitian matrix of the multi-BS precoding matrix is a unitary matrix; and
row precoding matrices in the predefined multi-BS precoding matrix codebook are selected as precoding matrices having a same index, or column precoding matrices in the predefined multi-BS precoding matrix codebook are selected as precoding matrices having a same index.

9. The method of claim 8, wherein a product of a Hermitian matrix of a first precoding matrix in a first row and a second precoding matrix in the first row is the same as a product of a Hermitian matrix of a third precoding matrix in a same column as the first precoding matrix in a second row and a fourth precoding matrix in a same column of the second precoding matrix in the second row, in the predefined multi-BS precoding matrix codebook, and column vectors of the coefficient matrix are orthogonal.

10. The method of claim 9, wherein the coefficient matrix is selected such that a subspace distance between each precoding matrix in a first column and each precoding matrix corresponding to a same row in a second column, in the predefined multi-BS precoding matrix codebook, is maximized.

11. A User Equipment (UE) for transmitting feedback information in a wireless communication system operating in a Base Station (BS) cooperative mode, the UE comprising:
    a processor configured to:
    estimate a channel between the UE and each BS using a channel measurement signal received from each BS operating in the BS cooperative mode; and
    select a multi-BS precoding matrix from a predefined multi-BS precoding matrix codebook based on the estimated channel; and
    a Radio Frequency (RF) unit configured to transmit identification information of the selected multi-BS precoding matrix to a serving BS,
    wherein the predefined multi-BS precoding matrix codebook is configured to include row precoding matrices of one or more same rows, column precoding matrices of same columns that are identical to each other, and a coefficient matrix having a unitary property, and
    wherein the row precoding matrices of the predefined multi-BS precoding matrix codebook are selected from a predefined single-BS precoding matrix codebook such that a subspace distance between precoding matrices of the predefined single-BS precoding matrix codebook is maximized.

12. A User Equipment (UE) for transmitting feedback information in a wireless communication system operating in a Base Station (BS) cooperative mode, the UE comprising:
    a processor configured to:
    estimate a channel between the UE and each BS using a channel measurement signal received from each BS operating in the BS cooperative mode; and
    select a multi-BS precoding matrix from a predefined multi-BS precoding matrix codebook based on the estimated channel; and
    a Radio Frequency (RF) unit configured to transmit identification information of the selected multi-BS precoding matrix to a serving BS,
    wherein:
    the predefined multi-BS precoding matrix codebook includes one or more single-BS precoding matrices and a coefficient matrix which is a set of coefficients, each of the coefficients multiplied by a respectively corresponding one of the one or more single-BS precoding matrices;
    a product of the multi-BS precoding matrix and a Hermitian matrix of the multi-BS precoding matrix is a unitary matrix; and
    row precoding matrices in the predefined multi-BS precoding matrix codebook are selected as precoding matrices having a same index or column precoding matrices in the predefined multi-BS precoding matrix codebook are selected as precoding matrices having a same index.

13. The UE of claim 12, wherein a product of a Hermitian matrix of a first precoding matrix in a first row and a second precoding matrix in the first row is the same as a product of a Hermitian matrix of a third precoding matrix in a same column as the first precoding matrix in a second row and a fourth precoding matrix in a same column of the second precoding matrix in the second row, in the predefined multi-BS precoding matrix codebook, and column vectors of the coefficient matrix are orthogonal.

* * * * *